United States Patent
Ray et al.

(10) Patent No.: US 10,156,833 B2
(45) Date of Patent: Dec. 18, 2018

(54) BUILDING MANAGEMENT SYSTEM WITH SPACE PROFILES

(71) Applicant: Johnson Controls Technology Company, Auburn Hills, MI (US)

(72) Inventors: Beth A. Ray, Oak Creek, WI (US); Sheri L. Meyer, Waukesha, WI (US); Radu M. Dorneanu, Greendale, WI (US); Gregory B. Cebasek, New Berlin, WI (US); Donald A. Gottschalk, Racine, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 15/952,173

(22) Filed: Apr. 12, 2018

(65) Prior Publication Data

US 2018/0299843 A1 Oct. 18, 2018

Related U.S. Application Data

(60) Provisional application No. 62/485,282, filed on Apr. 13, 2017.

(51) Int. Cl.
*G05B 13/04* (2006.01)
*G05B 15/02* (2006.01)
(Continued)

(52) U.S. Cl.
CPC ......... *G05B 13/04* (2013.01); *G05B 13/0265* (2013.01); *G05B 15/02* (2013.01); *G05B 17/02* (2013.01); *G05B 2219/2614* (2013.01)

(58) Field of Classification Search
CPC .... G05B 13/04; G05B 13/0265; G05B 17/02; G05B 15/02; G05B 2219/2614
See application file for complete search history.

(56) References Cited

U.S. PATENT DOCUMENTS 9,521,009 B1 12/2016 Skeffington
2007/0219645 A1* 9/2007 Thomas ................. G05B 15/02
700/29
(Continued)

FOREIGN PATENT DOCUMENTS

EP 1 770 454 A1 4/2007
WO WO-2010/141601 A2 12/2010
WO WO-2016/180754 A1 11/2016

OTHER PUBLICATIONS

International Search Report and Written Opinion on International Patent Application No. PCT/US2018/027396 dated Jun. 27, 2018. 16 pages.
(Continued)

*Primary Examiner* — Ronald D Hartman, Jr.
(74) *Attorney, Agent, or Firm* — Foley & Lardner LLP

(57) ABSTRACT

A building management system includes a plurality of devices of building equipment that operate across multiple building equipment domains. Each of the plurality of devices serves one or more spaces. The building management system also includes a control engine configured to, for each space, associate the space with a first group of the plurality of devices. The first group includes multiple devices that serve the space and that operate across the multiple building equipment domains. The control engine is further configured to select a space profile from a plurality of space profiles. At least two of the space profiles are associated with a different type of space serving a different function, and at least two of the space profiles include settings for the multiple devices of the first group. The control engine is also configured to distribute the settings defined by the selected space profile to the multiple devices of the first group.

20 Claims, 36 Drawing Sheets

(51) Int. Cl.
*G06F 19/00* (2018.01)
*G05B 17/02* (2006.01)
*G05B 13/02* (2006.01)

(56) References Cited

U.S. PATENT DOCUMENTS

| | | | |
|---|---|---|---|
| 2008/0277486 A1* | 11/2008 | Seem | H04L 67/125 |
| | | | 236/49.3 |
| 2008/0281472 A1 | 11/2008 | Podgorny et al. | |
| 2010/0262298 A1 | 10/2010 | Johnson et al. | |
| 2010/0307731 A1 | 12/2010 | Yonezawa et al. | |
| 2010/0324962 A1* | 12/2010 | Nesler | G01R 21/133 |
| | | | 705/7.36 |
| 2011/0093126 A1 | 4/2011 | Toba et al. | |
| 2013/0218349 A1* | 8/2013 | Coogan | G05B 13/02 |
| | | | 700/275 |
| 2013/0257626 A1 | 10/2013 | Masli et al. | |
| 2013/0268128 A1* | 10/2013 | Casilli | G05D 23/19 |
| | | | 700/276 |
| 2013/0297259 A1 | 11/2013 | Tsao et al. | |
| 2015/0032265 A1 | 1/2015 | Herring et al. | |
| 2015/0140990 A1* | 5/2015 | Kim | H04W 8/186 |
| | | | 455/418 |
| 2015/0159893 A1* | 6/2015 | Daubman | G05B 15/02 |
| | | | 700/278 |
| 2015/0168926 A1 | 6/2015 | Wood | |
| 2015/0312696 A1* | 10/2015 | Ribbich | H04W 4/33 |
| | | | 455/418 |
| 2015/0370927 A1 | 12/2015 | Flaherty et al. | |
| 2016/0258641 A1 | 9/2016 | Cheatham et al. | |
| 2016/0320760 A1* | 11/2016 | Brun | G05B 19/0421 |
| 2017/0026194 A1* | 1/2017 | Vijayrao | H04L 12/2809 |
| 2017/0191695 A1 | 7/2017 | Bruhn et al. | |
| 2017/0195130 A1* | 7/2017 | Landow | H04L 12/2816 |
| 2018/0120788 A1* | 5/2018 | Billings | G05B 13/024 |
| 2018/0191197 A1* | 7/2018 | Carr | H02J 13/0013 |

OTHER PUBLICATIONS

Office Action on U.S. Appl. No. 15/952,211 dated Jun. 25, 2018. 7 pages.
Office Action on U.S. Appl. No. 15/952,214 dated Jul. 13, 2018. 10 pages.

* cited by examiner

BUILDING MANAGEMENT SYSTEM WITH SPACE PROFILES

CROSS REFERENCE TO RELATED APPLICATIONS

This application claims the benefit of and priority to U.S. Provisional Patent Application No. 62/485,282 filed Apr. 13, 2017, the entire disclosure of which is incorporated by reference herein.

BACKGROUND

The present disclosure relates generally to building domain systems (BDSs). A BDS is, in general, a system configured to control, monitor, and manage devices in or around a building or building area. As used herein, "devices" includes any building equipment, devices, apparatuses, sensors, etc. that provide measurements or data relating to a space or that can be controlled to change the condition of a space (e.g., light level, locked/unlocked, temperature, humidity). Accordingly, as used herein "devices" includes HVAC equipment (e.g., air handling units, chillers), thermostats, light fixtures, locks, sensors (detectors for smoke, heat, gas, flames, carbon monoxide, glass breaks, motion, and light; sensor that measure temperature, humidity, carbon dioxide, ambient light, and occupancy; presence/identity sensors (e.g., card readers, RFID receivers); cameras (e.g., video capture, image capture) and microphones), and other apparatuses (e.g., sound systems, blinds, appliances, garage doors, beds, televisions). Devices may also be referred to herein as environmental controller assets.

Conventionally, a BDS is a domain-specific system that manages equipment of a particular building domain, for example a HVAC system, a security system, a lighting system, or a fire alerting system. Although in some cases multiple domain-specific systems have been placed in communication with one another as discussed below, such integrated systems do not capture the full potential of interoperability, functionality, and interdependence between building devices.

Furthermore, conventional BDS are focused on particular domains and types of devices, rather than the missions and functions of a place (e.g., a building, a campus) or a space (e.g., a floor, room, hallway, etc. included in a place) or the events occurring at such spaces and places. A disconnect therefore exists in conventional systems between the way occupants think about and utilize spaces and places and the way BDS are operated and controlled. Additionally, the collection of data from sensors and other data sources in conventional BDS places substantial limits and restrictions on the usefulness of that data. Further, in conventional BDS, the collection and generation of utilization metrics for spaces and places often does not capture the actual usage of the spaces and places, and may therefore prevent users from acquiring the information needed for successful energy management or other building management and planning decision-making.

SUMMARY

One implementation of the present disclosure is a building management system for managing one or more places that include one or more spaces. The building management system includes a plurality of devices of building equipment that operate across multiple building equipment domains. Each of the plurality of devices serves one or more of the spaces. The building management system also includes a control engine configured to, for each space, associate the space with a first group of the plurality of devices of building equipment. The first group includes multiple devices that serve the space and that operate across the multiple building equipment domains. The control engine is further configured to, for each space, select a space profile from a plurality of space profiles. At least two of the space profiles are associated with a different type of space serving a different function, and at least two of the space profiles include settings for the multiple devices of the first group. In response to selecting the space profile, the control engine is also configured to distribute the settings defined by the selected space profile to the multiple devices of the first group. Distributing the settings causes the multiple devices of the first group to operate in accordance with the settings defined by the selected space profile.

In some embodiments, the control engine is configured to receive an indication that two or more of the spaces have been combined to form a place that contains the two or more spaces and associate the place with a second group of the plurality of devices of building equipment. The second group includes multiple devices that serve the place. The control engine is configured to select a place profile that includes settings for the multiple devices that serve the place. The place profile is selected from among a plurality of place profiles each associated with a different type of place serving a different function. The control engine is also configured to automatically switch from using space profiles for each of the two or more spaces to using the place profile for the place that contains the two or more spaces, and in response to switching to the place profile, distribute the settings defined by the place profile to the multiple devices that serve the place.

In some embodiments, the control engine is configured to generate the place profile by combining two or more groups of settings defined by the space profiles for each of the two or more spaces that have been combined to form the place.

In some embodiments, the control engine is configured to select the space profile by identifying a type of place within which the space is contained, identifying a purpose or use of the space, and selecting the space profile based on both the type of place within which the space is contained and the purpose or use of the space.

In some embodiments, the control engine is configured to receive an identifier for each of one or more people present in the space, identify preferred settings associated with each identifier, and adjust the settings defined by the space profile for the multiple devices that serve the space based on the preferred settings.

In some embodiments, the control engine is configured to identify a relative importance and identifier-specific settings associated with each identifier and generate the preferred settings by calculating a weighted average of the identifier-specific settings associated with each identifier in which each of the identifier-specific settings is weighted by the relative importance of the associated identifier.

In some embodiments, each space profile includes a criticality attribute and criteria for altering the effective criticality attribute. The control engine is configured to, for each space, receive data relating to the space from one or more data sources, determine, based on the data relating to the space, that one or more of the criteria are satisfied, and in response to a determination that one or more of the criteria are satisfied, alter the effective criticality attribute of the space by increasing or decreasing the effective criticality attribute for the space. The effective criticality attributes for the spaces are used to prioritize alarms across spaces.

Another implementation of the present disclosure is a method for managing one or more places that include one or more spaces. The method includes operating a plurality of devices of building equipment across multiple building equipment domains. Each of the plurality of devices serve one or more of the spaces. For each space of the one or more spaces, the method includes associating the space with a first group of the plurality of devices of building equipment. The first group includes multiple devices that serve the space and that operate across the multiple building equipment domains. For each space of the one or more spaces, the method also includes selecting a space profile from a plurality of space profiles. At least two of the space profiles are associated with a different type of space serving a different function, and at least two of the space profiles include settings for the multiple devices of the first group. For each space of the one or more spaces, the method also includes, in response to selecting the space profile, distributing the settings defined by the selected space profile to the multiple devices of the first group. Distributing the settings causes the multiple devices of the first group to operate in accordance with the settings defined by the selected space profile.

In some embodiments, the method includes receiving an indication that two or more spaces have been combined to form a place that contains the two or more spaces and associating the place with a second group of the plurality of devices of building equipment. The second group comprising multiple devices that serve the place. The method also includes selecting a place profile comprising settings for the multiple devices that serve the place, automatically switching from using space profiles for each of the two or more spaces to using the place profile for the place that contains the two or more spaces, and, in response to switching to the place profile, distributing the settings defined by the place profile to the multiple devices that serve the place.

In some embodiments, the method also includes generating the place profile by combining two or more groups of settings defined by the space profiles for each of the two or more spaces that have been combined to form the place.

In some embodiments, selecting the space profile includes identifying a type of place within which the space is contained, identifying a purpose or use of the space, and selecting the space profile based on both the type of place within which the space is contained and the purpose or use of the space.

In some embodiments, the method also includes receiving an identifier for each of one or more people present in the space, identifying preferred settings associated with each identifier, and adjusting the settings defined by the space profile for the multiple devices that serve the space based on the preferred settings.

In some embodiments, the method also includes identifying a relative importance and identifier-specific settings associated with each identifier and generating the preferred settings by calculating a weighted average of the identifier-specific settings associated with each identifier in which each of the identifier-specific settings is weighted by the relative importance of the associated identifier.

In some embodiments, each space profile includes an effective criticality attribute and criteria for altering the effective criticality attribute. The method includes receiving, for each space, data relating to the space from one or more data sources, determining, for each space and based on the data relating to the space, that one or more of the criteria are satisfied, altering, in response to a determination that one or more of the criteria are satisfied for a space, the effective criticality attribute of the space by increasing or decreasing the effective criticality attribute for the space, and prioritizing alarms for the spaces based on the effective criticality attributes for the spaces.

Another implementation of the present disclosure is one or more non-transitory computer readable media containing program instructions that, when executed by one or more processors, cause the one or more processors to perform operations. The operations includes operating a plurality of devices of building equipment across multiple building equipment domains. Each of the plurality of devices serve one or more of the spaces. For each space of the one or more spaces, the method includes associating the space with a first group of the plurality of devices of building equipment. The first group includes multiple devices that serve the space and that operate across the multiple building equipment domains. For each space of the one or more spaces, the operations also include selecting a space profile from a plurality of space profiles. At least two of the space profiles are associated with a different type of space serving a different function, and at least two of the space profiles include settings for the multiple devices of the first group. For each space of the one or more spaces, the operations also include, in response to selecting the space profile, distributing the settings defined by the selected space profile to the multiple devices of the first group. Distributing the settings causes the multiple devices of the first group to operate in accordance with the settings defined by the selected space profile.

In some embodiments, the operations include receiving an indication that two or more spaces have been combined to form a place that contains the two or more spaces and associating the place with a second group of the plurality of devices of building equipment. The second group comprising multiple devices that serve the place. The operations also include selecting a place profile comprising settings for the multiple devices that serve the place, automatically switching from using space profiles for each of the two or more spaces to using the place profile for the place that contains the two or more spaces, and, in response to switching to the place profile, distributing the settings defined by the place profile to the multiple devices that serve the place.

In some embodiments, the operations also include generating the place profile by combining two or more groups of settings defined by the space profiles for each of the two or more spaces that have been combined to form the place.

In some embodiments, selecting the space profile includes identifying a type of place within which the space is contained, identifying a purpose or use of the space, and selecting the space profile based on both the type of place within which the space is contained and the purpose or use of the space.

In some embodiments, the operations also include receiving an identifier for each of one or more people present in the space, identifying preferred settings associated with each identifier, and adjusting the settings defined by the space profile for the multiple devices that serve the space based on the preferred settings.

In some embodiments, the operations also include identifying a relative importance and identifier-specific settings associated with each identifier and generating the preferred settings by calculating a weighted average of the identifier-specific settings associated with each identifier in which each of the identifier-specific settings is weighted by the relative importance of the associated identifier.

In some embodiments, each space profile includes an effective criticality attribute and criteria for altering the effective criticality attribute. The operations include receiving, for each space, data relating to the space from one or more data sources, determining, for each space and based on the data relating to the space, that one or more of the criteria are satisfied, altering, in response to a determination that one or more of the criteria are satisfied for a space, the effective criticality attribute of the space by increasing or decreasing the effective criticality attribute for the space, and prioritizing alarms for the spaces based on the effective criticality attributes for the spaces.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Introduction

Figure 1:
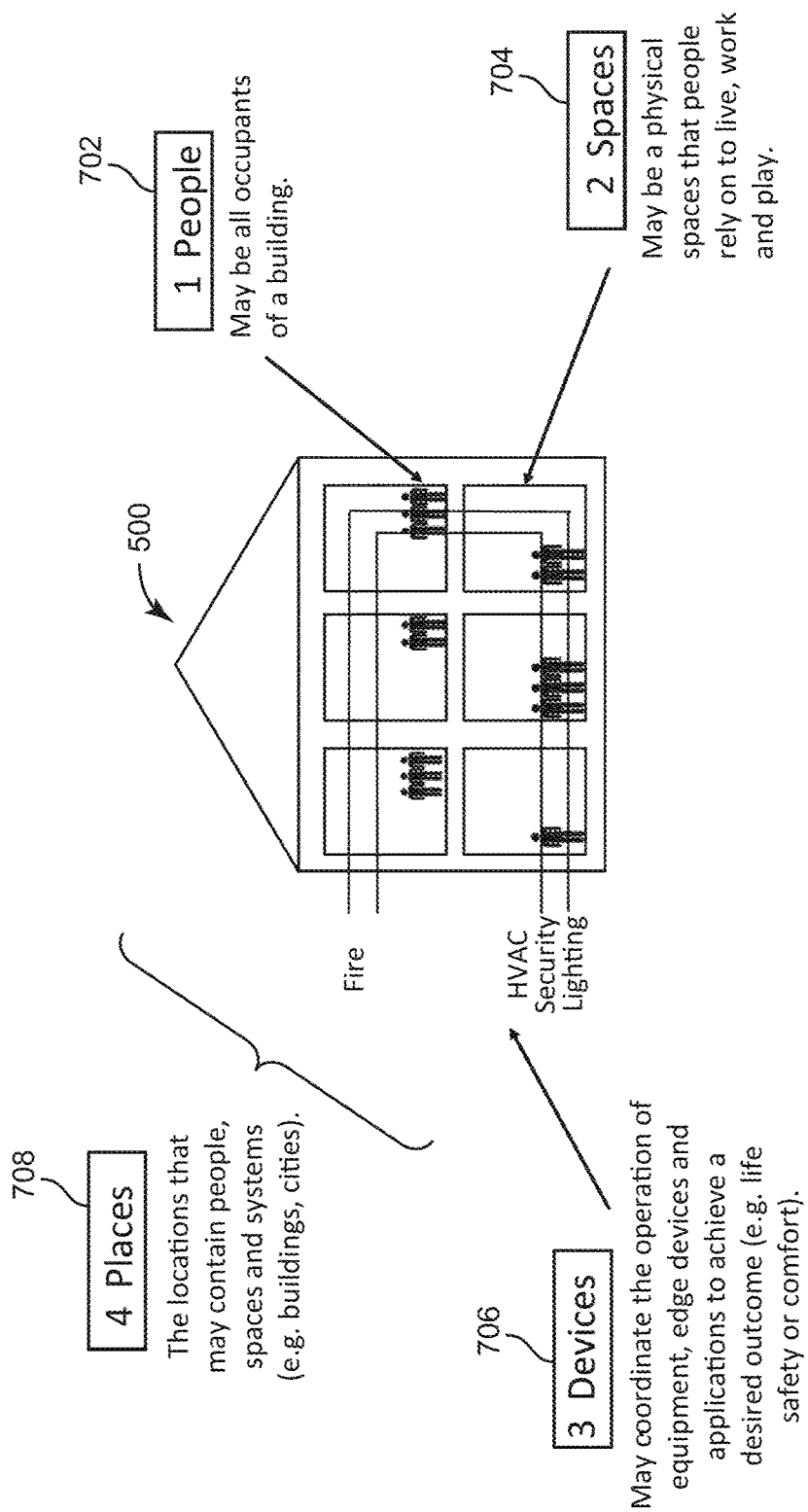
FIG. 1 is a diagram illustrating the concepts of occupants, spaces, places, and devices, according to an exemplary embodiment.

People experience the spaces and places with which they engage in many ways: they work in spaces and places, reside in spaces and places, entertain themselves in spaces and places, shop in spaces and places, heal in spaces and places, dine in spaces and places, etc., experiencing all aspects of life in spaces and places. People think about spaces and places from the perspective of these experiences: a space or a place is somewhere an event occurs, a job must be done, a mission is supported, or some other experience plays out. In the ideal scenario, spaces, places, and the devices that serve the spaces and places would seamlessly and intuitively support the goals, missions, needs, desires, and perspectives of the people experiencing those spaces and places.

However, a disconnect exists between conventional building domain systems and the way people see spaces and places. Conventional devices, and systems of conventional devices, are often designed, chosen, and operated to focus primarily on the needs of the devices or systems themselves. A space or place is typically served by many devices across many domains, for example HVAC, fire, access, security, lighting, etc. The devices of the various domains are typically independent of one another, with devices and systems for each domain designed, chosen, and installed with the focus on the particular domain. Each of the various building domain systems may be operated independently, achieving a limited impact on the way a person experiences a space or place. Interactions with each domain are often limited to terms familiar to that domain (e.g., HVAC systems are set to temperature setpoints, lighting systems turn on and off lights, access systems lock and unlock doors), rather than in terms of what missions, goals, tasks, or events that an occupant desires a space or place to support. This results in disjointed, time-consuming, and unfulfilling experiences for people attempting to use a space or place.

The systems and methods described herein provide an innovative space- and place-centric approach that seamlessly aligns the way that people think about and experience spaces and places with the way that devices are controlled to support those experiences. The space- and place-centric approach may eliminate the barriers between the way people conceive of the missions of spaces and places, the jobs people need to complete in spaces and places, events that occur in spaces and places, etc. and the way that the devices that support those missions, jobs, events, etc. are chosen, designed, and controlled. The way that data is collected and processed relating to spaces and places, for example utilization metrics about spaces and places, may be similarly aligned with the missions and purposes of the spaces and places.

These advantages may be supported across any of the extensive variety of types of spaces and places with which people engage, tuned precisely to the missions and purposes of each particular space or place. For example, offices, office buildings, retail stores, warehouses, hospitals, patient rooms, operating rooms, waiting rooms, movie theaters, stadiums, arenas, malls, restaurants, hotels, apartments, factories, gymnasiums, classrooms, libraries, and/or any other type of space or place experienced by people may have its own purposes, missions, and jobs and events to support. The systems and methods described herein may contemplate all such spaces and places and may allow for efficient installation, updates, data collection and controls of devices well-suited for all such spaces and places and any combination of spaces and places.

Several features, summarized here and described in detail below with reference to the FIGURES, facilitate this space- and place-centric approach. To start, the sensors, networks, controllers, and other systems in the space- and place-centric approach may be domain-agnostic. That is, the systems and methods disclosed herein may eliminate the barriers between domain-specific systems, unifying all domains into a unified control system. Although the space- and place-centric approach may be implemented by integrating or otherwise facilitating communication between building domain systems, in some embodiments the approach is implemented using a unified building management system (UBMS). A UBMS may place all devices, sensors, etc. in a single system, eliminating barriers between domains and facilitating the exchange of data, controls, resources, etc. across all components of the UBMS. All sensors and devices that can be used to influence the way a person experiences a space or place may be unified in the UBMS. Thus, the UBMS may allow all devices serving a space or place to be controlled as a unified group that supports a mission, purpose, job, or event for the space or place.

Next, space profiles for the spaces and place profiles for the places can be used to facilitate the space- and place-centric approach. Each space or place profile may define many aspects of how the space or place is designed, controlled, perceived, and used, and may include all or substantially all of the information needed to control the space or place across domains and to collect and analyze data relating to the space or place. Space and place profiles can be designed and created based on how people experience each space and place, including the jobs people need to accomplish in a space or place, the missions the space or place supports, the purpose of a space or place, and/or events that may occur in the space or place. Different types of spaces and places may have different space or place profiles specific to that type of space or place, such that each space or place profile reflects the needs of that particular space or place.

Space and place profiles can be easily loaded onto control systems for spaces and places (e.g., onto a UBMS) to easily and efficiently align systems and devices with the purposes, missions, goals, etc. of the spaces and places represented by the profiles. Further, space and place profiles can be easily updated or switched to respond to changes to the space or place. For example, when a place is remodeled or reimagined such that a space that was formerly used as one type of space (e.g., an office) is reimagined as another type of space (e.g., a conference room), the space profile for that space can be easily switched from an "office" space profile to a "conference room" space profile. Space-centric control can thus be immediately aligned with the new purposes, missions, functions, and goals of the space. Space and place profiles thereby provide efficient and adaptable support for the space- and place-centric control approach described herein.

Each of the space profiles that can be assigned to a given space may be associated with a particular type of space or use of the space (e.g., office, conference room, cafeteria, etc.) and may include settings that facilitate a function or purpose of that type of space or use of the space. The settings provided by a given space profile may include settings for various types of equipment that serve the space across multiple equipment domains (e.g., settings for HVAC equipment, settings for lighting equipment, settings for A/V equipment, etc.). For example, the "office" space profile may include a first set of settings for HVAC equipment, lighting equipment, A/V equipment, and/or other types of equipment that serve the space that cause the equipment to be controlled in a manner that facilitates usage of the space as an office. Conversely, the "conference room" space profile may include a second set of settings for the HVAC equipment, lighting equipment, A/V equipment, and/or other types of equipment that serve the space that cause the equipment to be controlled in a manner that facilitates usage of the space as a conference room.

Each space profile for a given space may include a different set of settings for some or all of the equipment that serve that space. For example, the HVAC settings defined by an "office" space profile may cause HVAC equipment that serve the space provide sufficient airflow and/or heating or cooling for a relatively small number of people occupying the space (e.g., one person or a small group of people), whereas the HVAC settings defined by a "conference room" space profile may cause the same HVAC equipment to provide a relatively greater amount of airflow or heating or cooling for a greater number of people occupying the space (e.g., 2-10 people or a larger group of people). Similarly, the lighting settings defined by the "office" space profile may cause lighting equipment that light the space to provide constant lighting for the space, whereas the lighting settings defined by the "conference room" space profile may cause the lighting equipment to light the space only when the space is occupied. As another example, the occupancy settings defined by the "office" space profile may provide a first occupancy threshold for evaluating whether the space is fully occupied (e.g., one person may fully occupy an office), whereas the occupancy settings defined by the "conference room" space profile may provide a second occupancy threshold for evaluating whether the space is fully occupied (e.g., 10 people may fully occupy a conference room).

In response to switching from the "office" space profile to the "conference room" space profile, the settings provided by the "office" space profile may be replaced with the settings provided by the "conference room" space profile. For example, a space controller may distribute the settings associated with the "conference room" space profile to some or all of the equipment that serve the space, causing the equipment to operate in accordance with the settings defined by the "conference room" space profile. The settings can be distributed to any type of equipment that serve the space, even if the equipment operate across multiple different equipment domains (e.g., HVAC, lighting, A/V, security, IT, etc.).

Next, the space- and place-centric approach allows for control of devices based on modes for the spaces and places. In some embodiments, each mode corresponds to an operational mission for the space or place, a job-to-be-done in the space or place, or an event occurring in the space or place. Each mode may correspond to settings or other commands for the devices in a space or place that control those devices to support the operational mission, the job to be done, or the event. The modes for a space or place may be stored in the space or place profile for the space or place profile, and, like the space or place profile, can be updated, supplemented, altered, or otherwise easily changed as needed to adapt to new uses of a space or place. Mode changes may be triggered based on input from various sensors, specialty systems, user inputs, detected events, etc. to allow for efficient transition between modes precisely as needed by occupants of a space or place. Accordingly, spaces and places, and all devices across all domains, can be controlled to enable people to use the spaces and places in many different ways.

Furthermore, spaces and places may be composable (i.e., a place may be made up of spaces, a space may include spaces, and a place may include places), and the profiles and the modes for the spaces and places can be tuned to take these interrelationships into account. For example, as described in detail herein, a change in mode in one space may be communicated to related spaces and places to allow those spaces and places to adjust as needed to the change. Spaces, places, sensors, devices, and other systems contemplated herein may be coordinated in an amorphous web such that everything works seamlessly together to support people's use of all spaces and places.

Another feature of the space- and place-centric approach described herein is the unification of sensors that serve spaces and places. In traditional systems, each building domain system includes domain-specific sensors that provide data that can only be used by devices of the corresponding domain. To achieve functionality in a second domain that could benefit from the same information captured by that data, additional sensors specific to the second domain traditionally must be installed to serve the second domain. Further, in traditional systems, data from the domains is siloed and cannot be easily combined to verify measurements, generate cross-domain metrics, and provide controls that allow a person to view the space in terms of the purposes or missions of the space.

In the space- and place-centric approach described herein, sensors may be domain-agnostic and may provide data as needed by the space or place regardless of the domain traditionally associated with any sensor or any type of data provided by that sensor. All sensors can be combined in a unified sensor network that provides the data needed by any device, and all devices can use data from any sensor. The devices can be controlled using aggregated data in a way that is agnostic of the source of the data. The sensors best suited for any given space may be used in that space, and different types of sensors can be used within a space or across multiple spaces and places to provide similar data attributes that are used by the devices. Data provided across spaces, including data from a variety of types of sensors, can also be used to enable place-level features like wayfinding or asset tracking. Sensor data from sensor traditionally associated with different domains can be unified into single data points or data series, for example by using one sensor to verify the accuracy of a measurement from another sensor. New sensors can be installed in a plug-and-play manner that allows them to automatically be included in any data calculations, control logic, or application that would benefit from the data from the new sensors. The unification of domain-agnostic sensors described herein thereby greatly enhances and supports the space- and place-centric approach.

In addition to the sources of data being tuned to the needs of each space, the metrics generated for each space may also be chosen to best capture the way people think about particular spaces and places. For example, the space- and place-based approach may facilitate the generation of actual-usage-based space utilization metrics. Different types of spaces can be utilized in different ways, such that the utilization of each space can be quantified in a way that aligns with the way people think about usage of that space. For example, usage of a warehouse may be conceptualized by users based on the volume of the space taken up by stored goods, usage of a restroom may be conceptualized based on the resources (e.g., water, soap, paper towels, toilet paper) consumed by people in the space, and usage of a conference room may be conceptualized based on how many people are in the space, among other possibilities. By aggregating data from across any sensors or other data sources for a space or place and applying that data as suitable for calculating a utilization metric that aligns with how people conceptualize usage of a space, the space- and place-centric approach facilitates the calculation of actual-usage-based utilization metrics. These actual-usage-based utilization metrics can then support improved resource management, energy management, maintenance/restocking/etc. planning, or developing other building management strategies.

Together, these and other features described in detail below may seamlessly align the way people think about and experience spaces and places with the way that devices are controlled to support those experiences and the way data is collected relating to those thoughts and experiences. As made clear with reference to the FIGURES below, space- and place-centric control of spaces and places may eliminate translation barriers between the way people conceive of the missions of spaces and places, the jobs people need to complete in spaces and places, events that occur in spaces and places, etc. and the way that devices that support those missions, jobs, events, etc. are chosen, designed, and controlled. The systems and methods described herein can thereby enable intuitive, efficient, and fulfilling interactions between people and spaces and places.

Spaces & Places

Referring now to FIG. 1, a conceptual diagram of the core elements of the space- and place-centric systems and methods described herein is shown, according to an exemplary embodiment. In FIG. 1, occupants 702 are shown to occupy place 708. Occupants 702 may be any person who is in the place 708 and is not limited to individuals who operate the place 708, maintain the place 708, live in the place 708, work in the place 708, etc. Occupants 702 may occupy various spaces 704 within a place. The various spaces 704 of the building may be spaces such as an office space, a gym space, a café space, a lab space, patient rooms, nurses stations, waiting rooms, a classroom space, parking garage, and any other kinds of spaces that may be present in or around a place. The occupants 702 use the various spaces 704 in the place 708 for various uses, purposes, missions, tasks, jobs, situations, etc. The space- and place-centric systems and methods of the present disclosure align control of spaces and places with occupant's purposes and missions in utilizing the spaces and places.

Each physical space may have its own devices 706 and/or may share devices 706 with other spaces in the place 708. Devices 706 include devices across various domains, such as HVAC devices, security devices, lighting devices, access devices, fire devices, etc. The devices 706 may work together to achieve various outcomes in a place, as described in detail below. In general, devices 706 are controlled based on space profiles and place profiles. The place profiles may be a particular data structure that includes properties such as spaces profile for spaces 704 in the place 708, modes and mode logic for controlling devices 706 in the place, and other applications that enable uses for the place. Space profiles include indication of the type of space, modes for that type of space, and attributes of the space, among other features as described in detail below. As described in detail herein, place- and space-profiles facilitate place- and space-based aggregation of sensor data and control of devices 706.

Figure 2:
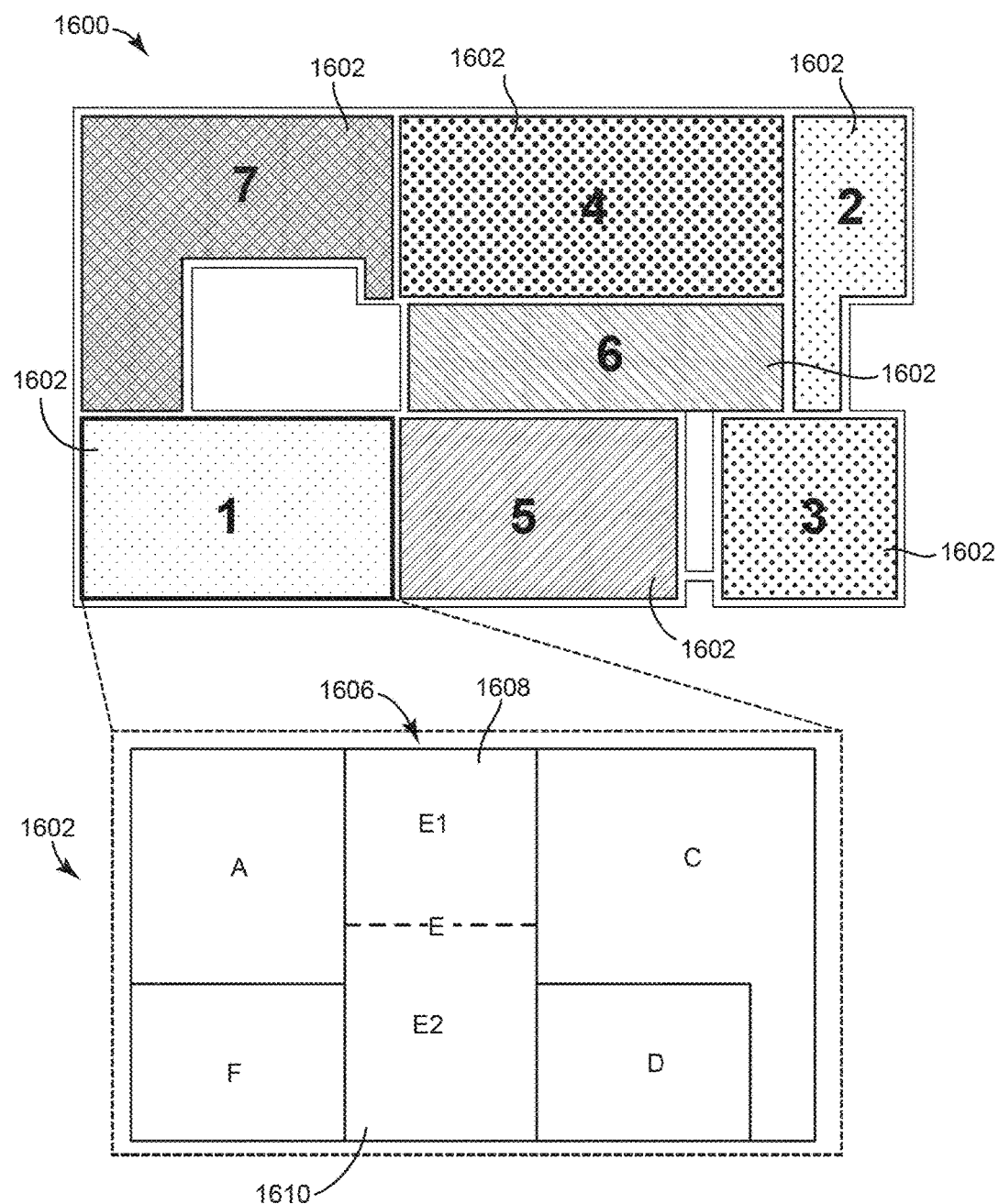
FIG. 2 is a visualization of spaces and places, according to an exemplary embodiment.

Referring now to FIG. 2, a visualization of the concept of spaces and places is shown, according to an exemplary embodiment. A campus 1600 is shown with seven buildings 1602. In the nomenclature used herein, each building 1602 is a "place." The campus 1600, made up of multiple places, may also be referred to as a "place". Each of the seven buildings 1602 ("Building 1", "Building 2", etc.) include a variety of rooms, floors, or other divisions. As one example, FIG. 2 includes an expanded view 1604 of "Building 1" 1602. The expanded view 1604 shows a variety of "spaces" (i.e., floors, areas, rooms, etc.) of "Building 1" 1602. As illustrated by space E 1606, spaces may be broken up into subspaces (in this example, subspace E1 1608 and subspace E2 1610 make up space E 1606). These subspaces may be referred to as "spaces" herein.

A place is generally made up of spaces. The place may be referred to as a "parent" of a space if the space is in that place. That space is then a "child" of that place. For example space E 1606 is a child of place "Building 1" 1602, and "Building 1" 1602 is the parent of space E 1606. Because a space (e.g., space E) may be made up of spaces (e.g., spaces E1 1608 and E2 1610) and a place (e.g., campus 1600) may be made up of places, a space may have a child and/or parent space and a place may have a child and/or parent place.

As used herein, the term "space or place" refers to any space or place where a system, component, method, etc. applies to both spaces or places. Spaces or places are typically fixed locations/areas (e.g., with an address, GPS coordinate, etc.) but may also include mobile spaces or places (e.g., a ship and rooms aboard the ship). Furthermore, while "space" or "place" may be used in describing the embodiments described herein, it should be understood that in many concepts described herein with reference to a space may also be applicable to a place.

Conventional Building Domain Systems and Control Architectures

Figure 3:
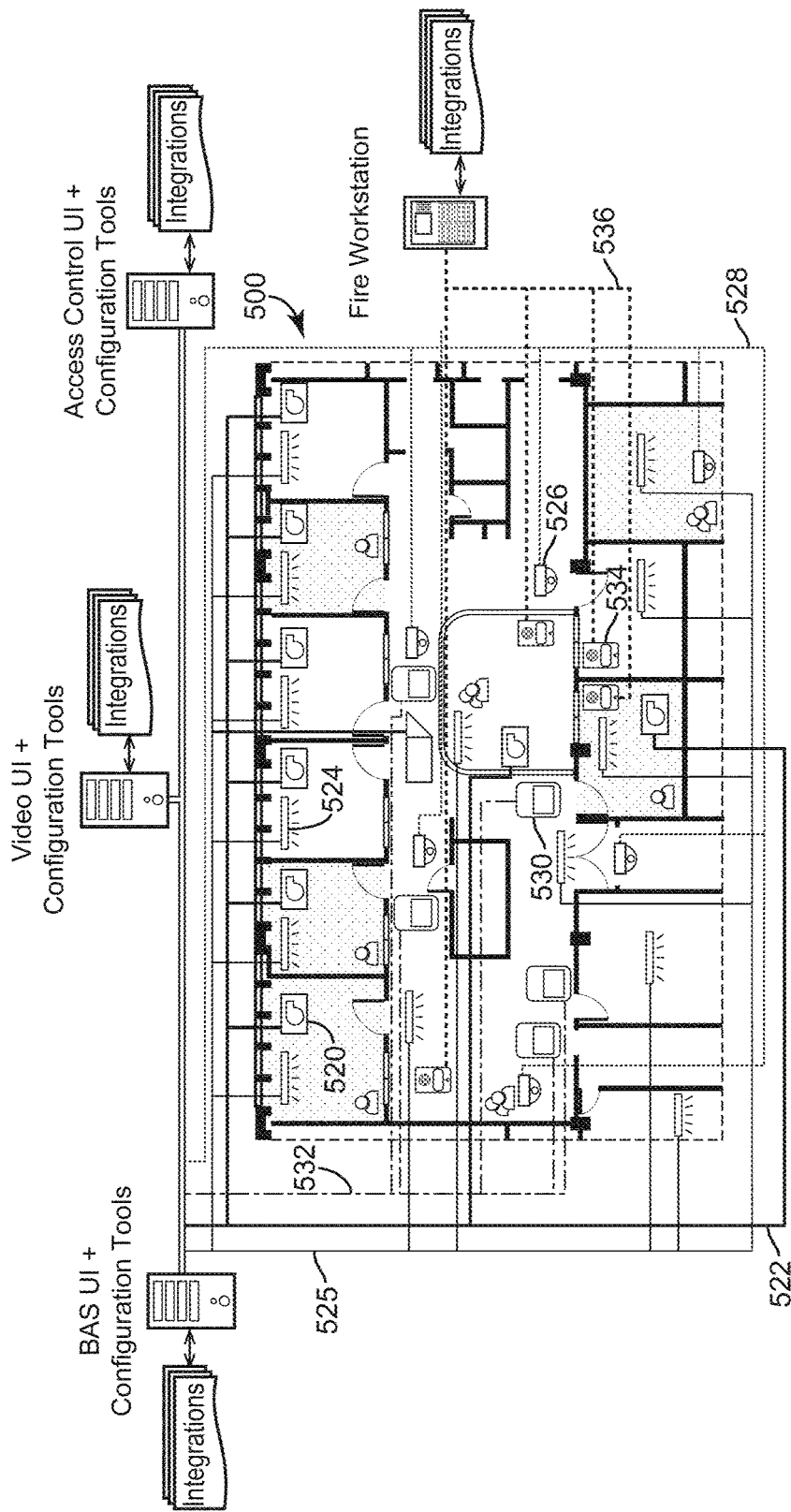
FIG. 3 is an example of a conventional collection of building domain systems for a building.

Referring now to FIG. 3 a diagram of five independently-operating conventional BDSs for a place 100 (e.g., a building and surrounding outdoor areas) is shown for the sake of background. More particularly, an HVAC system 502, a lighting system 504, an access system 506, a video system 508, and a fire system 510 are shown with place 500. In conventional BDSs, systems 502-510 operate independently, resulting in widespread complexity. Each of the HVAC system 502, lighting system 504, access system 506, video system 508, and fire system 510 have separate networks and cabling, controllers and servers, and user interfaces. For example, HVAC devices 520 are connected by HVAC cabling 522, while lighting devices 524 are connected by lighting cabling 525, video devices 526 are connected by video cabling 528, access devices 530 are connected by access cabling 532, and fire devices 534 are connected by fire cabling 536. Even when wireless networks are used instead of physical cabling, the wireless networks supporting each building system are generally separate. Furthermore, different network protocols may be used by the various systems, for example LonWorks, MSTP, BACnet, ONVIF, etc., inhibiting interconnectivity. In sum, systems 502-510 are implemented and installed as physically and electronically isolated systems. Limitations of such siloed systems are described with references to the following two figures.

Figure 4:
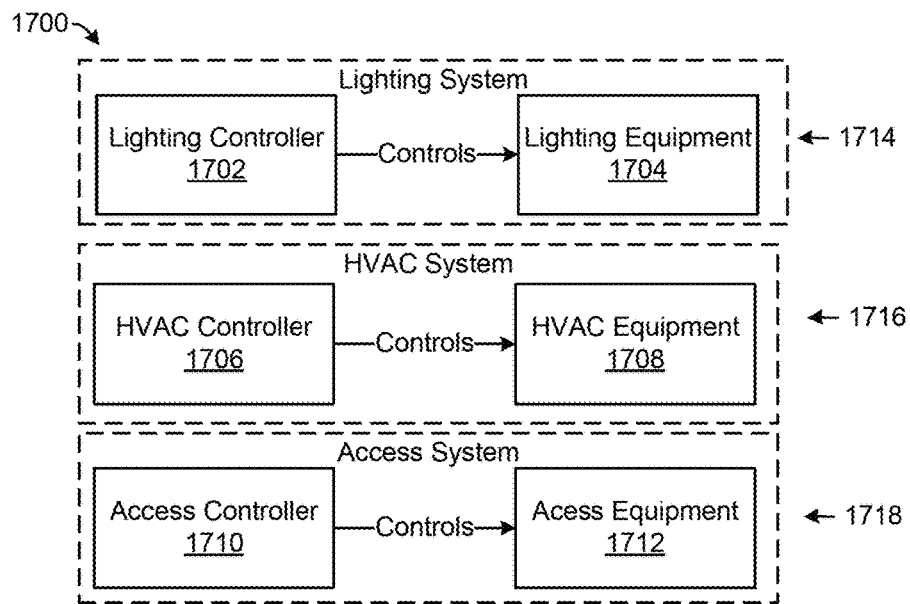
FIG. 4 is a block diagram of a conventional set of building domain systems.
Figure 5:
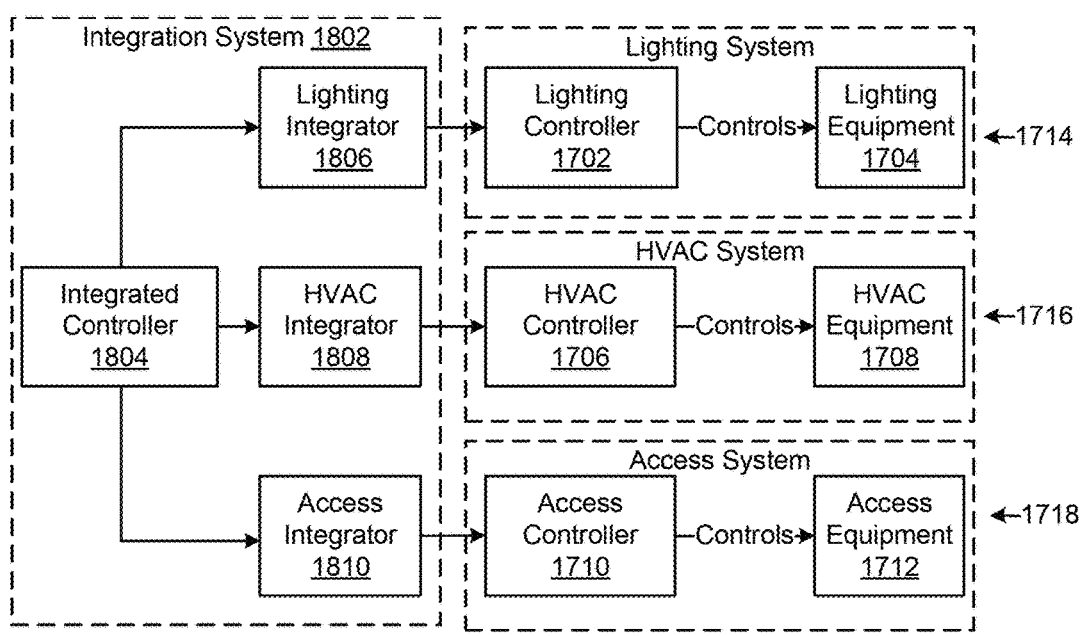
FIG. 5 is a block diagram of a conventional integration system for use with the building domain systems of FIG. 4.

Referring now to FIGS. 4 and 5, existing control architectures are shown for the sake of comparison to the systems and methods described herein. FIG. 4 shows isolated ("siloed") control and equipment for each of three building domains. In the lighting system 1714, lighting equipment 1702 is controlled by lighting controller 1704. In the HVAC system 1716, HVAC equipment 1706 is controlled by the HVAC controller 1708. In the access system 1718, access equipment 1710 is controlled by an access controller 1712. The lighting system 1714, the HVAC system 1716, and the access system 1718 are entirely independent of one another. Thus, in the architecture 1700 of FIG. 4, each building domain (i.e., each type of functionality provided to the building), is siloed and operates independently. Creating a desired condition in a space or place using the isolated architecture 1700 requires separate interactions with each domain (i.e., lighting, HVAC, access).

FIG. 5 shows an integration architecture 1800 that attempts to integrate the separate systems 1714-1718. An integration system 1802 includes and integrated controller 1804, a lighting integrator 1806, an HVAC integrator 1808, and an access integrator 1810. The lighting integrator 1806 translates data, control signals, etc. between a data model used by the integrated controller 1804 and a lighting data model used by the lighting system 1714. The HVAC integrator 1808 translates data, control signals, etc. between a data model used by the integrated controller 1804 and an HVAC data model used by the HVAC system 1716. The access integrator 1810 translates data, control signals, etc. between a data model used by the integrated controller 1804 and an access data model used by the access system 1718. The integration system 1802 thereby relies on fragile translations, interfaces, integrations, etc. to provide some amount of interaction across building domains. However, the integration system 1802 is prone to errors and breakdowns, for example caused by software updates in one system 1714-1718. Further, integration adds complexity, computation expenses, etc. to the operation of a building management system. The integration architecture 1800 may therefore by unsatisfactory for users.

Unified Building Management System

Figure 6:
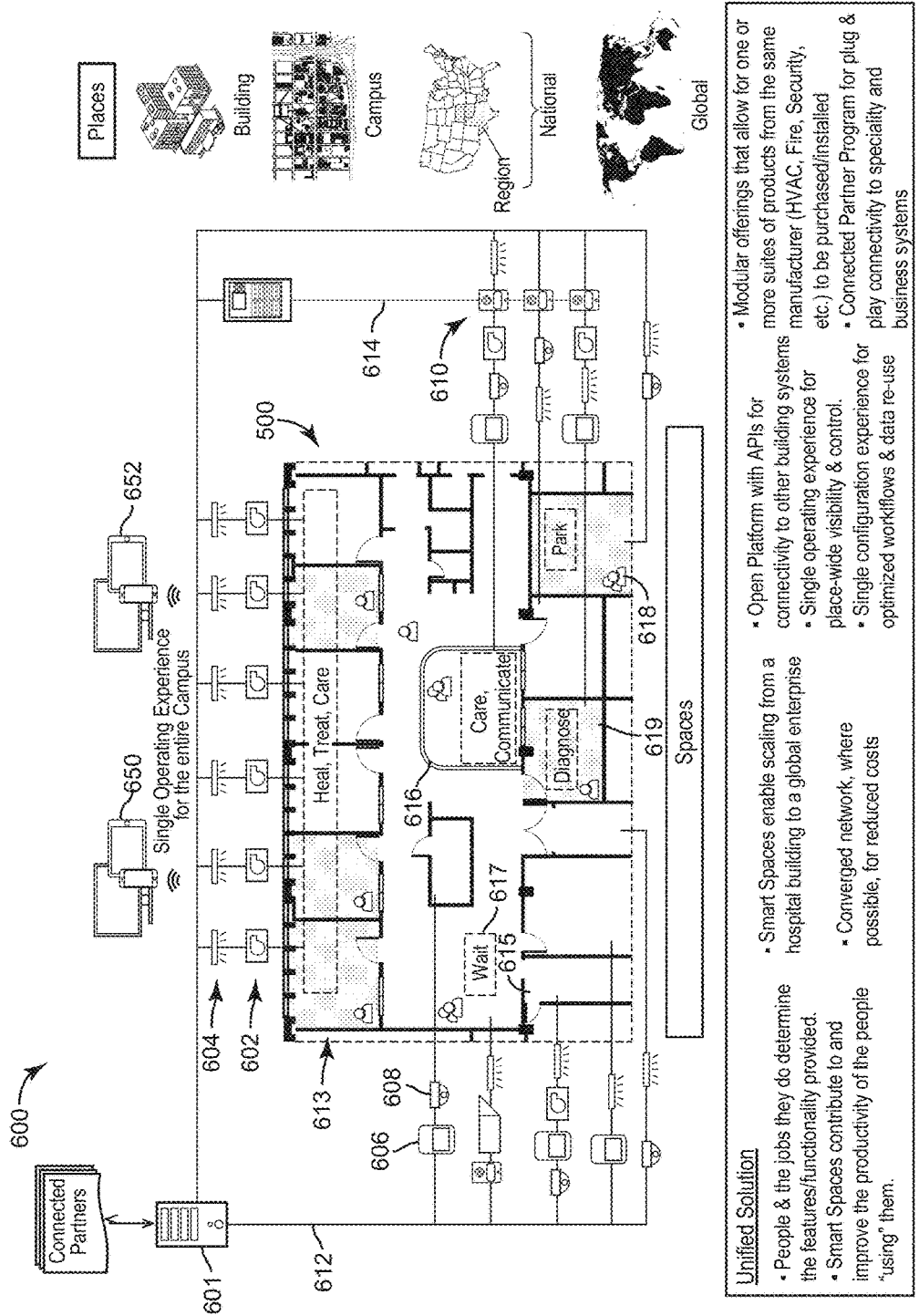
FIG. 6 is a diagram of a unified building management system with space control, according to an exemplary embodiment.

Referring now to FIG. 6, a unified building management system (UBMS) 600 is shown for a place. The UBMS 600 includes HVAC devices 602, lighting devices 604, access devices 606, video devices 608, and fire devices 610 that serve multiple spaces in place 500. The HVAC devices 602, lighting devices 604, access devices 606, and video devices 608 are connected via a common network (e.g., common cabling, shared wireless network). Fire devices 610 may also be connected to the common network and/or may have a separate network 614 as shown to provide extra reliability or redundancy for safety-critical functions and/or to comply with regulatory requirements. The devices 602-610 are communicable using a common protocol (e.g., BACnet, MSTP, LonWorks, TCP/IP) and are connected to a common server 601. The common network 612 saves costs, materials, time etc. in installation, operation, and maintenance as compared to the multitude of networks used for the combination of BDSs shown in FIG. 3. The common network 612 and the common protocol also facilitate other beneficial interconnectivity, interdependence, redundancy, etc. for the UBMS 600, as described in detail below.

In the UBMS 600, devices 602-610 are primarily associated with spaces in place 500 that the devices serve. Place 500 in the example of FIG. 6 is a medical facility that includes the following spaces: patient rooms 613, data center room 615, nurses' station 616, waiting room 617, outdoor area 618, and doctor's office 619. As opposed to dealing with what domain a device belongs to, the UBMS 600 focuses on spaces, the mission of a space, and the people that use those spaces. For example, patient rooms 613 are shown with missions "heal, treat, care," as well as with an HVAC device 602 and lighting device 604 for each, while the outdoor area 618 has the mission "park" and is served by a video device 608. The UBMS 600 manages and controls the devices that serve each space (e.g., each patient room 213) in order to fulfill the mission of the space. Facilitated by the removal of complexities and barriers found in simultaneous use of multiple BDSs, the UBMS 600 coordinates devices independent of domain to align devices, people, spaces, places, and missions. Further details and advantages of this approach are discussed in U.S. Provisional Patent Application No. 62/485,282 filed Apr. 13, 2017, and U.S. Provisional Patent Application No. 62/560,567 filed Sep. 19, 2017. The entire disclosures of both these patent applications are incorporated by reference herein.

Each of the physical spaces of place 500 is shown to include its own group of devices. Each group of devices may communicate via their own network. In this regard, each group of devices may independently service the particular space that they are in. Each group of devices may communicate via the common network. However, if one of the groups loses connection with the common network and/or common server 601 goes offline, that group of device may be self-sufficient and may operate without connection to the server 601 and the rest of UBMS 600.

Server 601 may be any computing system, server, controller, laptop computer, desktop computer, and/or other computing device or system that communicates with the device groups of the physical spaces (e.g., patient rooms 613) of building 500. Since each device group includes access systems, security systems, and HVAC systems, server 601 may communicate with and/or control each of the systems with no integration between various controllers and/or discrete systems. Further, there may be a single operating interface 650 (e.g., interface 400 of FIG. 37) that can run on a user device, server 601, and/or communicate with server 601. Similarly, there may also be a single configuration interface 652 that may run on a user device, server 612, and/or communicate with server 612. Operating interface 652 may be the same as configuration interface 616. Since the device groups of building 500 include a plurality of systems, operating interface 652 and/or configuration interface 650 may be a unification of devices across domains and allow a user to operate and/or configure the plurality of devices (e.g., devices for HVAC, security, access, video, lighting, fire etc.).

The devices (e.g., HVAC, fire, security, lighting, access, fire etc.) of UBMS 600 may be part of a single unified product offering. Further, the system may be module and the installation of UBMS 600 may be a single module installation. UMBS 600 may be integrated with partner systems and may include "deep" integrations between the systems of building 500 and partner systems. Further, the UBMS 600 may include standard open protocols and APIs that allow for third party systems to be integrated with UBMS 600.

Unified Control Architecture with Spaces and Places

Figure 7:
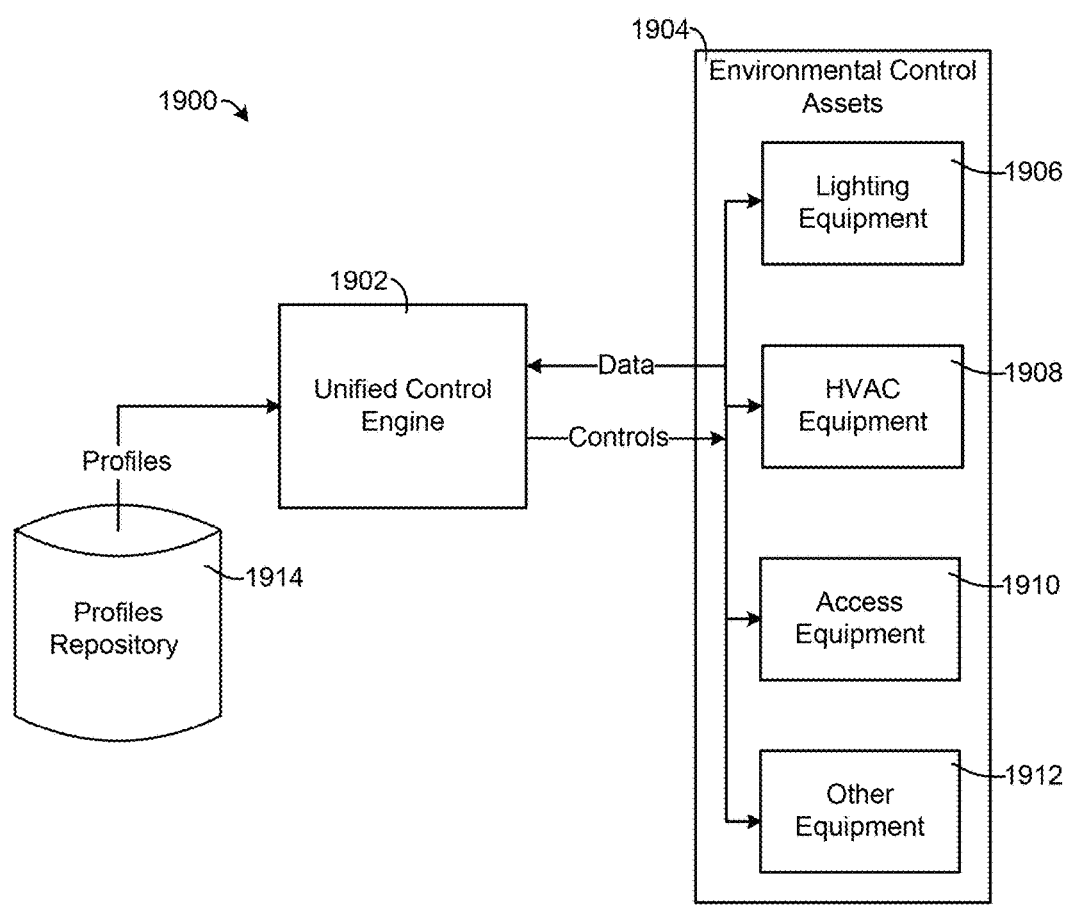
FIG. 7 is a block diagram of a unified control architecture for building equipment, according to an exemplary embodiment.

Referring now to FIG. 7, a block diagram of a unified control architecture 1900 is shown, according to an exemplary embodiment. The unified control architecture 1900 includes a unified control engine 1902 that controls environmental control assets 1904. The unified control engine 1902 may be implemented on server 601 of FIG. 6, may be implemented a space- or place-controller, may be implemented in the cloud, may be distributed among multiple computing resources, or may be implemented in some other way. In general, the unified control architecture 1900 overcomes the shortcomings of the isolated architecture 1700 and the integration architecture 1800.

The environmental control assets 1904 include various equipment, devices, sensors, actuator, etc. across multiple building domains that are operable to modify environmental conditions at a space or place or to collected data about the environmental conditions at the space or place. Environmental conditions include, but are not limited to, lighting levels, temperature, humidity, noise, locked/unlocked doors, blinds open/closed, windows open/closed, air pressure, and building alarms. Accordingly, FIG. 7 shows that the environmental control assets include lighting equipment 1906, HVAC equipment 1908, access equipment 1910, and other equipment 1912 (e.g., security equipment, fire detection and alarm devices, power systems, blinds).

To facilitate unified control in the unified control engine 1902, the environmental control assets 1904 are controlled using a common data model. The common data model ensures that controls and data can be communicated amongst the environmental control assets 1904 and between the environmental control assets 1904 and the unified control engine 1902 without the need for integrators/integration as in FIG. 5.

The unified control engine 1902 is structured to control the environmental control assets 1904 using a space- and place-based approach. That is, the unified control engine 1902 follows a control approach, described in detail below, using "modes" for the spaces or places. As used below, a mode is a state of a space or place (i.e., a state of the environmental control assets 1904 associated with that space or place) that corresponds to a purpose, mission, or function of the space or place as viewed by users. In general, modes may be associated with an operational mission of the space or place, a job to be done by a user in the space or place, or a situation triggered by an event. Modes are defined in profiles for the spaces or places (i.e., space profiles and place profiles), which are designed based on the purposes and missions that occupants have for the spaces or places. The spaces or places are thereby used as the unifying concept for control. The unified control engine 1902 is described in further detail below with reference to FIGS. 15-35.

To facilitate this space- and place-centric control, the unified control engine 1902 is shown in 1900 as communicably coupled to a profiles repository 1914. As described in detail with reference to FIGS. 16-17, the profiles repository 1914 stores space or place profiles that include the data, applications, modes, logic, etc. used by the unified control engine 1902 in providing unified control. More particularly, space and place profiles are provided for each of a variety of spaces and places, as described with reference to FIGS. 16-17 below. In setting up the unified control engine 1902, space or place profiles are loaded onto the unified control engine from the profiles repository 1914 and customized to meet the needs of particular spaces or places. The unified control engine 1902 can thereby be quickly and easily configured to provide the unified control features described in detail below.

Space-Centric and Place-Centric Approach

Referring generally to FIGS. 8-37, systems and methods for space- and place-centric control of devices of building equipment are shown, according to an exemplary embodiments. Devices of various building domains, including fire devices, HVAC devices, access devices, lighting devices, security devices, and/or various other devices may all serve a physical place. Within each physical place (e.g., building or campus), multiple physical spaces (e.g., lobbies, office spaces, cafeterias) may exist. The physical spaces may all be the same, similar, and/or may serve discrete and/or unique purposes.

Physical spaces may each have a unique requirement and thus, each physical space may include a variety of devices of various domains. The building management system unifies devices of various building domains in a single, unified building management system. Each physical space within a physical place may have a unique group of devices that serve the physical space. The group of devices includes any devices from any domains. For example, a group of devices for a particular physical space may include security cameras, entry access sensors, lighting devices, a thermostat, and/or air conditioning devices. The group of devices may be unified in a single system and/or run on a single network and/or may otherwise communicate among each other. The group of unified devices is configured to serve the physical space.

In this regard, there may be a particular control package for different types of spaces. For example, a hospital patient room may have a unique package of devices (e.g., nurse call systems, room pressure systems, security cameras, etc.) while a kitchen space may include a package of devices (e.g., a fire prevention system for ovens and open stove tops, a walk-in cooler, etc.) that serve the kitchen space. Each group of devices may be particular to a physical space and may be unified in a single system. Since each group of devices is unified, a control interface may grant a user access to control over all of the building systems and devices in a particular physical space and/or physical place.

In the systems and methods described herein, spaces and places have states and logic. A computation platform stores a state for each space and place and executes logic. The state and logic flows seamlessly between spaces, places, and devices.

In some embodiments, various physical spaces and places may have attributes in corresponding profiles. The profiles (i.e., space profiles, place profiles) can be stored on a central server of a place and/or on the devices of the physical space. Many possible attributes may be included in a space profile and or place profile, as described in detail here. As one example, attributes may indicate whether the space is "not critical," "permanently critical," or "dynamically critical." The attributes, not critical, permanently critical, or dynamically critical may indicate that a particular output and/or condition of the physical space should always be controlled, should never be controlled, or should be controlled based on certain inputs. For example, temperature may be a condition of various physical spaces that can be not critical, permanently critical, or dynamically critical. A CEO's office may have a temperature that is permanently critical, that is, any amount of energy should be used to maintain particular temperature setpoints within the CEO's office. In contrast, a laboratory may have a temperature control that is dynamically critical. When an experiment is in progress, the laboratory is critical. When an experiment is not in progress, the laboratory may be not critical. The temperature control may be stricter when the laboratory is 'critical'; for example, criticality may be directly proportion with control deadband width. Finally, a hallway or an entry way may be not critical.

The various inputs that may change a dynamically critical space from being critical to not critical or not critical to critical may be various occupancy data, schedules for the physical space, indications for access control systems (e.g., doors opening and/or closing), etc. Occupancy data may be gathered from occupancy sensors within a physical space, reservations of the room received from a room reservation system, network traffic at access points, and/or meeting schedules received from calendar programs and/or systems. A physical space that is dynamically critical may change from being not critical to critical based on various outcomes or goals that are associated with the physical space. For example, an operating room that is scheduled to be in use or is currently in use is a critical space. If the operating room is not being used or is undergoing routine maintenance, the operating room is not a critical space.

Various physical spaces and places have various outcomes or goals that drive the behaviors of the physical devices within the spaces. In some embodiments, a space profile indicates that a particular space has a particular goal. For example, the devices of a particular physical space may operate to achieve the goal for the space. The devices may store relationships with each other that the devices may utilize to achieve the various goals. Further, a physical space may have multiple goals and thus the devices of the physical space can be configured to prioritize. In some embodiments a goal for a particular space may rely on prioritization of goals, occupant experience within the physical space, and objectives of each device within the physical space. Various goals and/or objectives of the various devices of a physical space may include setpoints. However, the goals may also include energy usage, lighting levels, and/or any other goal.

In some embodiments, devices of a physical space may operate differently at different periods of the day. For example, in the morning, the elevator system of a particular physical space may queue all of the elevators on the ground floor. The devices of physical spaces may make predictions as to when occupants are in the physical space and where occupants are within the physical space to efficiently operate the space. For example, based on user schedules, at a certain time on a certain day, a large number of individuals that have offices on a first floor of a building may have meetings on a fourth floor of a building. For this reason, a predefined amount of time before the meeting, the elevator system may move unused elevators to the first floor. A predefined amount of time after the meeting ends, the elevator system may move unused elevators to the fourth floor.

As another example, based on the number of people that have been within a space, a notification system for cleaning personal may be notified that the space needs to be cleaned. For example, if devices in a bathroom space indicate that a large number of people were in the bathroom, the notification system may notify cleaning personal that the bathroom needs to be cleaned. In some embodiments, the system may indicate that the bathroom should be cleaned at a particular time, a time which few people are detected in the bathroom space and/or a time that there are predicted to be a low number of people in the bathroom space.

More generally, the devices corresponding to a space or place are operated based on modes that correspond to operational missions of the space or place, jobs to be done in the space or place, and situations/events corresponding to that space or place. These modes may influenced by the type of space (i.e., goals, missions, events, functions of the space), time/periods of day, number of people in a space, detected events in a space (e.g., intrusion, fire, patient health emergency), and any other relevant factor.

In some embodiments, a central server of a place may collect information from a plurality of spaces. Based on the type of each physical space, the central server may perform machine learning to improve the performance of the systems and devices in the spaces and/or to meet goals for the physical space based on aggregate sets of data for like spaces. The machine learning may be trial and error learning. For example, the central server may attempt an improvement to a particular physical space, cause the devices of the space to affect the improvement, and monitor the performance of the devices of the space to determine if the improvement is effective. If the improvement is effective for one space, the improvement may be tested on other physical spaces. If the improvement is not effective, the devices of the physical space may cease to utilize the improvement.

In one example, a place server may determine that one office space of a building uses 20% less energy daily than other office spaces of the same place. The place server may determine that the devices of an office space that is operating energy efficiently are utilizing occupancy trends, over a predefined amount of time, to control the temperature of the energy efficient office space. The central server may cause the devices of the other office systems to similarly utilize the occupancy trends of the energy efficient office space to improve the energy usage of the other office spaces.

When a user decides to design a control package, a group of devices and systems needed for a particular physical space and the application/logic to monitor and control the physical space, a user may leverage from a repository a space profile for the physical space (or a place profile for a place) to facilitate the creation of the control package. A space profile may be a profile for a physical space that is stored on a controller and/or other device. A user may indicate requirements for the particular physical space (e.g., size of the space, unique needs of the space, price for the space, how the space will be used, etc.), for example on a web ordering platform. Corresponding space profile(s) can be generated that indicate a selection of devices for the physical space in addition to a purchase price for the set of devices and an operating cost for the physical space based on the selection of devices. The space or place profile may further be used to generate control packages for each space type, which control how the physical devices of a space operate. For example, a space profile may indicate that a particular physical space needs to be kept at a constant temperature, regardless of energy usage. Using this information and all other information across building domains from the space profile defining the space design, a space control package will be generated to control the space. This may be the case for merchandise storage spaces and/or data centers.

Spaces which are controlled by a group of devices may share data among each other. In this regard, groups of devices in a place (i.e., groups of devices from multiple spaces) receive place wide data and can be configured to operate based on place wide data. In some cases, the place wide data is used to perform root cause analysis, determine improvements for various spaces of the building, and/or select device replacements. In one example, the devices of a west lobby and the devices of an east lobby space may share usage data with each other. In some embodiments, the devices of each physical space determine that they are located in a similar type of space, a lobby space, and thus should share data to improve their functionality. In some embodiments, a central server or controller aggregates the information from a plurality of spaces, including the east lobby and the west lobby and determines that the spaces are similar and thus each space should utilize the data of the other space to improve the operation of the devices in the space. Either the devices and/or the place server can determine which group of devices of which physical space are operating more efficiently and/or achieving the various goals of a particular space. The various differences of the devices of the two spaces can be compared to determine what particular settings, schedules, and/or other configuration information should be utilized by the spaces to improve the functionality of each space.

The devices of physical spaces interact with of other devices in the physical space. More particularly, in some examples, one device from one domain detects an event and a device from another domain confirms the event or provides more information about the event. Mode logic as described in detail below describes how these devices may work together. In some cases, devices communicate directly with one another, while in other cases devices communicate with a controller, control engine, server, etc. that facilitates an interaction. As a particular example, a smoke detector may detect smoke indicating a potential fire that triggers an emergency fire mode to execute based on the space control package. Security cameras in the space may then be used to automatically verify if fire exists (e.g., through image recognition in the video feed(s)) and determine the location of the fire. Depending on the space type (i.e., as indicated by the space profile and/or control package), smoke control may be initiated through HVAC devices serving the space and/or place.

Many such cross-domain features are possible with the systems and methods of the present disclosure as described in detail below.

Further, devices within a physical space is associated by a controller with the particular type of space that they are located in (e.g., using a space profile). For example, a camera may be associated with a storage space. In response to detecting movement, the camera may automatically begin to record a video feed since the camera is in a storage space in which occupants should not usually be. In contrast, another camera may be located in a front lobby of a building. The camera may store information that indicates to the camera that the camera is located in a building lobby and thus, the camera may only be configured to begin recording a video feed when the camera detects movements between certain hours of the night (e.g., 11:00 P.M. and 5:00 A.M.).

When defining a space profile for a physical space via a controller or other computing device, a user may first select a space type. For example, a user may select a lobby space profile. The user may indicate, via the computing device, one or more parameters for the space profile. The computing device may create an estimate for purchasing the equipment for the physical space and also to create an estimate for operating the physical space. The computing device may also be configured to generate estimates for entire buildings, physical places, enterprises, etc. Based on the space profile, a space control package is generated.

For example, when generating a place profile for a physical place, a user may indicate, via a computing device, what the various physical spaces of the physical place are and what configuration each space needs. Based on the aggregate of all of the profiles for the spaces, a purchase estimate for the equipment/devices of the entire physical place can be determined in addition to an operating cost for the entire physical space. For example, for a hospital building, a user may create one or more profiles via a computing device that are profiles for patient rooms, offices, laboratories, cafeterias, and lobbies. The user may then indicate, via the computing devices that there are a particular number of patient rooms, offices, laboratories, and cafeterias in the physical place. The computing device may generate a device cost and an operating cost for the physical place based on the space profiles and the number of each space profile within the physical place. Based on the place profile, a place control package is generated.

These and other features of the building management system are described in detail below.

Figure 8:
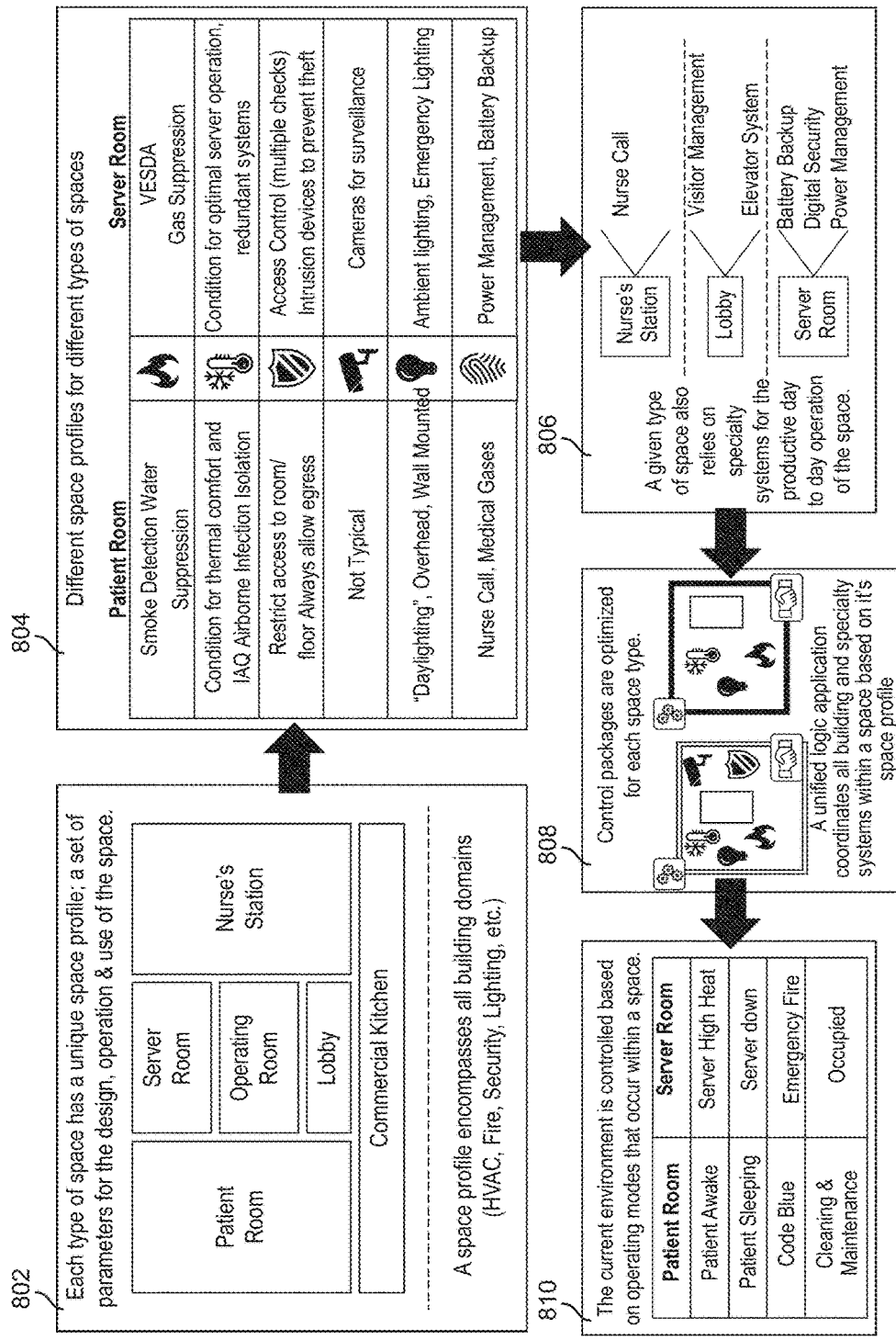
FIG. 8 is a diagram of the differences between space profiles, according to an exemplary embodiment.

Referring now to FIG. 8, an illustration of space profiles is shown, according to an exemplary embodiment. Occupants of a physical place may experience the operation of the devices of the physical place. For this reason, each space profile 708 may be tailored based on requirements for the physical space that space profile 708 represents. Space profile 708 may include requirements for the design and operation of a physical space. Each space profile of a place may be tailored for a particular physical space such as a patient room in a hospital, an office, a kitchen, a lobby, a data center, storage space within a place, etc. Each space profile may have unique scheduling and/or usage goals. Each of these physical spaces may need to be operated in a unique way and may need a unique package of devices (e.g., HVAC, fire, security, lighting, etc.). For this reason, each space profile that represents a physical space must include information pertaining to the unique way in which the physical space needs to operate.

As an example, a patient room has a different space profile and design than a server room. Various goals, functions, and devices in the spaces are different, as indicated by the block 804 and reflected in the space profiles. In the example shown, a patient room requires environmental conditioning for thermal comfort and for airborne infection isolation, while a server room requires environmental conditioning for optimal server operation. Other differences between the patient room and the server room include camera surveillance in the server room but not the patient room, levels of access restrictions, and inclusion of particular specialty systems (e.g., nurse call system for the patient room and battery backup for the server room). The space profiles associated with the patient room space profile and the server room space profile may include information pertaining to the equipment which each of the physical spaces requires.

The space profiles associated with each of the physical spaces may include indications of the equipment that they require. For example, the space profile of the server may indicate that the space requires and/or uses cameras for surveillance and/or access control devices. In contrast, the space profile of the patient room may indicate that the patient room space does not need and/or have surveillance cameras and should include access devices that allows allow egress.

In block 806, various physical spaces are shown to require various specialty systems. For example, a nurses' station may require a nurse call system (e.g., a system that allows patients to call for nurses, for nurses to communicate amongst one another, etc.). A lobby may require a visitor management system and an elevator system. A server room may require a battery backup system, a digital security system, and a power management system.

In block 808, various control packages are shown for a particular physical space and/or place. For example, based on the specialty systems of block 806 and/or the various requirements and/or purposes which a physical space serves, as illustrated in block 804, all of which are defined in the space profile, a particular control package for a particular physical space can be required. Thus, the control package is built based on the requirements/functions of a space across multiple domains, rather than for individual building domain systems independently.

For example, a physical space may require various HVAC devices, lighting devices, security devices, access devices etc. In some embodiments, a web ordering system, server, cloud-based computing resource, etc. can be configured to receive a plurality of requirements for the physical space and generate a space profile for the physical space. Based on the space profile, a package of devices and systems for the space can be selected and/or generated. In some embodiments, the system can generate a prediction of a cost for outfitting a place (e.g., a plurality of physical spaces) and/or for a particular physical space with building devices (e.g., HVAC, security, access, lighting, etc.) based on each space profile require for each physical space and associated control packages. Further, the system, based on the space profile, can generate an operating cost prediction of a physical space and/or entire place.

For example, a web-based ordering system may receive an indication of a number of space profiles for physical spaces of a particular physical place (e.g., a building) and a number of requirements for each space profile. The web-based ordering system can be configured to generate a plurality of control packages indications for the physical spaces of the place based on the space profiles. Based on the plurality of control packages indications, the web-based ordering system can generate a cost estimate for outfitting the place with the various building devices identified in the control package identification.

The control packages are structured to control spaces or places (i.e., devices in the spaces or places) based on modes for those spaces. For example, block 810 various modes for the patient room and the server room. The patient room may have different modes for when the patient is awake and for when the patient is sleeping. The patient room may also have a situation mode for a code blue (i.e., for a patient medical emergency). The patient room may also have a job-to-be-done mode for when cleaning and maintenance needs to be done in the room. The server room has a different set of modes as a space with a substantially different mission and purpose than the patient room. The server room has modes for server high heat and for server down. The server room has a situation mode for when a fire occurs in the server room or in the place that houses the server room. The server room also has a job-to-be-done mode for when the server room is occupied by someone seeking to complete a task related to the servers or the room. Mode-based control for spaces and places is described in further detail below.

Figure 9:
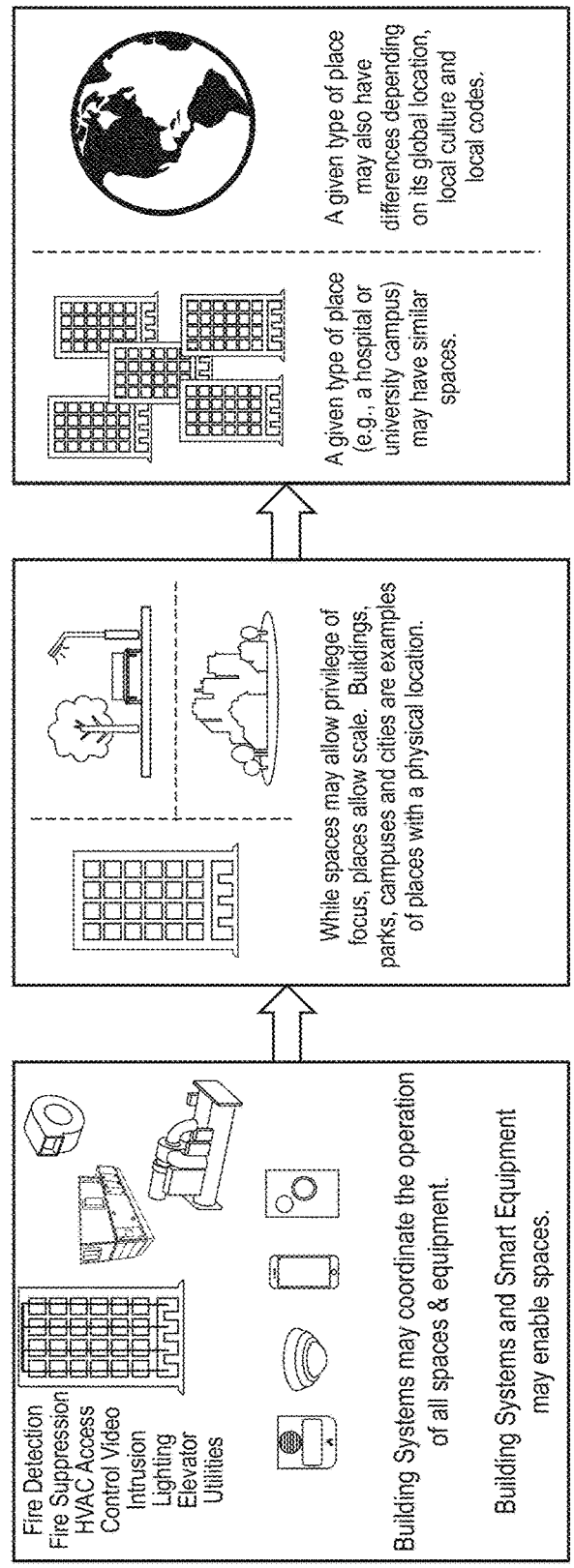
FIG. 9 is a block diagram of physical spaces, according to an exemplary embodiment.

Referring now to FIG. 9, blocks 902-906 are shown to further illustrate physical places, according to an exemplary embodiment. Devices, including fire devices, security devices, HVAC devices, lighting devices, access devices, etc. may coordinate together and operate to serve various physical spaces of a place. Since physical places, such as a building, are made up of various physical spaces, a place profile can be scaled to include any number of space profiles. For example place profiles for buildings, parks, campuses, and/or cities can include any number of place profiles and thus any sized physical place can be digitally represented as a place profile with a plurality of space or place profiles.

Various physical places may be similar and thus the space profiles representing physical spaces of one physical place may also be applicable to represent physical spaces of another physical place. For example, a physical lobby space for a hospital may be the same and/or similar to the physical lobby space of a university. Space profiles may be similar but may have differences that take into account the location of the physical space, the local culture, and/or local building codes.

Figure 10:
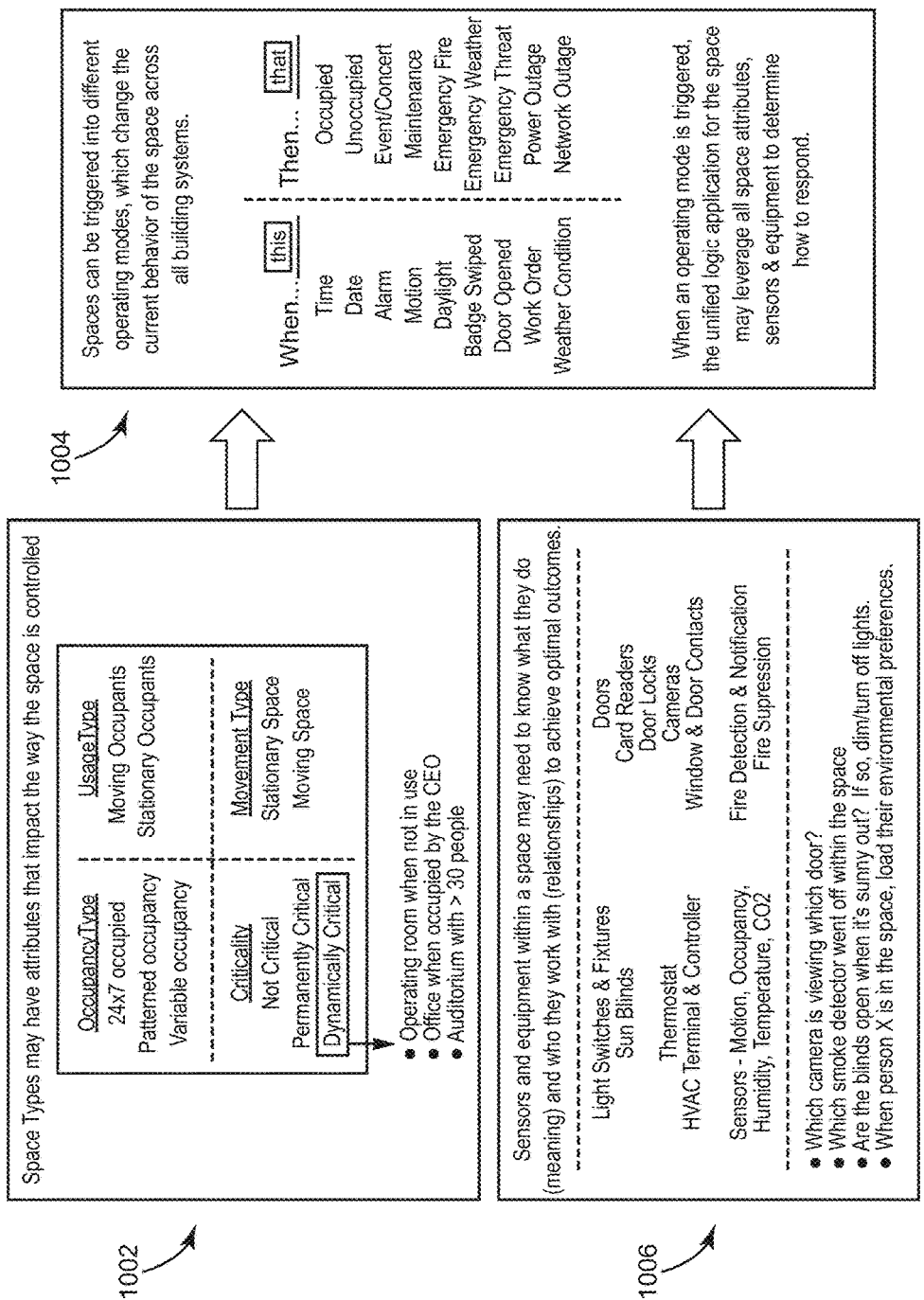
FIG. 10 is a diagram of the behaviors of devices in a space, according to an exemplary embodiment.

Referring now to FIG. 10, various attributes of physical spaces are shown, according to an exemplary embodiment. At block 1002, each physical space is shown to have various attributes. In some embodiments, the space profile for the physical space may include these attributes to accurately represent the physical space. A controller may use the various attributes of a space profile to operate and/or control the physical space. For example, a space profile may have various occupancy type attributes. For example, an occupancy attribute may be a constant occupancy, a patterned occupancy, and/or a variable occupancy. Based on the occupancy attribute, the place system can control and/or condition the physical space based on the occupancy type attribute.

Further, the space profile may have a usage type attribute such as a flexible space, a fixed space, and/or a virtual space.

Further, the space profile may have a criticality attribute. The attribute may be not critical, permanently critical, and/or dynamically critical. For example, the temperature of a physical office space may not be critical while the temperature of a physical storage space storing food and/or other merchandise may be permanently critical. In other embodiments, a patient room may have a space profile that is set to dynamically critical. For example, when a patient room is unoccupied, no patient is in the room, the patient room may be not critical. However, when a patient is in the room, the patient space may be permanently critical.

In some embodiments, the space profile may have a usage type attribute. In some embodiments, the movement type may be a stationary attribute or a moving attribute. For example, a space profile for an office may have a stationary space attribute while a space profile for an elevator, train cabin, airplane cabin, space aboard a ship, etc. may have a moving space attribute. Spaces with a moving space attribute have different requirements based on where the space is. For example, an airplane cabin has different requirements when the plane is in the air (e.g., pressurized, locked doors) than when the plane is on the ground (unpressurized, allow entry/exit). Thus, the moving space attribute corresponds to a dynamic status/location attribute that indicates when the space has moved or is moving.

In some embodiments, the space profile has an occupancy type attribute indicating how/when people occupy the space. The occupancy type may be at least one of constant occupancy (indicating that the space is always occupied), patterned occupancy (indicating that the space is occupied at certain times of a day), and variable occupancy (indicating that the occupancy of the physical space changes based on reservations of the physical space, for example based on a meeting/event calendar system).

In some embodiments, the space profile has a usage type. A usage type indicates the activity of occupants within the space and the heat generated by the occupants. The usage type may be stationary occupants (indicating that occupants are stationary in the space and may give off relatively little heat) and moving occupants (indicating that occupants are moving in the space). For example, a gym may have a usage type indicating high occupant activity in the space, while an office may have a usage type indicating stationary occupants.

At block 1004, a controller controls a physical space based on modes for the space, as shown for some embodiments. Modes can be defined based on various criteria, for example as listed in block 1004. Mode-based control is described in detail below. The controller can be configured to operate a particular space based on various events. Based on various events, conditions, operational statuses, etc. relevant to a space, a controller may execute an application that leverages the attributes of a space profile and determines an appropriate mode.

At block 1006, the relationships between various devices associated with a physical space are illustrated. A controller may determine relationships between various devices in a physical space and meanings for those relationships, or may be given the relationships based on a common data model for the devices and UBMS 600. For example, lighting devices and blinds of a physical space may have a relationship such that if the blinds are open and light is detected by a light sensor, the lights of the physical space may be turned off and/or dimmed by the lighting devices. Further, based on what smoke detectors go off in a physical space, a controller may notify occupants to exit the physical space via a particular egress point of the space to avoid a detected fire.

Further, the controller can be configured to adjust various environmental conditions based on the identity of a particular individual in a physical space. For example, an individual may have particular environmental preferences tied to a user profile and thus when that particular individual enters a space, the controller may cause the space to be conditioned to the environmental preferences of the individual.

Figure 11:
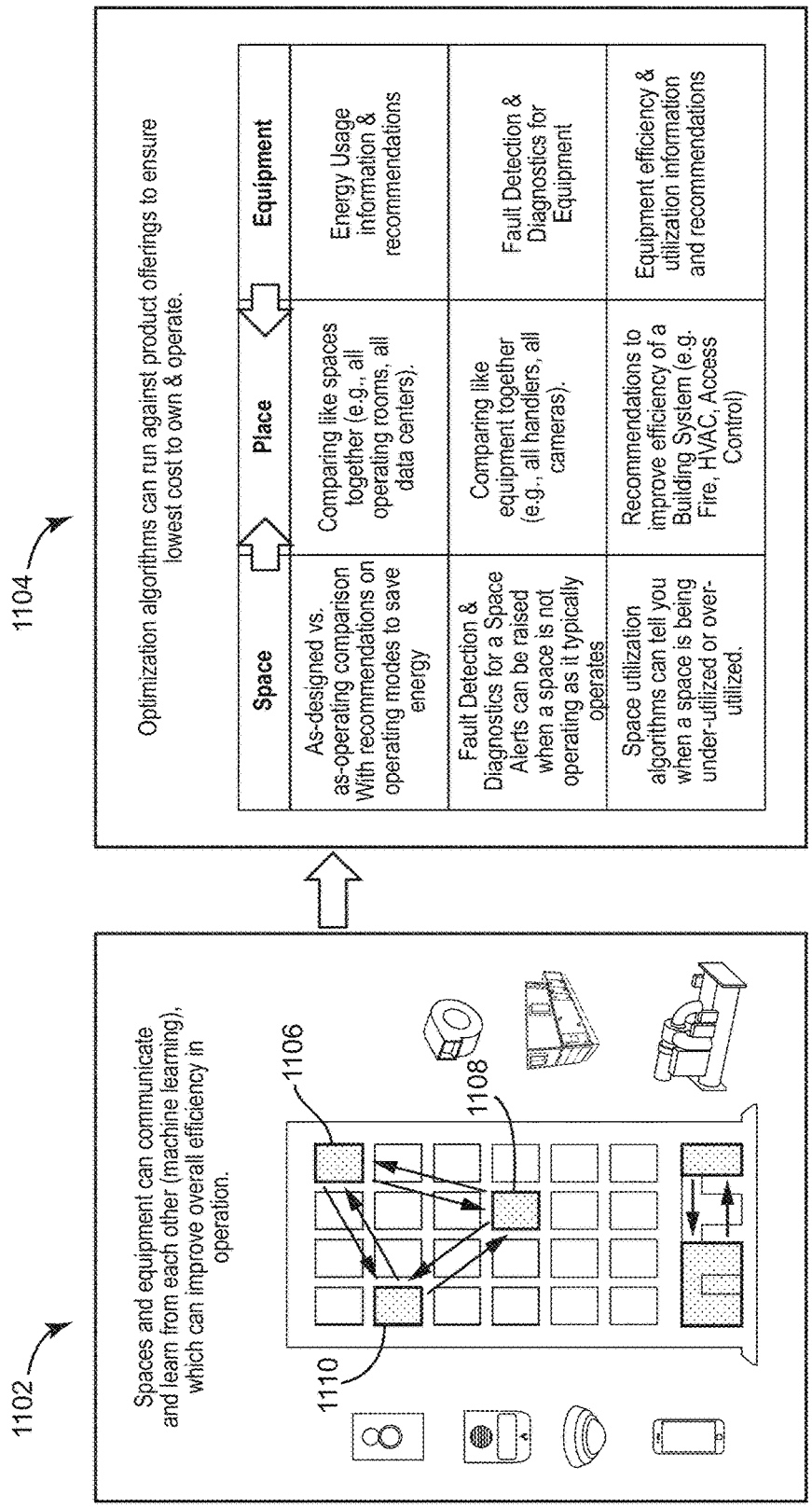
FIG. 11 is a diagram of device groups of a place communicating, according to an exemplary embodiment.

Referring now to FIG. 11, an illustration of systems utilizing system performance data in multiple physical spaces to improve system performance, according to an exemplary embodiment. At block 1102, the devices of various physical spaces (including controllers for those spaces) are shown to communicate. The devices of physical space 1106 are shown to communicate with the devices of physical spaces 1108 and 1110. Similarly, the devices of physical space 1110 are shown to communicate with the devices of physical space 1106 and 1108 and the devices of physical space 1108 are shown to communicate with the devices of physical spaces 1110 and 1106, according to some embodiments. The devices of each of physical spaces 1106-1110 may be a particular group of devices such as device group 602 of FIG. 6. The devices of each physical space can use machine learning and the data received from other devices of other physical spaces to improve their performance. In some embodiments, the devices of the physical spaces that communicate are located in different buildings, cities, and/or countries.

As an example, multiple offices along the west side of a building can optimize their heating and lighting use to account for the sun in the afternoon providing 'free' light and heating. However, in some cases only one of the offices has an ambient sensor installed that can measure the sun's influence. In such a case, the first office can optimize and then share the needed information with other offices (i.e., other spaces) so that the other office can optimize as well even though the other offices lack the relevant sensor.

At block 1104, an illustration for comparing operating data of the devices of physical spaces against each other to minimize operation costs and to determine improvements is shown, according to some embodiments. A central controller of a place, a central server, and/or one of the devices of physical spaces 1106-1110 can be configured to use data gathered by various devices of spaces 1106-1110 and the types of the physical spaces of physical spaces 1106-1110 to determine operation configurations to achieve low operating costs.

For example, as shown in block 1104, a device can receive energy usage for a plurality of devices that indicate the energy usage of a plurality of physical spaces. The device can compare the energy usage of like spaces. For example, energy usage of an operating room can be compared against the energy usage of another operating room, the data for multiple data centers can be used together, etc. Further, the data from multiple building lobbies can be aggregated and used to determine improvements for the building lobbies. The device can determine which particular physical spaces are performing at a high level and identify differences between low performing physical spaces and high performing physical spaces. For example, a first data center may have a particular type of battery backup system while a second data center may have a second type of battery backup system. The device can determine that the second data center may be consuming less energy. In this way, the device may generate a message instructing an owner of the first data center to consider upgrading the battery backup system. In another example, the first battery backup system may operate with a first configuration while the second battery backup system may operate with a second configuration. The device may determine that the first battery backup system is using less energy than the second battery backup system and the second battery backup system may attempt utilizing the first configuration instead of the second configuration.

Comparisons can be made across spaces to determine if one space is exhibiting outlier behavior that could be an indication of a problem with the space. This peer-space analysis may be done for all devices across domains in a space, as opposed to just at the device level as done conventionally. For example, comparisons can be made by a device to compare fault detection and diagnostics for one physical space against another physical space. A device may determine that the devices of one physical space are sensing a higher number of faults than the devices of a second physical space. For this reason, the device may notify an owner of the first physical space that their equipment may need servicing since there are an unusually high number of faults being detected for the devices of the first physical space as compared to the devices of the second physical space. Another comparison can be made regarding space utilization of physical spaces. For example, based on equipment efficiency and utilization of a first physical space, a device can determine that a second physical space needs improvements based on the space being over utilized (e.g., having occupancy greater than a predefined amount). The device may notify an owner of the second physical space that they may need to upgrade and/or purchase new equipment.

In some embodiments, a device associated with a particular space can make a comparison against how the space is operating to how the space should be operating. The device may determine various modes that can be used to save money in the space based on this comparison. Further, if a space is not operating how it usually operates, a device of the space may generate an alarm. Further, a device associated with the space may determine whether the space is being under-utilized or over-utilized.

In a single physical place, a server and/or other device of the physical space may compare all similar physical spaces of the physical place to determine performance of all the spaces. Further, the device can compare data gathered from all similar equipment (e.g., from all air handlers, all cameras, all thermostats, etc.) of the physical place against each other to determine what equipment is not functioning properly and/or needs to be replaced. A device associated with the physical place can be configured to make recommendations to improve the efficiency of the physical space.

Figure 12:
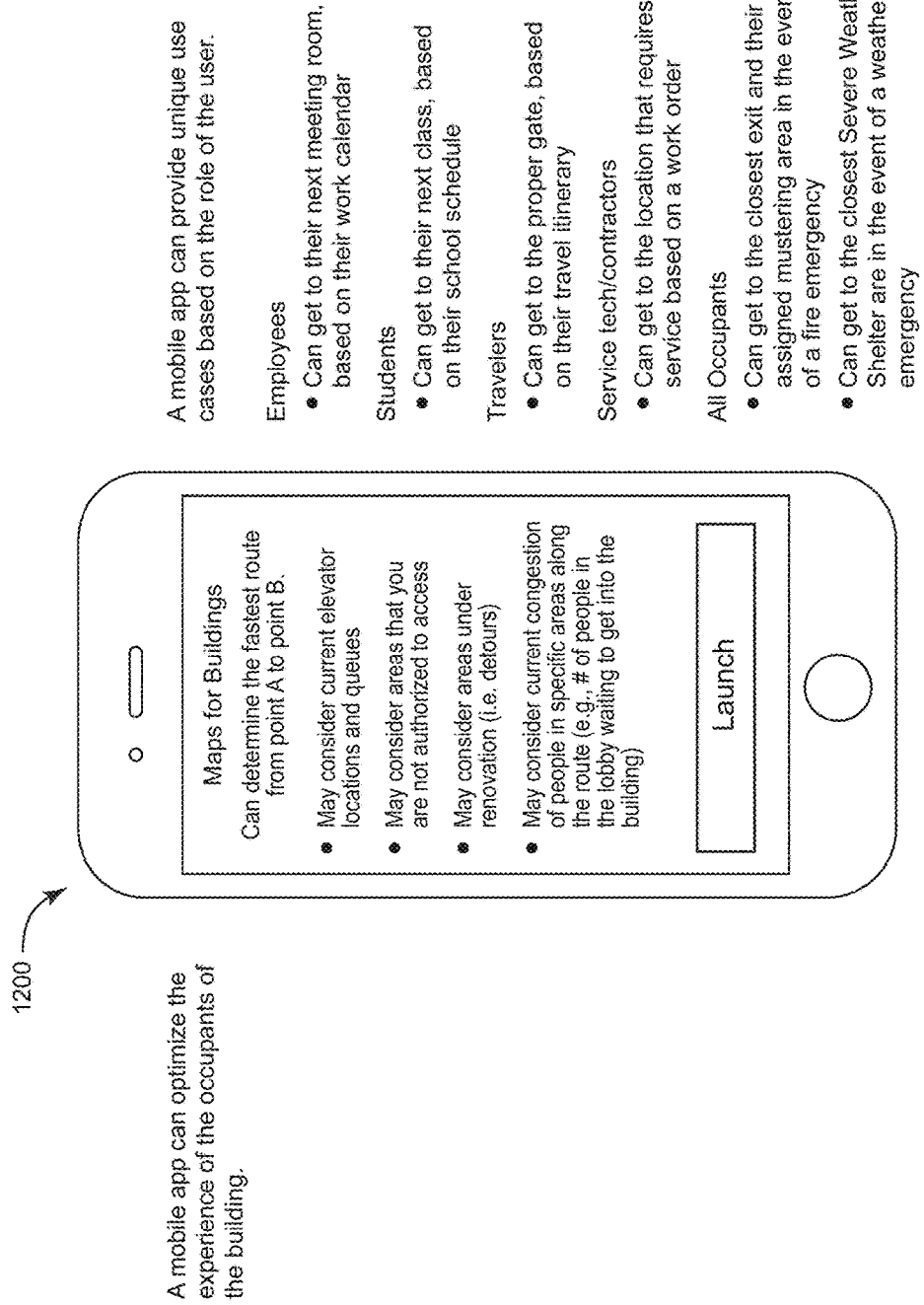
FIG. 12 is a diagram of a mobile device for navigation within a place, according to an exemplary embodiment.

Referring now to FIG. 12, a mobile device 1200 is shown that may include a navigation application for a place. The mobile application may communicate with a central server such as server 612 of FIG. 6. Thus, the mobile application may receive information relating to some and/or all of the systems of a particular place. The application may leverage this information when directing an occupant through a place.

In general, the navigation application is an example of how space control and space profiles can be applied to easily make place-based applications. Each space knows about all domains and can communicate with others, thus allow decisions to be collective made based on the space data.

More specifically, the navigation application may help a user navigate through a place. For example, the application may determine the fastest route through a place from one point in the place to another point in the place. The application may take into account elevator usage (e.g., elevator queues), the locations of elevators, and other factors (spaces under construction, access-restricted spaces not available to the user, etc.) when determining the fastest route from one point in the place to another. In this regard, the application may be connected to the various devices of the place, space controllers and/or a master controller of the place (e.g., server 601 of FIG. 6). Further, the application may take into account areas of the place that a user may or not have access to. For example, a laboratory may be only accessible to certain individuals. A route through the laboratory may be the fastest route. However, the application may only recommend the route through the laboratory if the user has access to the laboratory, for example, if the user has key card access to the laboratory.

Further, the application may consider areas of the place that are currently being renovated. Information regarding renovations may be received by the mobile application from a place server, and the place server may receive such information from space controllers for areas under construction. In this regard, the application may instruct the user to take a different route through the place to avoid the area of the place that is under renovation. Further, based on occupancy information (e.g., Wi-Fi occupancy, occupancy sensors, camera based occupancy detection) the application may determine congestion of various areas of the place and/or may suggest alternate routes through a place based on the congestion of various areas of the place. Further, the application may display the congestion of various areas of the place on the application. In some embodiments, the application may take into account the number of people waiting for an elevator, the number of people in a lobby waiting to enter the place, etc.

In some embodiments, the application may take into account the identity of a user of the application (e.g., employee that works in a place, a student in a school, a traveler, a service technician or contractor) when generating directions for the user. For example, for an employee of a place, the application may have access to a meeting schedule and/or an outlook calendar of the employee. In this regard, the application may direct the employee from one meeting room to another meeting room or from a desk and/or office to a particular meeting room. For students, the application may direct a student from one classroom to another classroom based on a class schedule. For a traveler, the application may act as a travel itinerary and may direct a traveler to a particular flight gate inside an airport terminal. For a service technician the application may direct the service technician to a particular location in a place that requires service. For example is a worker in an office is having a computer malfunction, the application may notify the technician of the individual who needs and/or is requesting help with their computer and the application may direct the technician to the desk of the individual requiring computer help. In this regard, the application may receive service requests from users and/or from a place server.

The application may notify a user of the nearest accessible exit in the case of an emergency (e.g., fire) and/or may provide evacuation instructions and/or directions to evacuate the place. Each space knows (e.g., a controller serving that space determines) if that space is being impacted by the fire (smoke, fire, etc.), so that occupants are directed away from impacted spaces as they evacuate the place as directed along the least-busy or most efficient route. Further, the application may be configured to direct a user to the nearest weather shelter when the application receives information pertaining to a weather emergency. The application may store this information locally on the mobile device that the application runs on and/or may receive the information from a place server.

Figure 13:
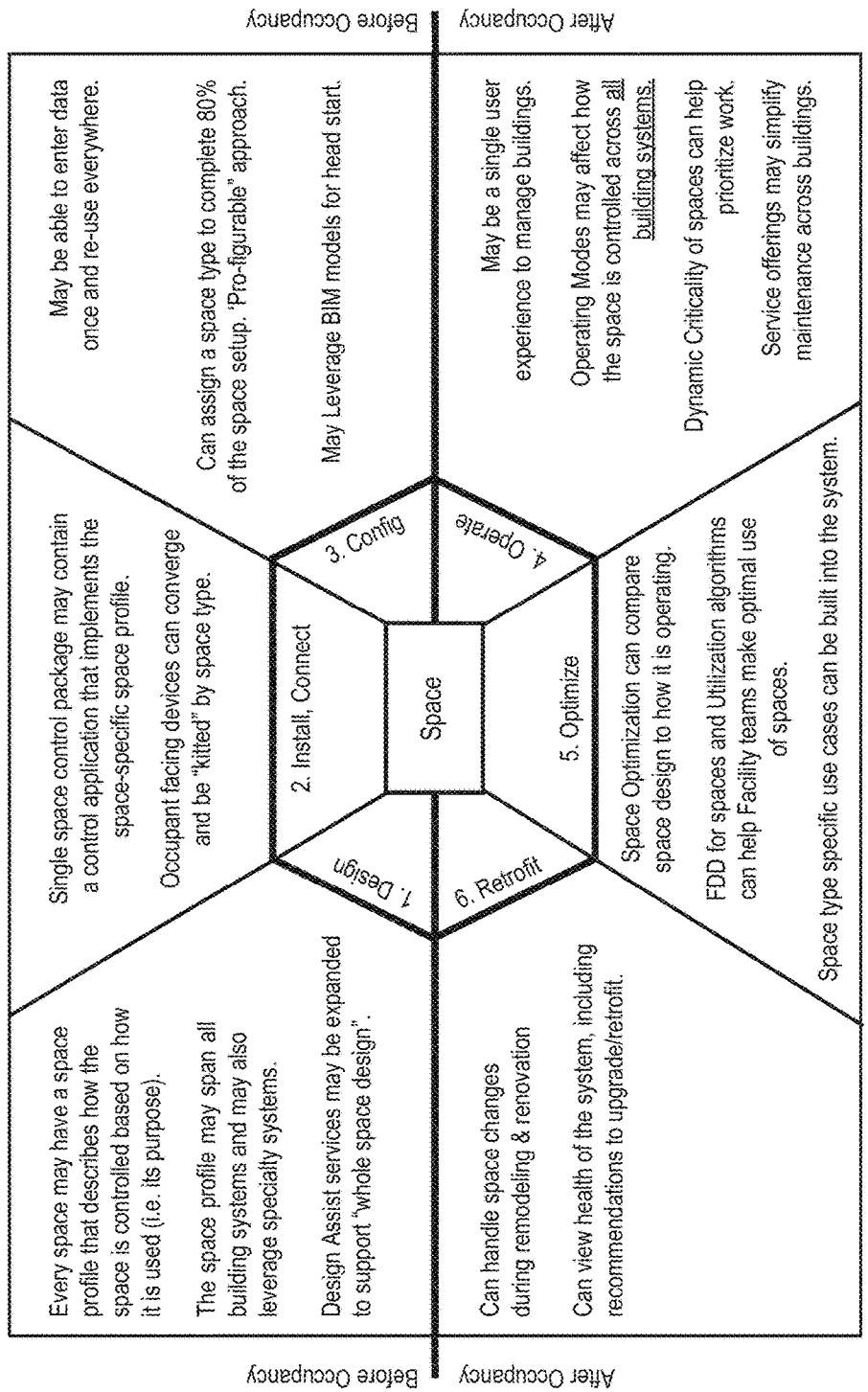
FIG. 13 is a diagram illustrating application of the space-centric approach in each phase of a building lifecycle, according to an exemplary embodiment.

Referring now to FIG. 13, design of equipment for a physical space, installation of the equipment, and operation of the equipment in the physical space with the space-centric approach is illustrated, according to an exemplary embodiment. A physical space may have a corresponding space profile that is used when designing the physical space (for example, as shown in FIG. 8). The space profile may be a profile that acts as a representation of the physical space which a user is trying to design. Particular attributes and/or other information of the space profile may define the intended use of the physical space. The space profile of the space may include all devices (e.g., fire, HVAC, security, access, lighting, etc.) that will need to be used in the physical space (as shown in block 806 of FIG. 8). In some embodiments, the physical space requires specialty systems (e.g., a walk in cooler, a battery backup system).

A space profile may indicate that the physical space that it represents has various objectives based on how the space is used (e.g., as shown in block 804 of FIG. 8). For example, the objectives may dictate that a patient room requires environmental conditioning for thermal comfort and for airborne infection isolation, while a server room requires environmental conditioning for optimal server operation. Other differences between a patient room and a server room include camera surveillance in the server room but not the patient room, levels of access restrictions, and inclusion of particular specialty systems (e.g., nurse call system for the patient room and battery backup for the server room). The space profiles associated with the patient room space profile and the server room space profile may include information pertaining to the equipment which each of the physical spaces requires.

A control and device package for a particular physical space is installed and configured that controls devices across all domains for the entire space, based on the space profile. The package may include HVAC devices, fire devices, access devices, etc. as well as controllers, applications, etc. The devices may be installed in the particular space and interconnected.

In some embodiments, the space may be based on a predefined profile. For example, there may be a patient room profile, a lobby profile, etc. The profile for the space may be adjusted based on various unique attributes and/or features of the particular space. In some embodiments, a user may generate a particular space profile and reuse the profile for various spaces of a place. For example, every patient room of a hospital may be based off a single user defined patient room profile. In some embodiments, the configuration of the space may rely on building information modeling (BIM) of a particular space.

A single user interface (e.g., the interface described in FIG. 37 below) may allow a user to operate all systems of the physical space (e.g., HVAC, security, access, fire, lighting, etc.). The physical space may be operated in particular modes, these modes may have settings for all of the domains of the space. The settings and/or the modes can be selected via the single user interface. Further, the spaces can be dynamically critical and can operate based on the criticality level of the space and the criticality attribute of the corresponding space profile.

A physical space may be optimized based on operating data and the space profile for the physical space. The space profile may indicate a particular efficiency of the physical space and thus the operation of the systems of the physical space can adjust based on data of the various systems. The systems of the space may utilize machine learning or other learning techniques to determine how the physical space is currently operating and adjust the operation of the systems to meet a particular operating goal. A space controller of the physical space may use various utilization processes that can improve the performance of the devices of the physical space. The space profile for the physical space can be adjusted when the physical space is remodeled or renovated, that is, when the space type and purpose changes. Whether or not equipment needs to be installed or removed is determined by the differences between the space types: in some situations, no changes to the physical devices in the space are needed in order to change the space from one type of space into another type of space. This is discussed in further detail below with reference to FIG. 18.

Further, via a user interface, a user can view the health of systems of the space. The user interface may display recommendations to upgrade and/or retrofit a space.

Figure 14:
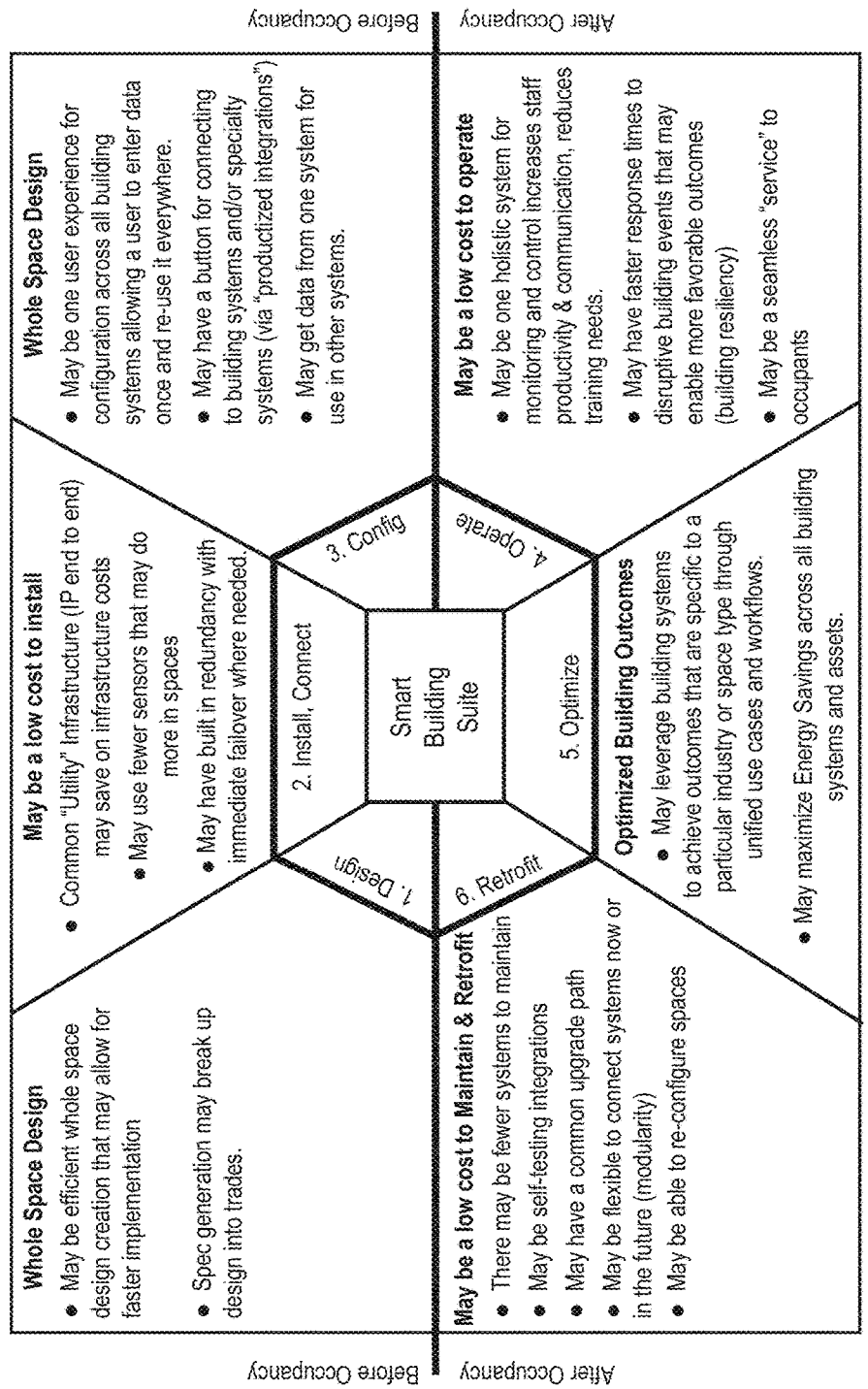
FIG. 14 is a diagram illustrating the benefits of the space-centric approach across the building lifecycle, according to an exemplary embodiment.

Referring now to FIG. 14, system design and operation of a physical place in the space- and place-centric approach is described, according to an exemplary embodiment. The place system may be designed for an entire physical space and thus may be implemented quickly. Physical spaces in the place may share and/or otherwise have common infrastructures. Installing the system may be low cost to an end user and may use less sensors. The place system may have built in redundancy with immediate failover support for various systems of the place system.

The place system may rely on a single user interface for all of the devices of the place system. The interface may allow a user to integrate multiple systems together, such as specialty systems (non-building domain related) or legacy systems (i.e., systems already installed in a place). For example, the interface may include an integrate button that allows one or more systems of the place to be integrated into the UBMS 600. Further the unified building system with space control can send/retrieve information from specialty systems. For example, the space controller of a patient room may need to retrieve data from a patient room scheduling system to be able to trigger a change in mode and/or, for example, to inform a Facilities Professional that the room is not being used so routine maintenance can occur.

The place system may save energy in the place and/or may leverage various building systems to achieve outcomes for a particular industry or space type. Further, the place system may include fewer systems, resulting in lower maintenance costs. Further, the systems may self-test their integrations. All of the systems may have a common upgrade process (e.g., hardware and/or software). Further, the systems may be modular and allow for integration and/or connection of systems and/or reconfiguration of spaces.

Unified Control Engine

Figure 15:
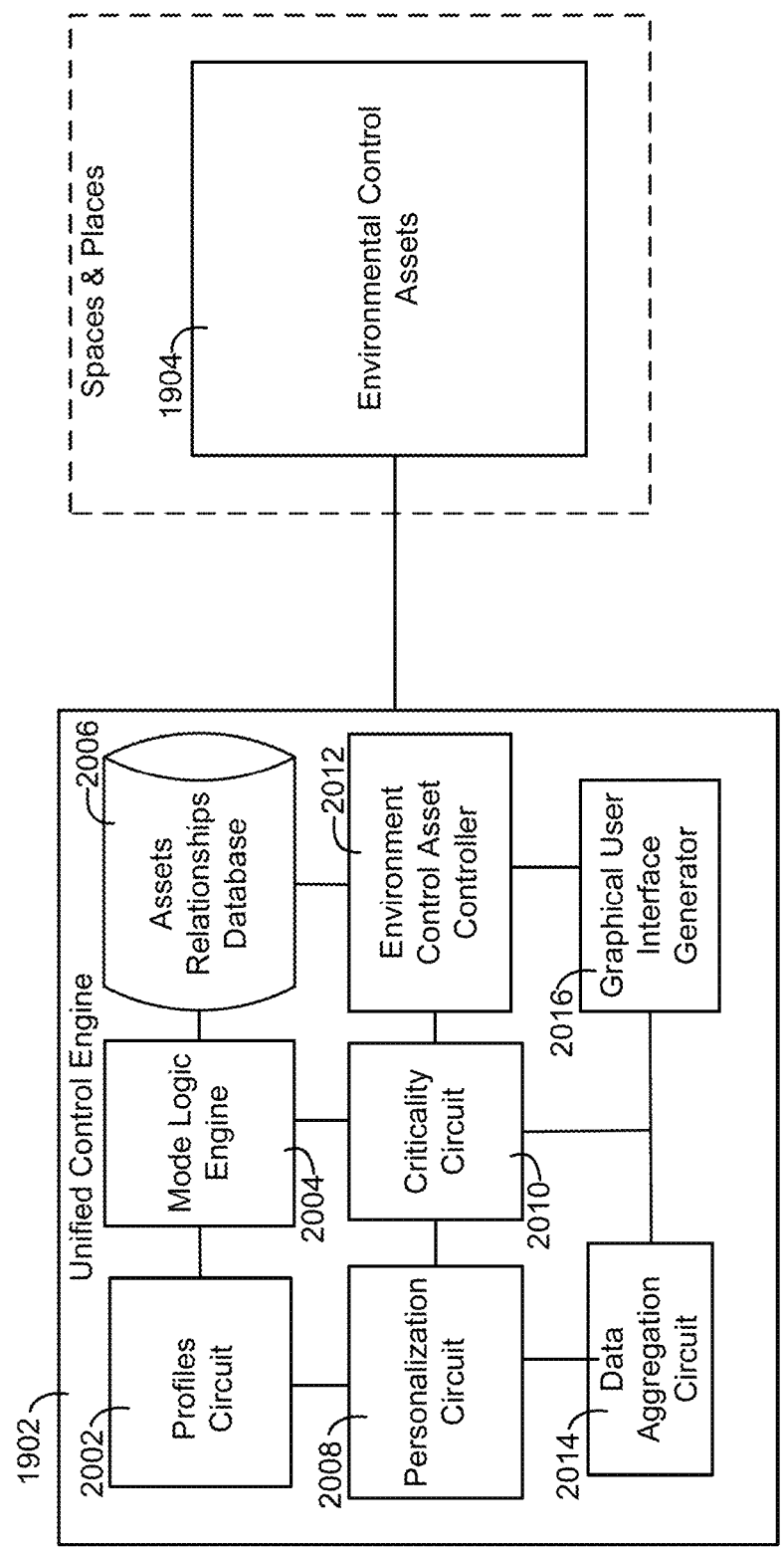
FIG. 15 is a detailed block diagram of a unified control engine for use with the unified control architecture of FIG. 7, according to an exemplary embodiment.

Referring now to FIG. 15, a detailed block diagram of the unified control engine 1902 is shown, according to an exemplary embodiment. The unified control engine 1902 includes a variety of circuits, engines, databases, etc. that facilitate unified control of the environmental control assets 1904 to fulfil the missions of the spaces or places. It should be understood that the unified control engine 1902 and the components thereof are highly configurable for various implementations. In the embodiment shown, the unified control engine 1902 is a discrete computing platform that includes the various circuits, etc., while in other embodiments various components and features of the unified control engine 1902 may be distributed across various servers, engines, devices, controllers, cloud-based computing resources, etc. included with a building management system. In some embodiments, the unified control engine 1902 includes non-transitory machine readable media executable by a processor to perform the functions and features described herein. The unified control engine 1902 is scalable, i.e., the unified control engine 1902 may be applied to a place (to control the place and its child places or spaces), to a single space, or to any other combination or number of spaces and places.

The unified control engine 1902 includes a profiles circuit 2002, a mode logic engine 2004, an assets relationships database 2006, a personalization circuit 2008, a criticality circuit 2010, an environmental control assets controller 2012, a data aggregation circuit 2014, and a graphical user interface generator 2016. The environmental control asset controller 2012 includes the various controllers, communication interfaces, etc. needed to facilitate control of individual environmental control assets 1904.

Figure 37:
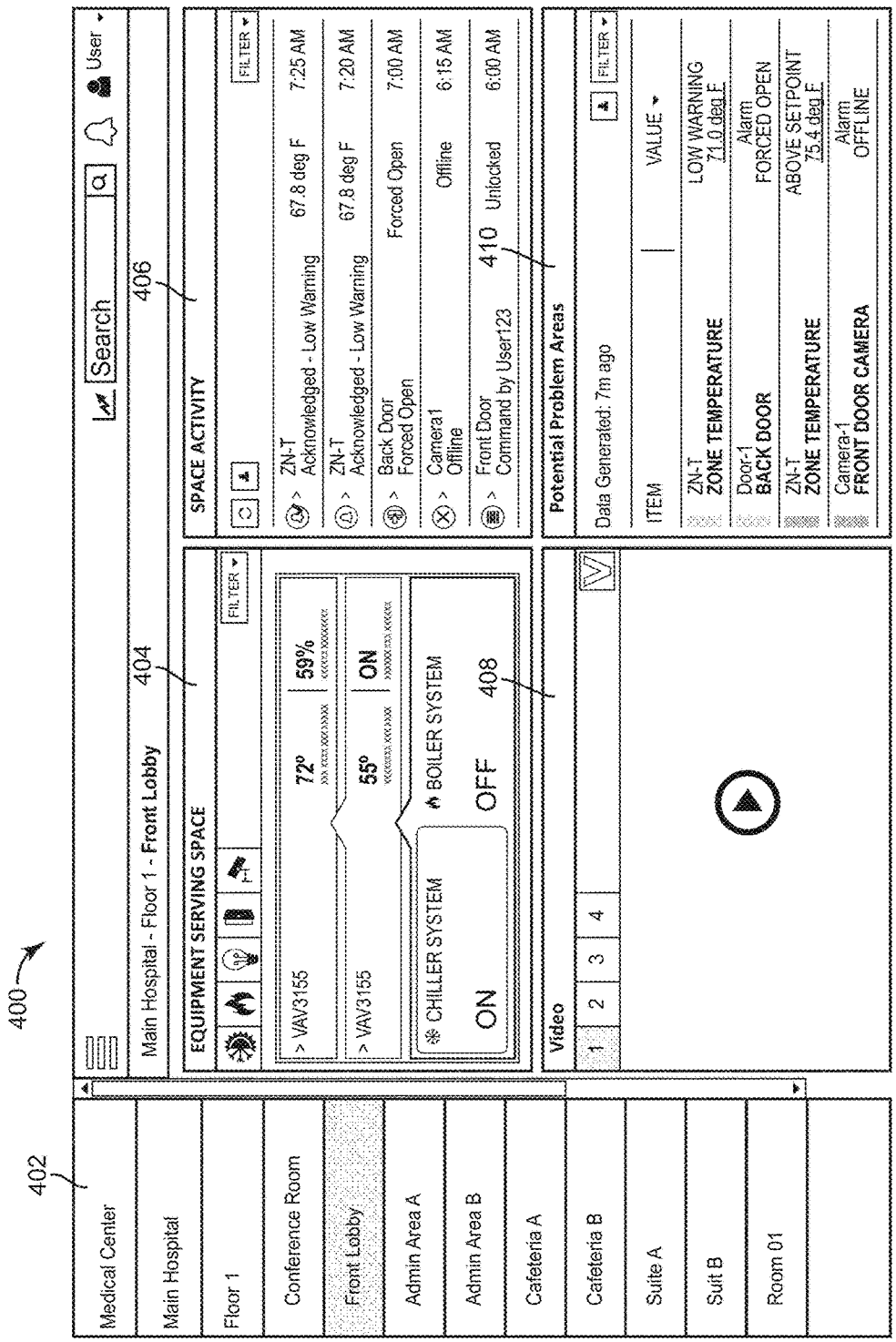
FIG. 37 is an interface for a building management application, according to an exemplary embodiment.

The profiles circuit 2002 stores a profile for each space or place served by the unified control engine 1902, as described in detail below with reference to FIG. 16-19. The mode logic engine 2004 is structured to facilitate mode-based, space- and place-centric control as described below with reference to FIGS. 20-23. The assets relationships database 2006 facilitates the propagation of modes between parent and child spaces or places and the environmental control assets 1904 that serve those spaces or places, as described below with reference to FIGS. 20-23. The personalization circuit 2008 is structured to provide for occupant-specific, personalized environmental control of a space or place occupied by identified people, as described in detail below with reference to FIG. 24. The criticality circuit 2010 is structured to dynamically determine the criticality of a space or place and use that criticality to inform prioritization of mode selection by the mode logic engine 2004, as described in detail with reference to FIGS. 25-26. The data aggregation circuit 2014 is configured to receive, organize, and combine data relating to various metrics from various spaces or places and various types of sensors and other environmental control assets, as described in detail with reference to FIG. 28. The graphical user interface generator 2016 is configured to generate graphical user interfaces that facilitate user interaction with the unified control engine 1902, for example as shown in FIG. 37 below and described with reference thereto.

Space and Place Profiles for the Unified Control Engine

Figure 16:
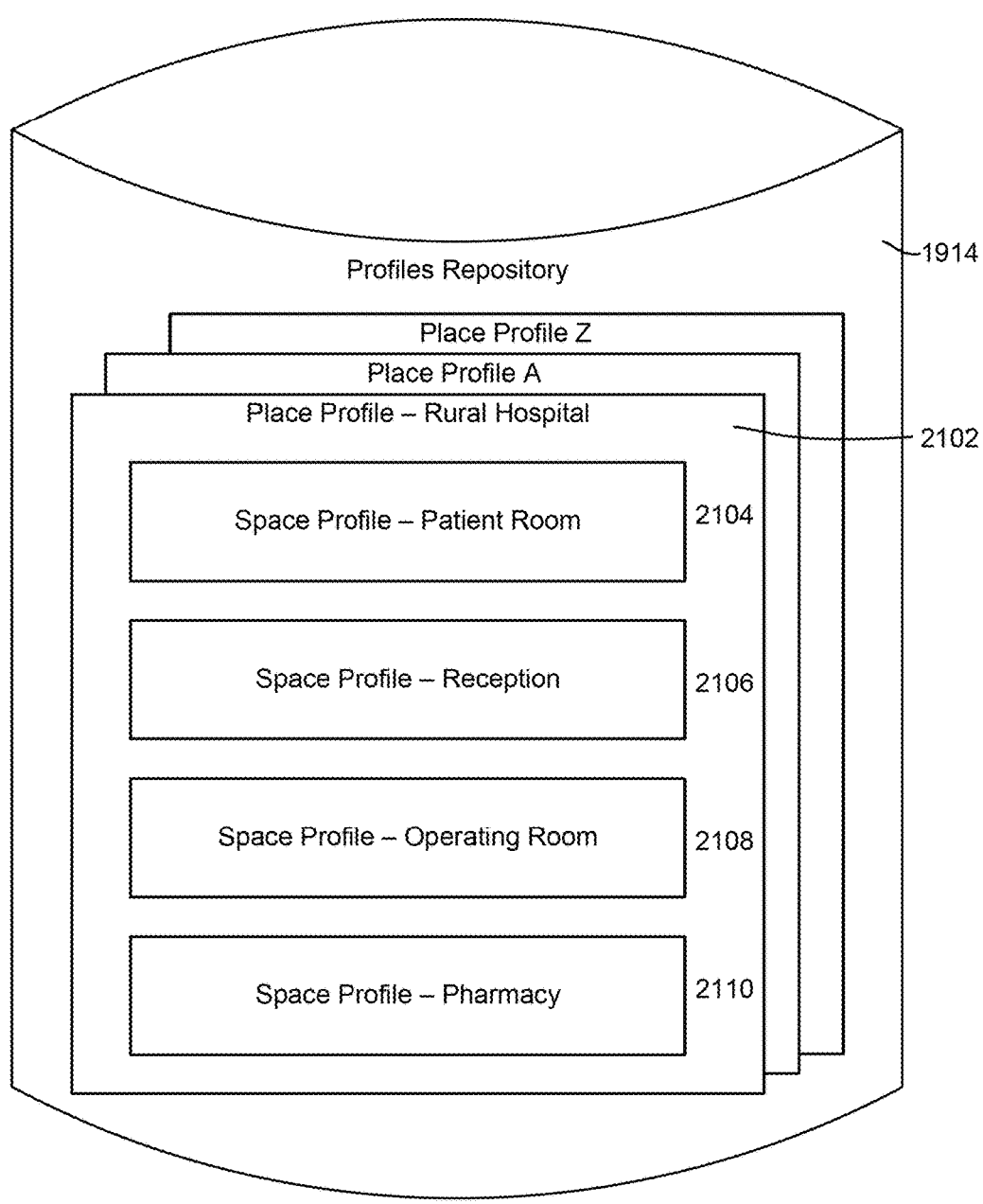
FIG. 16 is a first block diagram of a profiles repository for use with the unified control architecture of FIG. 7, according to an exemplary embodiment.
Figure 17:
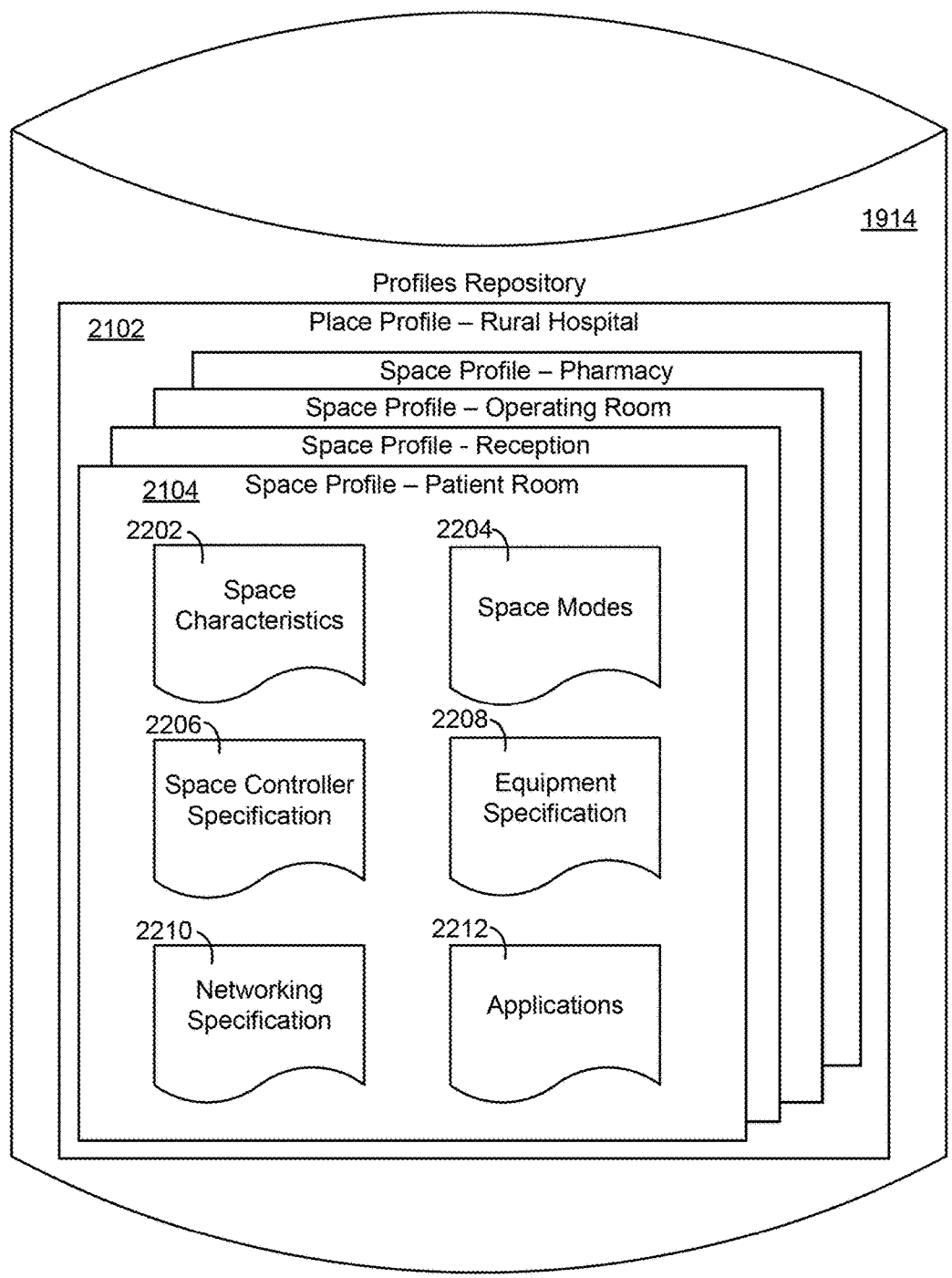
FIG. 17 is a second block diagram of a profiles repository for use with the unified control architecture of FIG. 7, according to an exemplary embodiment.
Figure 18:
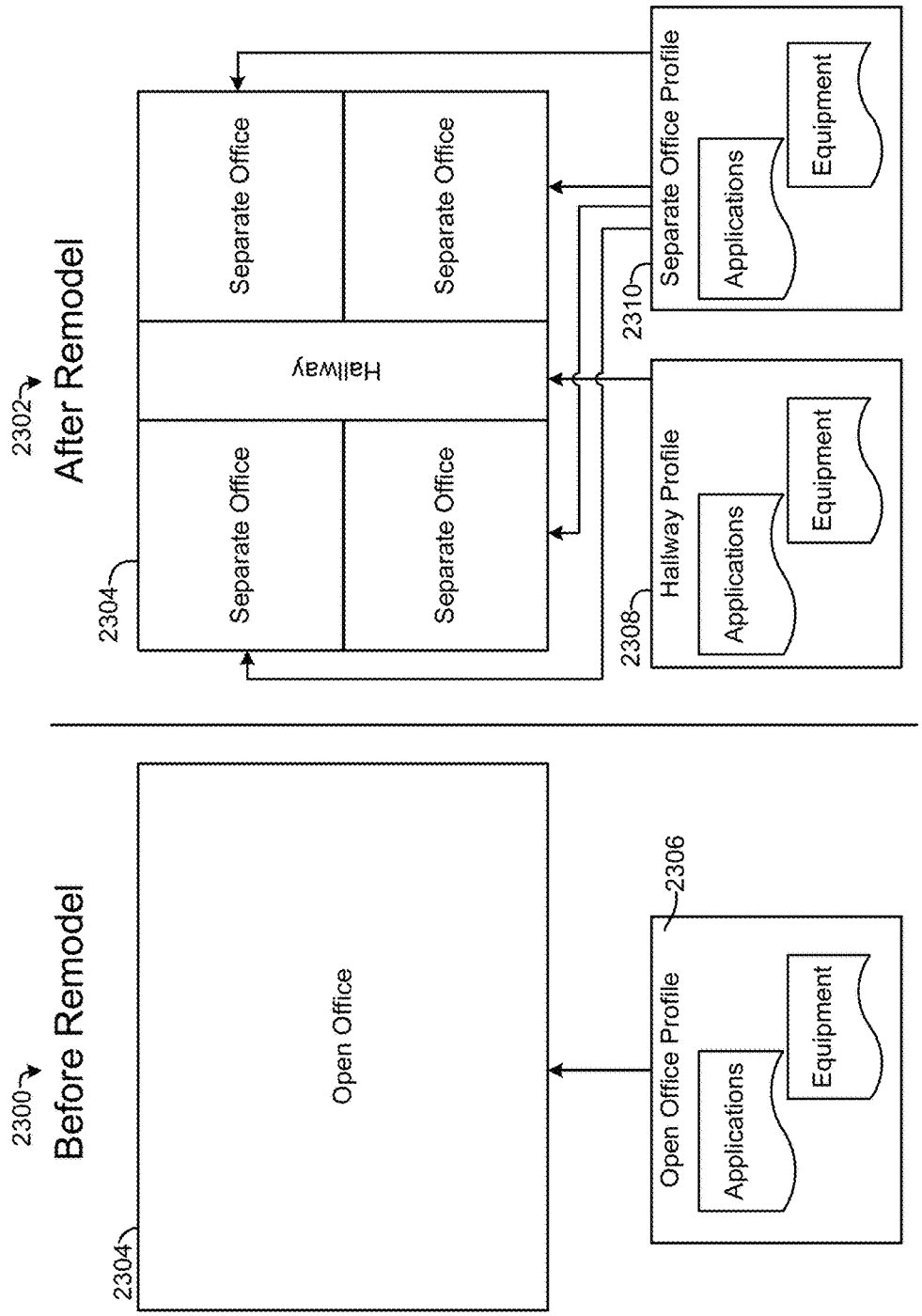
FIG. 18 is a before-and-after visualization of space profiles assignation in the unified control engine of FIG. 15, according to an exemplary embodiment.

Referring now to FIGS. 16-18, systems and methods for space and place profiles for use with the unified control engine 1902 are shown, according to exemplary embodiments.

FIG. 16 shows the profiles repository 1914 with a plurality of place profiles, according to an exemplary embodiment. The profiles repository 1914 includes a place profile for each of a variety of place types. Place types include the types of places typically served by the unified control engine 1902, for example a rural hospital, a major hospital, an office building, a school, a factory, warehouse, etc. The example of FIG. 16 shows a place profile 2102 for a rural hospital.

Each place profile includes several space profiles corresponding to the types of spaces typically found in the corresponding type of place. For example, as shown in FIG. 16, the rural hospital place profile 2102 includes a patient room space profile 2104, a reception space profile 2106, an operating room space profile 2108, and a pharmacy space profile 2110. The contents of a space profile are discussed in detail with reference to FIG. 17.

Place profiles are built by designers or engineers and stored in the profiles repository 1914. When a particular implementation of a unified control engine 1902 is being implemented, a place profile can be chosen from the profiles repository 1914 and installed on the unified control engine 1902, for example as shown in FIG. 15. The unified control engine 1902 is thereby quickly configured to serve the type of place contemplated by the place profile. For example, to install a unified control engine 1902 for a rural hospital, the rural hospital place profile 2102 can be transmitted from the profiles repository 1914 to the unified control engine 1902 for storage in the profiles circuit 2002. The unified control engine 1902 thereby receives the data, applications, control logic, mode logic, data model, etc. needed to serve a rural hospital. Customization for the particular place is also allowed and facilitated.

Referring now to FIG. 17, the profiles repository 1914 is shown with a detailed view of a space profile, according to an exemplary embodiment. More particularly, the patient room space profile 2104 is shown to include a variety of categories of profile information, including space characteristics 2202, space modes 2204, space controller specification 2206, equipment specification 2208, networking specification 2210, and applications 2212. When loaded onto a unified control engine 1902, an instance of the space profile 2104 is stored in the profiles circuit 2002 where the information contain therein can be accessed and modified as need by other engines, circuits, etc. of the unified control engine 1902.

Space attributes 2202 include a variety of attributes typically associated with a space of the type represented by the space profile (i.e., a patient room). Attributes may include space criticality (e.g., default, effective, assigned criticalities as described with reference to FIG. 25), location (i.e., relative to other types of spaces in a place), size, etc. Attributes may also include measureable traits of a space (e.g., temperature, humidity, occupancy, fire presence, carbon dioxide levels, ambient light level, noise level, usage levels). Space attributes 2202 include target values (e.g., designed values, ideal values, maximum values, minimum values) for attributes, for example utilization attributes. In the space profile, space attributes 2202 may specify the types of attributes useful for the space of that type and logic/equations/programs for recognizing sensors relevant to attributes and calculating the attributes based on sensor data, and associations between attributes.

Space modes 2204 include the modes for the space, including the criteria for triggering the mode, environmental conditions that define the mode, the settings for environmental control assets 1904 needed to establish those conditions, and/or other information relating to each mode. Once implemented in a unified control engine 1902, the space modes 2204 are accessed by a the mode logic engine 2004 to execute mode-based control as discussed in detail below.

Space controller specification 2206 includes any logic, computer code, communication interfaces, etc. necessary to define the space controllers used with the unified control engine 1902. The equipment specification 2208 specifies the typical package of environmental control assets 1904 typically included with a space or required for the space to provide the functionality described herein. The equipment specification 2208 also includes data objects for each included type of environmental control asset 1904 specifying characteristics of the type to facilitate the control of environmental control assets 1904 of that type. The networking specification 2210 includes any networking information (e.g., addresses, protocols, encryption keys) necessary to access environmental control assets 1904 over a network (e.g., a BACnet building network, Wi-Fi) from the unified control engine 1902. Applications 2212 include logic, computer code, etc., executable to run applications relating to the space. Applications 2212 may include data analytics applications, user interface applications, and/or other specialized applications for the space- or place. The space controller specification 2206, the equipment specification 2208, the networking specification 2210, and/or the applications 2212 make up the "control package" for the space referred to herein.

An instance of the space profile 2104 can therefore be installed on the unified control engine 1902, and more particularly in the profiles circuit 2002 to provide the unified control engine 1902 with the information necessary to provide the functionality described herein.

An example space profile may have the following content:

| Category | Item | Description |
|---|---|---|
| Space Characteristics | Profile Name | Patient Room |
| | Description | Profile for a Patient Room in a Hospital |
| | Space | Patient Room |
| | Criticality | Medium |
| | Space Size | 220 ft$^2$ by 9 ft |
| | Peak Heating/ Cooling Load | 4,500 Btuh |
| | Max Acceptable Noise Level | 50 dB |
| | Min Air Changes per Hour | 6 |
| | Light Intensity | 100 Lx |
| | Occupancy | 10 |
| Space Modes | Supported Modes | Clean and Maintain Unstaffed Staffed and Vacant Staffed and Reserved |
| | Jobs to be Done | Make me Comfortable (Patient) Request a Care Visit (Patient) Make Patient Comfortable (Nurse) Visit a Patient for Care (Care Giver) |
| | Situations | Code Blue Shelter in Place (Weather) Shelter in Place (Violence) Shelter in Place (Hazard) Fire |
| Systems | Equipment and Apps | Variable Air Volume Controller Smart Lighting Motorized shades |
| Networking Specification | Wired Protocols | Ethernet PoE |

Referring now to FIG. 18, a visualization of space profile assignment is shown, according to an exemplary embodiment. More specifically, a before visualization 2300 and after visualization 2302 to illustrate the utility of space profiles in easily updating the unified control engine 1902 are shown. In the example of FIG. 18, an office 2304 undergoes a remodel from an open floor plan concept (shown in before visualization 2300) to a separate-office concept with a hallway connecting the offices.

The unified control engine 1902 was originally installed for the open floor plan, and an open office floor plan 2306 was installed on the unified control engine 1902 to facilitate control of environmental conditions in the office 2304. When the open floor plan was replaced by separate offices and a hallway (i.e., as shown in the after visualization 2302), a hallway profile 2308 was installed for the hallway and a separate office profile 2310 was installed for each of the separate offices.

In this way, the type of space(s) being controlled by the unified control engine 1902 can be changed at any time. In some cases, the existing environmental control assets 1904 at the space or place are sufficient to cover both the original space(s) and the new, updated space(s) and space type(s). In such a case, changing the space profile in the unified control engine 1902 is sufficient to fully update control. In other cases, alterations to the spaces or places (e.g., installation of walls) may require additional environmental control assets 1904 to be added to allow for full control of the new spaces. In such cases, place-wide environmental control assets 1904 (e.g., chiller, air handler) may remain the same while space-specific environmental control assets (e.g., fans, access devices) may need to be added.

Overall, space- and place-profiles greatly simplify the programming needed to establish control of environmental control assets 1904 for one or more spaces or places with the unified control engine 1902.

Space and Place Profiles in the Unified Control Engine

Figure 19:
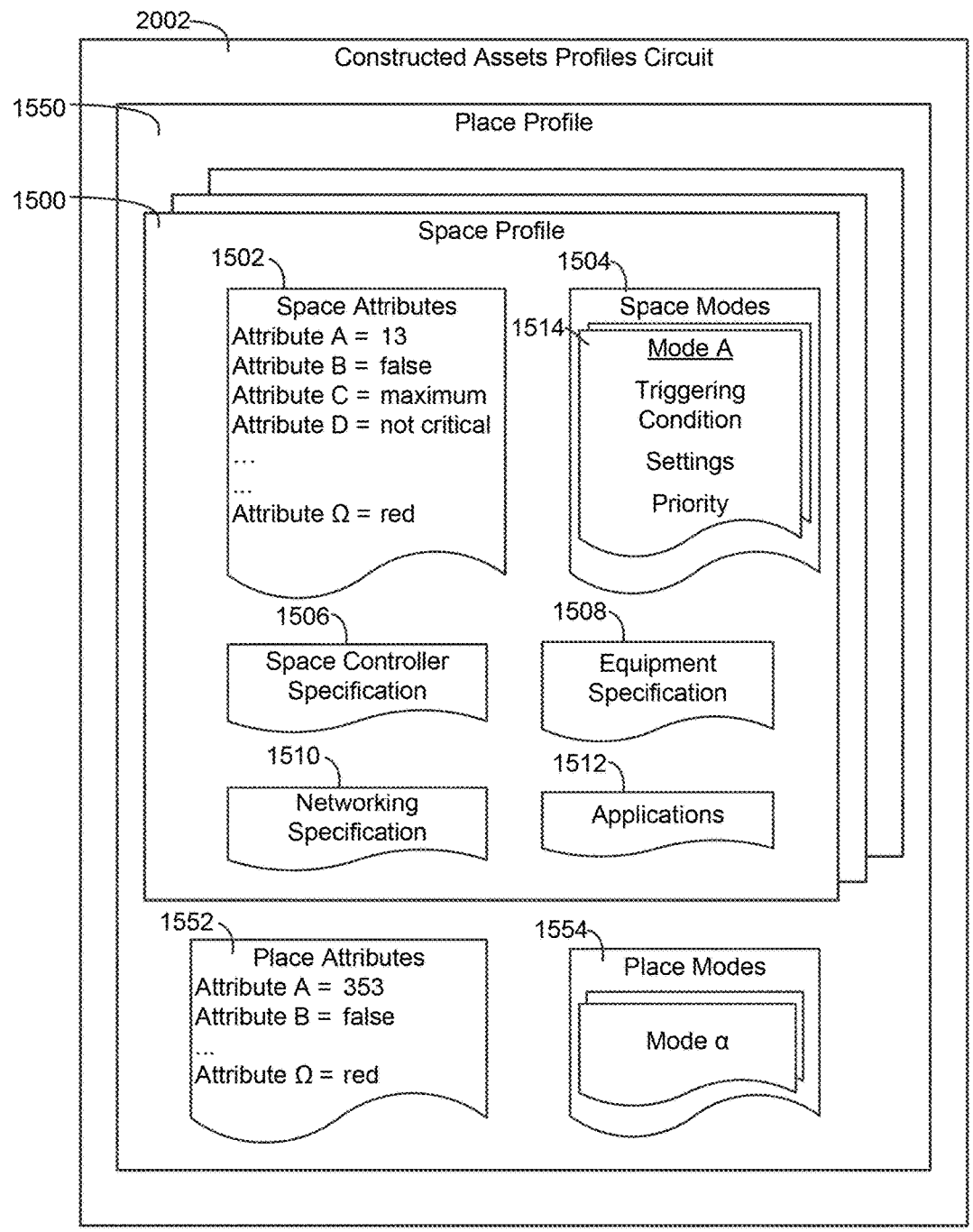
FIG. 19 is a block diagram of a place profile with space profiles in the unified control engine of FIG. 15, according to an exemplary embodiment.

Referring now to FIG. 19, a diagram of a space profile 1500 and place profile 1550 installed in the profiles circuit 2002 of the unified control engine 1902 is shown, according to an exemplary embodiment. In general, the elements of the space profile 1500 and the place profile 1550 correspond to the elements of the space profile 2104 and the place profile 2102.

The place profile 1550 includes space profiles 1500, place attributes 1552, and place modes 1554. Each space profile 1500 includes space attributes 1502, space modes 1504, space controller specification 1506, equipment specification 1508, networking specification, and applications 1512.

Space attributes 1502 includes one or more attributes (i.e., characteristics, traits, statuses, conditions, states, etc.) of the space. Similarly, place attributes 1552 includes one or more attributes of the place. As shown in FIG. 19, an attribute may have a numerical value (e.g., a count of occupants in a place, a temperature of a space), a true/false dichotomous value (e.g., no fire is burning in space v. a fire is burning in the space), a value on a scale of limited discrete levels (e.g., minimum, medium, maximum), an option from a list of possible options (e.g., critical, not critical, dynamically critical), or other type of value (e.g., color, status). Attributes are used, as described below as inputs to space-based and place-based control, for example using modes.

According to various embodiments, the space profiles include static and/or dynamic attributes. The static attributes may be predetermined attributes of the space (e.g., size, type, target values, etc.) whereas the dynamic attributes can be updated dynamically based on data received from the sensors or other data sources (e.g., measured occupancy). In some cases, values of the dynamic attributes are calculated using values of the static attributes. For example, data from the sensors or other data sources may be normalized relative to target values stored as static attributes of the space profile. The normalized values can then be stored as dynamic attributes in the space profile.

In some embodiments, different space profiles may have different sets of attributes. In such embodiments, each space profile has at least one attribute that is different from the attributes of the other space profiles. This may be true even when two or more of the space profiles are associated with the same type of space (e.g., two spaces having the same function), such that the space profiles differ from each other by having different attributes. For example, the space profiles may have different size attributes, different target values, etc.

Space modes 1504 and place modes 1554 include the modes available for the space or place. Each mode may include certain information about the mode or information needed to implement the mode. For example, mode A 1514 in FIG. 19 shows that a mode may be stored with a triggering condition that defines when the space should enter that mode, settings for environmental control assets for that mode, and a priority for that mode that ranks the importance of entering that mode relative to other concurrent modes, as described in detail below. The space profile 1500 and the place profile 1550 thereby include the necessary information for facilitating mode-based control of spaces and places.

The space profile 1500 also includes space controller specification 1506, equipment specification 1508, networking specification 1510, and applications 1512, which combine to facilitate the functions and features described herein for the particular space represented by the space profile 1500. The space profiles 1500 and the place profile 1550 are thereby configured for use by the unified control engine 1902 in controlling environmental control assets using a space- and place-centric approach.

Mode-Based Control in the Unified Control Engine

Figure 20:
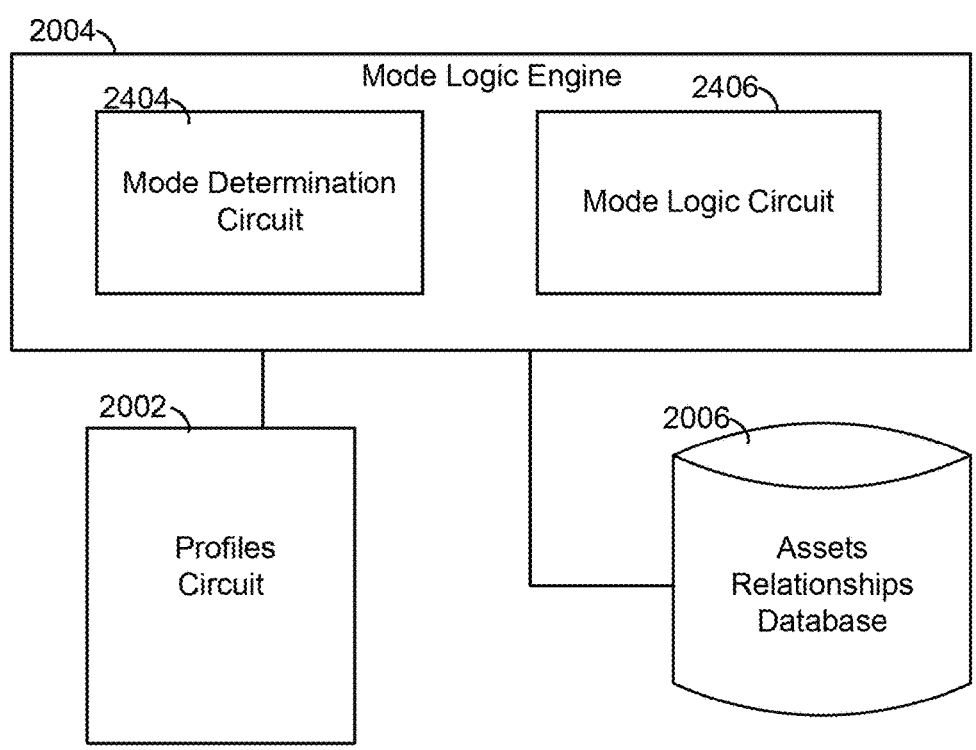
FIG. 20 is a detailed block diagram of the mode logic engine of the unified control engine of FIG. 15, according to an exemplary embodiment.

Referring now to FIG. 20, a detailed view of the mode logic engine 2004 is shown, according to an exemplary embodiment. The mode logic engine 2004 is structured to provide mode-based control for the spaces or places served by the unified control engine 1902. The mode logic engine 2004 is communicable with the profiles circuit 2002 to access space or place profiles including the mode information contained therein for each mode, as described in detail with reference to FIG. 21. The mode logic engine 2004 is also communicable with the assets relationships database 2006 to access information about the parent-child relationships between spaces or places (i.e., as described above with reference to FIG. 2) to facilitate the propagation of modes through spaces or places as described below in detail with reference to FIG. 22.

The mode logic engine 2004 includes a mode determination circuit 2404 and a mode logic circuit 2406. In general, the mode determination circuit 2404 is structured to determine the correct mode for each space or place while the mode logic circuit 2406 is structured to facilitate the execution and changing of modes, for example by propagating a mode change to related spaces or places as described in detail below with reference to FIG. 22.

The mode determination circuit 2404 determines a change in mode in response to a detected new event. Accordingly, the mode determination circuit 2404 receives sensor data from the environmental control assets 1904, user inputs from the graphical user interface generator 2016, or other data relating to the spaces or places, and determines what mode should be engaged based on that data or input. The mode determination circuit 2404 associates the new event with a corresponding mode based on the mode information available in the profiles circuit 2002. For example, if fire is detected in a place by a sensor, the mode determination circuit 2404 receives an indication that fire was detected and uses that indication to determine that the place should be put in a Fire Emergency mode. Many such associations between events or combinations of events and modes are possible. Modes may be cumulative (e.g., a Fire and Occupied mode may be different than a Fire and Unoccupied mode).

In some cases, the mode determination circuit 2404 determines which mode from multiple possible modes is prioritized and thus implemented over other triggered modes. Different modes have different priority levels, and different spaces may have different mode priority levels. Thus, two spaces under the same combination of modes may have different effective settings based on different priority levels. The mode determination circuit 2404 overrides modes with a lower priority with the settings of a mode with higher priority. Typically, situation modes have higher priorities than jobs to be done modes or operational mission modes. The following table shows an example:

| Space | Space Modes | Type | Priority | Settings | Effective Settings |
|---|---|---|---|---|---|
| Patient Room | Improve Patient Experience | Operational Mission | 0 | Light Intensity = 100 Lx | Light Intensity = 500 Lx |
| | Make Me Comfortable | Job To Be Done | 1 | Light Intensity = 80 Lx | |
| | Patient Is Sleeping | Job To Be Done | 2 | Light Intensity = 10 Lx | |
| | Fire Alarm | Situation | 3 | Light Intensity = is 500 Lx | |

The mode logic circuit 2406 is configured to determine whether the new mode is one that should be propagated to related spaces or places, access the assets relationships database 2006 to retrieve a list of the related spaces or places, and update the mode for the related spaces or places. The mode logic circuit 2406 may also initiate updated commands to the environmental control assets 1904 to cause the environmental control assets 1904 to enter the new mode. That is, the mode logic circuit 2406 determines what operations happen during a mode change. For example, the mode logic circuit 2406 may determine that airflow direction in a ventilation device must change to execute the mode change.

Figure 21:
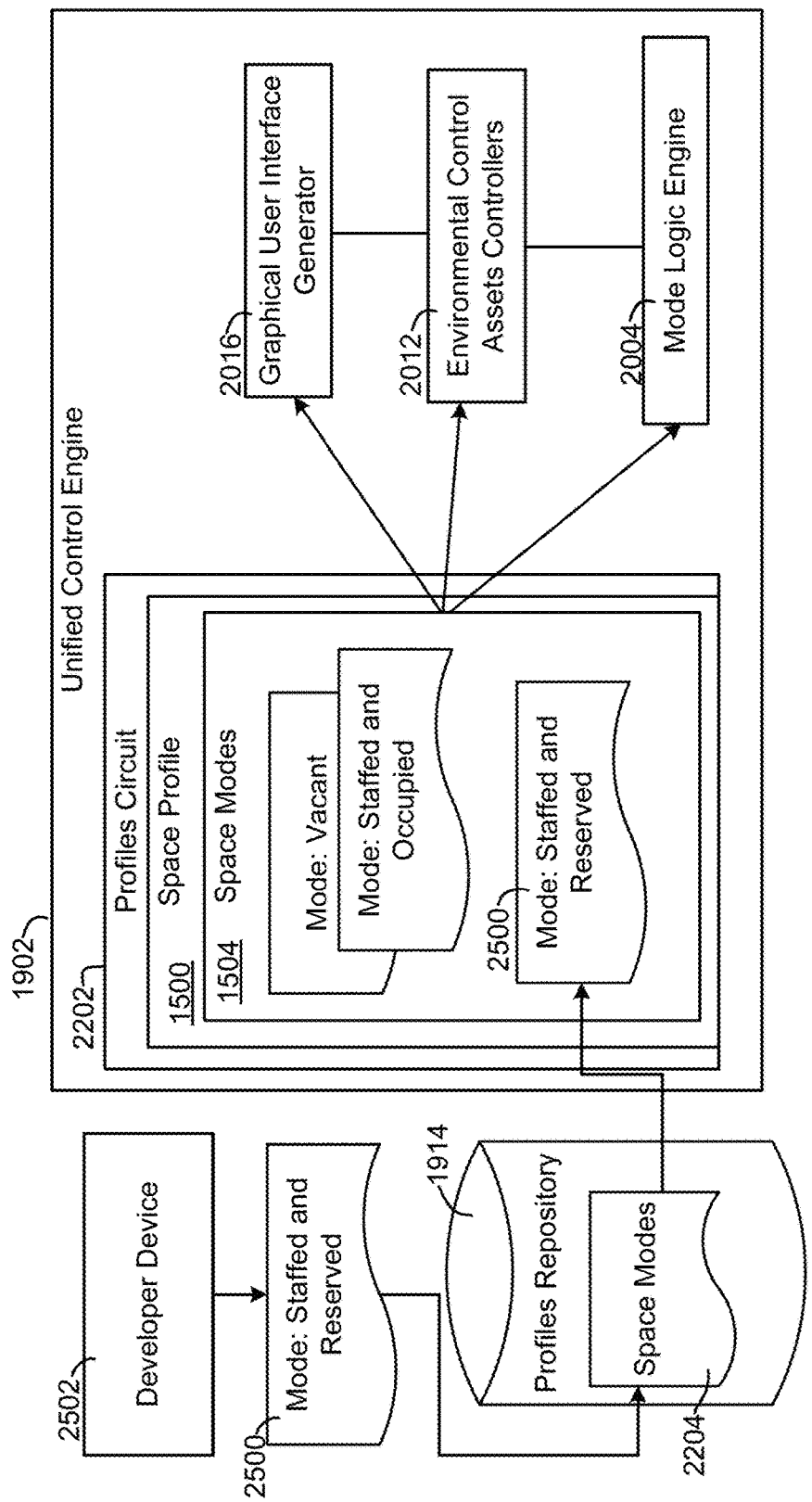
FIG. 21 is a block diagram of the unified control engine of FIG. 15 with a developer device and the profiles repository of FIGS. 16-17, according to an exemplary embodiment.

Referring now to FIG. 21, a visualization of a process of implementing a new mode for a space or place in the unified control engine 1902 is shown, according to an exemplary embodiment. A new mode 2500 (in the example of FIG. 21, "Staffed and Reserved" for a patient room) is created on a developer device 2502. The new mode 2500 includes criteria for triggering the mode, settings for environmental control assets 1904 to implement to achieve the mode, environmental conditions for a space or place that characterize the mode, and/or other information or logic to facilitate use of the new mode 2500. The developer device is a computing device (e.g., laptop, desktop computer) used by an engineer or developer to create new modes. The new mode 2500 is transmitted from the developer device 2502 to the profiles repository 1914 and saved in the profiles repository 1914. More particularly, the new mode 2500 is saved in space modes 2204 of one or more space profiles 2104. In the example herein, the new mode 2500 is saved in a space profile 2104 for a patient room as shown in FIG. 17.

The new mode can then be installed on the unified control engine 1902 from the profiles repository 1914. For example, the profiles repository 1914 may be communicably couple to the unified control engine 1902, for example via the internet. The unified control engine 1902 may run periodic updates to update the space or place profiles stored in the profiles circuit 2002. In some cases, the new mode is transferred from the profiles repository 1914 to an installation device configured to install updated profiles on the unified control engine 1902. In the example shown, the new mode 2500 is installed with the space modes 1504 of the space profile 1500. In other cases, the new mode is a place mode and is installed in places modes 1554 of a place profile 1550.

Once the new mode 2500 is installed in the profiles circuit 2002 (i.e., in a space profile 1500 or place profile 1550), the information in the new mode 2500 is used to update and/or inform a variety of other circuits, controllers, etc. in the unified control engine 1902. For example, as shown in FIG. 21, modes 1504 in a space or place profile in the profiles circuit 2002 are used to inform the graphical user interface generator 2016, the environment control asset controller 2012, and the mode logic engine 2004. The information, logic, computer code, etc. needed to implement the new mode 2500 is thereby distributed to the necessary components of the unified control engine 1902.

Figure 22:
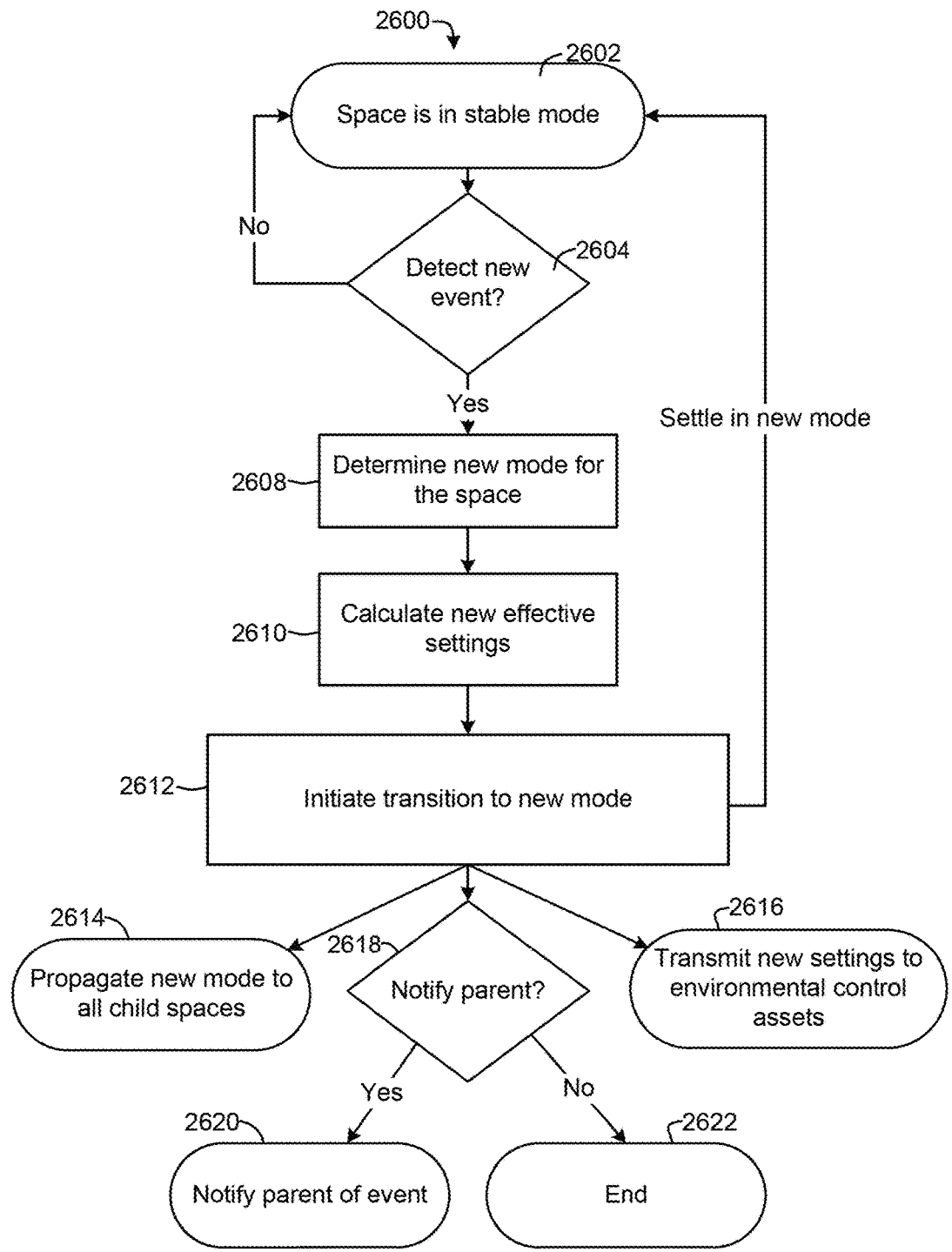
FIG. 22 is a flowchart of a process for mode-based control with the unified control engine of FIG. 15, according to an exemplary embodiment.

Referring now to FIG. 22, a flowchart of a process 2600 for mode change and mode propagation is shown, according to an exemplary embodiment. Process 2600 starts at step 2602, where the space is in a stable mode. That is, a mode is established for the space and the environmental control assets 1904 have settled into operation to achieve the conditions associated with the mode.

At step 2604, the mode logic engine 2004 monitors the space (e.g., data from the environmental control assets 1904, user inputs relating to the space) and determines whether a new event has been detected. The mode logic engine 2004 may use a list of relevant events that would trigger a mode change, and use that list to check against data to determine if a new event occurred. If a new event is not detected, the space remains stably in a mode as in step 2602.

If a new event is detected, the mode determination circuit 2404 determines the new mode for the space at step 2608. Determining the new mode may include comparing the detected new event to criteria for triggering each mode stored in the space profile 1500 (i.e., in space modes 1504). In some cases, determining the new mode for the space includes determining which of several modes has priority, as described above.

At step 2610, the mode logic circuit 2406 calculates new effective settings for the environmental control assets 1904 in the space. In some cases, the new effective settings are determined from a look-up table of effective settings for the mode stored in the space profile 1500 (i.e., in space modes 1504). In some cases, calculating new effective settings includes determining a compromise setting between two concurrent modes.

At step 2612, the mode logic engine 2004 initiates the transition to the new mode. As illustrated in FIG. 22, transition to the new mode may require several tasks. At step 2614, the new mode is propagated to all child spaces. That is, the mode logic circuit 2406 looks up the children of the space in the assets relationships database 2006 and then applies the new mode to the child spaces (i.e., applies process 2600 to the child spaces). In some cases, child spaces are thereby assigned the same mode as their parent space or place. In some cases, child spaces combine the mode information from their parent with local information (e.g., from sensors, override settings) to make an independent mode determination for the child space.

At step 2616, the new effective settings calculated at step 2610 are transmitted to the environmental control assets 1904 to control the environmental control assets 1904 to enter the new mode. For example, the mode logic engine 2004 may provide the new effective settings to the environment control asset controller 2012, and the environment control asset controller 2012 may generate control signals for the environment control assets 1904 to control the environmental control assets 1904. In some embodiments, the environmental control assets 1904 are mode-aware, such that the environmental control assets 1904 can be controlled to enter a new mode by simply transmitting the name of the new mode to the environmental control assets 1904.

At step 2618, the mode logic engine 2004 determines whether the parent of the space needs to be notified of the new event. Some events or modes require changes or action on the place level, and thus require notification of the parent of the space when the new event occurs or the new mode is initiated. For example, a fire in a space causes a Fire mode to be entered for that space, and the Fire mode should be shared with the parent place so that the whole place can enter a fire safety mode. If the mode logic engine 2004 determines that the parent should be notified of the new event, the parent is notified of the new event at step 2620. The place can then be put through the steps of process 2600 to effect a change in the place mode. If the mode logic engine 2004 determines that the parent need not be notified of the new event, the process 2600 ends at step 2622.

Figure 23:
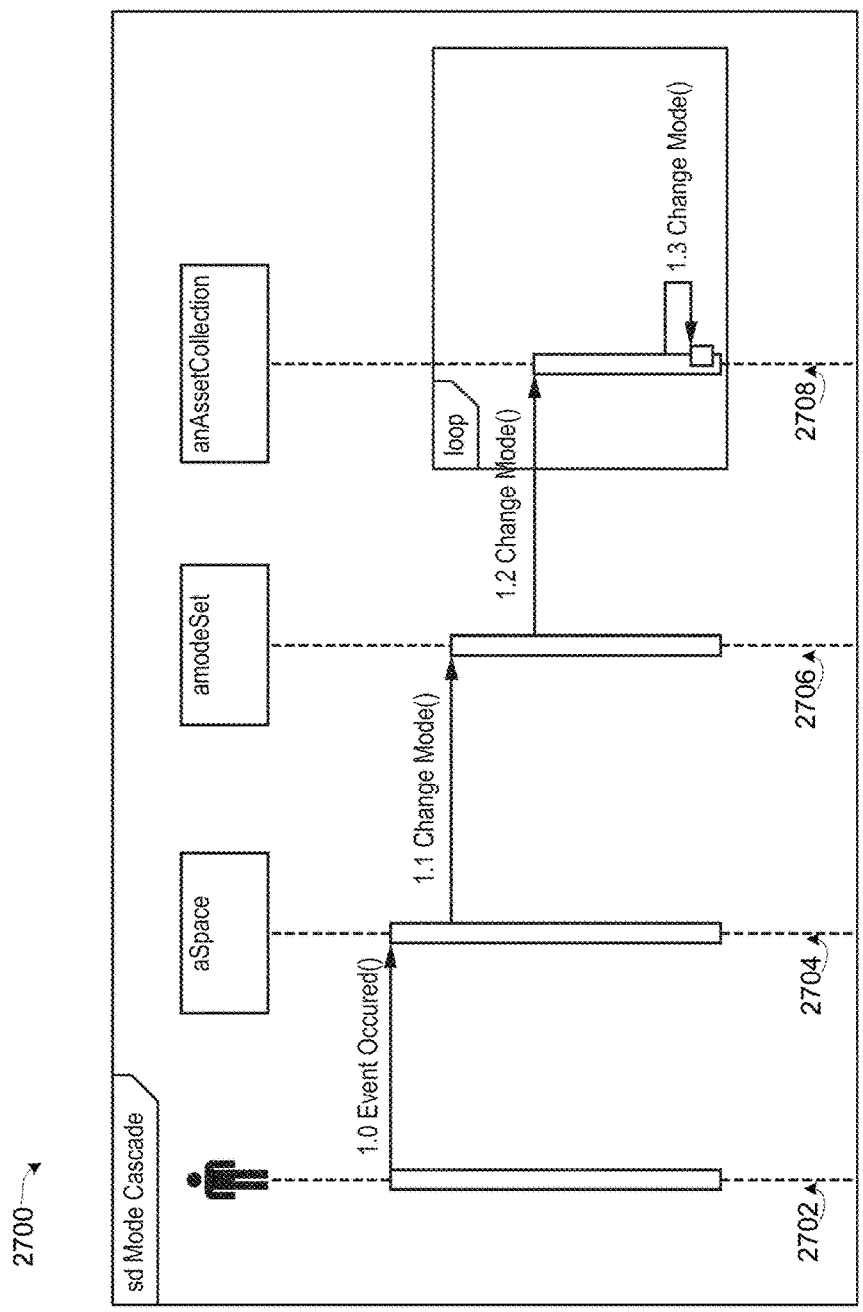
FIG. 23 is a visualization of another process for mode-based control with the unified control engine of FIG. 15, according to an exemplary embodiment

Referring now to FIG. 23, a diagram illustrating a process 2700 of mode changing across assets is shown, according to an exemplary embodiment. To start, at step 2702, a sensor detects an event. For example, a sensor may detect a person entering a space, a fire in a space, a change in a job-to-be-done in a space, etc. At step 2704, the space (i.e., a space controller/unified control engine 1902) determines that the event sensed by the sensor requires a change in mode for a first space. At step 2706, the change in mode of the space is transmitted to the mode set for the first space. The mode set includes the other assets (spaces or places and environmental control assets) that may be affected by the change in mode of the first space. That is, depending on attributes of the new mode and on the relationship between assets, some assets in the modes set will directly enter the new mode, while others will determine a different new mode using information about/from the first space or will choose to ignore the first space's change in mode. At step 2708, this process cascades through the assets in the mode set, i.e., so that as mode sets of the assets in the mode set of the first space are given a chance to react to the event sensed by the sensor and the resulting mode change(s). In this way, all spaces, places, and environmental control assets that may need to change mode based the event sensed by the sensor are given the necessary opportunity to react.

Personalized Settings with the Unified Control Engine

Figure 24:
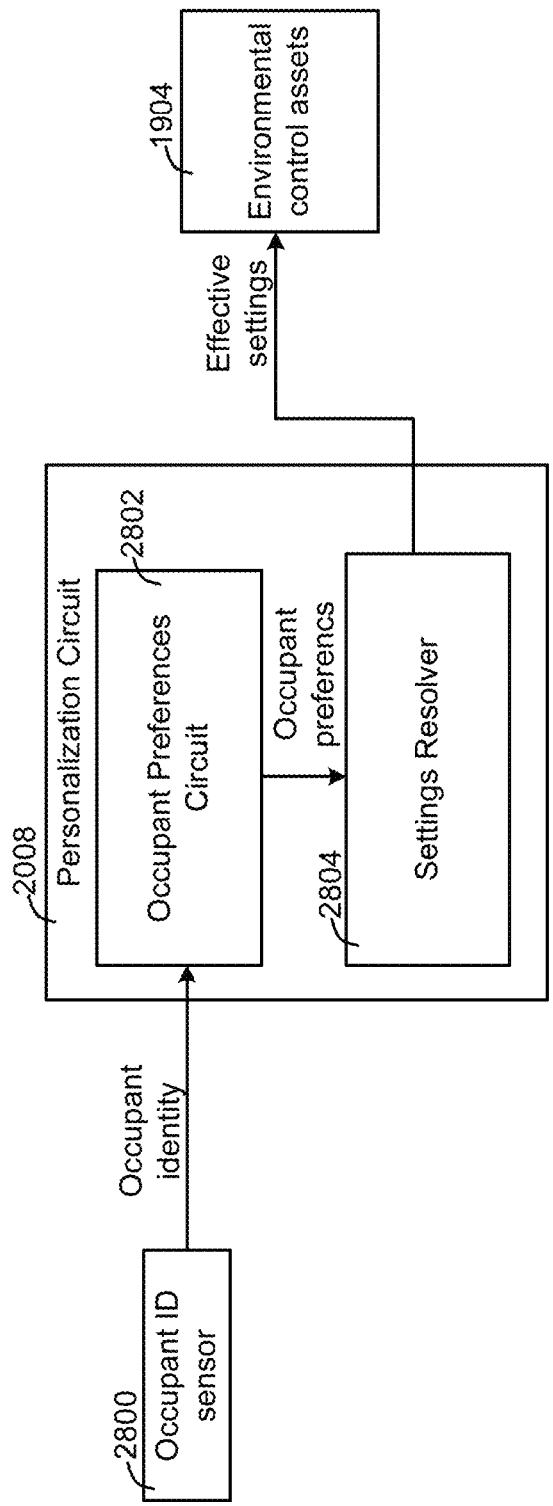
FIG. 24 is a block diagram of a personalization circuit of the unified control engine of FIG. 15, according to an exemplary embodiment.

Referring now to FIG. 24, a detailed view of the personalization circuit 2008 of the unified control engine 1902 is shown, according to an exemplary embodiment. The personalization circuit 2008 is structured to provide personalized effective settings for particular occupants of a space or place.

The personalization circuit 2008 includes an occupant preferences circuit 2802 and a settings resolver 2804. The occupant preference circuit 2802 stores occupant preferences for one or more users of a space or place (i.e., possible occupants of a space or place). The occupant preferences include the name of the space or place, an occupant identifier, an occupant relative importance, and a list of preferences. An example set of occupant preferences may include:

| Space | Occupant ID | Occupant Relative Importance (0-1) | Preference |
|---|---|---|---|
| Office | Alice | .9 | Temperature: 72, Color Temperature: 4200K, Light Intensity: 480 lx |

The occupant preference circuit 2802 is communicable with an occupant ID sensor 2800. The occupant preference circuit 2802 receives an occupant identifier from the sensor 2800, indicating that the person associated with that identifier is present in a particular space or place. The occupant preference circuit 2802 looks up the preferences for the identified occupant and provides the occupant's preferences to the settings resolver 2804. The identifier may be a unique anonymized identifier that associates the identifier with a set of settings without creating privacy concerns for the person associated with that identifier.

The settings resolver 2804 is configured to determine effective settings for the environmental control assets. If only one occupant is detected for a space or place, the preferences for that occupant are used to determine the effective settings. If multiple occupants are detected for a space or place, the occupant's relative importance is used to calculate compromise settings. That is, the occupant relative importance is used as a weight in calculating weighted average preferences for each setting. The relative weight may be determined by job position, for example the CEO of a company may have a higher relative importance than an intern. The settings resolver 2804 then uses the weighted average preferences as the effective settings for the environmental control assets. An example is shown in the following table:

| Space | Occupant ID | Preference | Occupant Relative Importance | Resulting Settings |
|---|---|---|---|---|
| Conference Room | Alice | Temperature: 72, Color Temperature: 4200K, Light Intensity: 480 lx | .9 | Temperature: 73 Color Temperature: 4450K |
| | Bob | Temperature: 75, Color Temperature: 4900K, Light Intensity: 450 lx | .5 | Light Intensity: 469 lx |

The personalization circuit 2008 thereby generates effective settings based on an optimal combination of the occupants' preferences. The effective settings are transmitted to the environmental control assets 1904 to achieve the preferred settings at the space or place.

Space & Place Criticality in the Unified Control Engine

Figure 25:
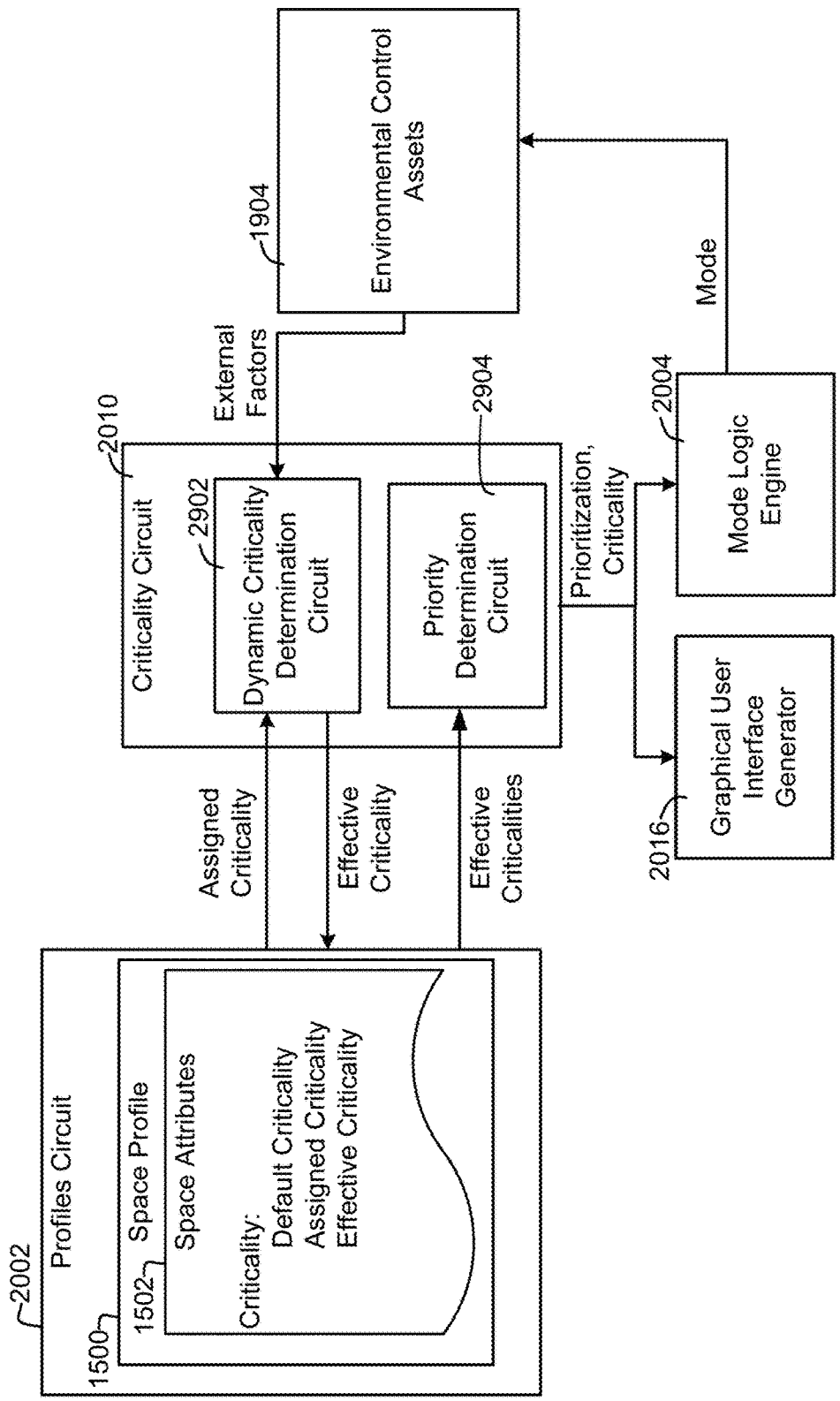
FIG. 25 is a block diagram of a criticality circuit of the unified control engine of FIG. 15, according to an exemplary embodiment.

Referring now to FIG. 25, a detailed view of the criticality circuit 2010 of the unified control engine 1902 is shown, according to an exemplary embodiment. The criticality circuit 2010 is structured to dynamically update the criticality of spaces or places and use the criticality to prioritize settings, alarms, and/or other features relating to the spaces or places. The criticality circuit 2010 includes a dynamic criticality determination circuit 2900 and a priority determination circuit 2902.

As shown in FIG. 25, the profiles circuit 2002 stores a default criticality, and assigned criticality, and an effective criticality for each space or place. For example, in the example shown criticality is stored in space attributes 1502 of a space profile 1500. The default criticality is sourced from the space or place profile for a generic space or place of that type. The assigned criticality is a criticality assigned by a system administrator, installer, or other user input. The effective criticality is the actual, update to date criticality of the space or place as updated by the dynamic criticality determination circuit 2900.

The dynamic criticality determination circuit 2900 receives the assigned criticality from the profiles circuit 2002 and external factors from the environmental control assets 1904 and/or other sources. For example, external factors may include a calendar or scheduling application that includes information about the types of activities occurring at a space or place. Based on the assigned criticality and the external factors, the dynamic criticality determination circuit 2900 recalculates the effective criticality and assigns it to the space or place (i.e., provides the effective criticality to the profiles circuit 2002 for storage with the space or place's profile). For example, if the external information indicates that a critical experiment is being conducted in a lab or a VIP is participating in an important meeting in a conference room, the criticality for those spaces are increased to create a high effective criticality. Effective criticality is thereby dynamic, repeatedly updated.

The priority determination circuit 2904 receives the effective criticalities for multiple spaces or places and compares the effective criticalities to determine a prioritization of spaces or places. The priority determination circuit 2904 may be communicably coupled to the mode logic engine 2004 to provide the prioritization of spaces or places to the mode logic engine 2004. The mode logic engine 2004 can use the prioritization to determine which modes should be used, for example by implementing the mode needed by a highly critical space or place at the expense of the modes available to a low-criticality space or place (e.g., where limited resources or other physical factors limit concurrent mode combinations across spaces or places). Additionally, each space or place may have different modes together at different levels of effective criticality. Such an example is shown in the following table:

| Space | Criticality | Modes | Settings |
|---|---|---|---|
| Chemistry Lab | 3 | Dangerous Experiment | Strong Positive Pressure (0.2 in WC) Alarm Priority = Highest |
| | 2 | Non-Dangerous Experiment | Light Positive Pressure (0.05 in WC) Alarm Priority = High |
| | 1 | Idle | Neutral Pressure (0 in WC) Alarm Priority = Normal |

The priority determination circuit 2904 may also provide the prioritization and criticalities to the graphical user interface generator 2016. The graphical user interface generator 2016 uses the prioritization and criticalities to order, filter, and sort the alarms, faults, metrics, etc. provided to a user. For example, the graphical user interface generator 2016 may present alarms associated with a space or place with a high criticality in a way that interrupts other functions of a graphical user interface. Meanwhile, alarms and faults associated with a low-criticality space or place may be presented in an unobtrusive view on the graphical user interface.

Unified View of Objects in the Unified Control Engine

Figure 26:
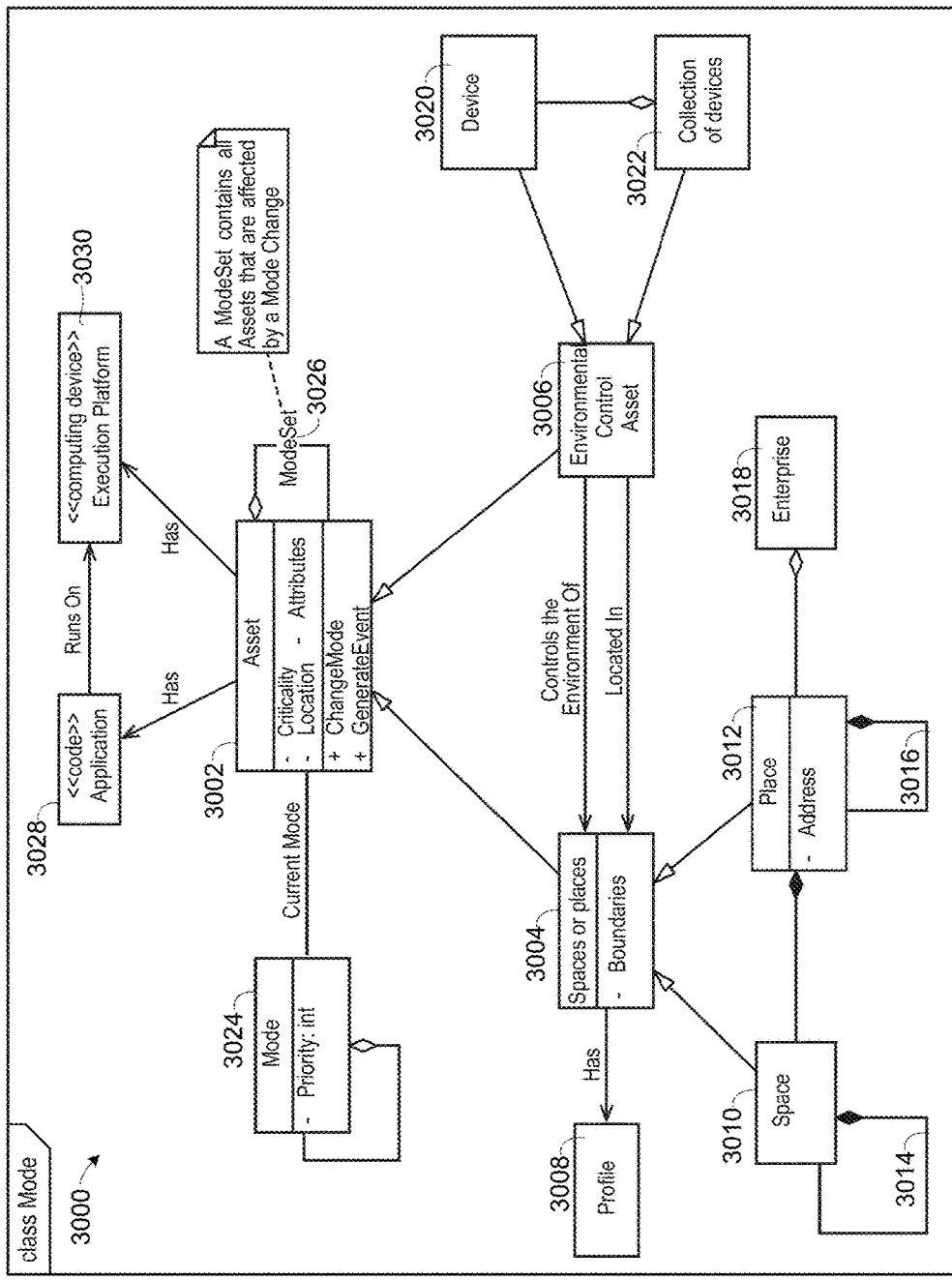
FIG. 26 is a block diagram of data objects for use in a unified control engine or a unified building management system, according to an exemplary embodiment.

Referring now to FIG. 26, a block diagram 3000 showing the associations between different objects as utilized by the unified control engine 1902 is shown, according to an exemplary embodiment. Diagram 3000 centers on asset 3002. Asset 3002 has attributes, such as criticality and location, as well as functions, including changing modes and generating events. Diagram 3000 shows that an asset 3002 can be a space or place 3004 or an environmental control asset 3006.

An environmental control asset 3006 has a profile 3008 and may be either a space 3010 or a place 3012. Arrow 3014 indicates that a space may be made up of spaces, and arrow 3016 indicates that a place may be made up of places. Space 3010 is included in place 3012. Place 3012 (and thus also space 3010) is included in an enterprise 3018. An environmental control asset 3006 is either a device 3020 or a collection of devices 3022. A device 3020 may be included in a collection of devices 3022. Environmental control asset 3006 is located in a space or place 3004 and controls the environment of space or place 3004.

Asset 3002 is controlled by mode 3024. Mode 3024 may have attributes, such as a priority. A mode 3024 may be a collection of modes (i.e., a sum of multiple modes, compromise between modes, etc.). Asset 3002 is further a part of a mode set 3026 that contains all other assets that are affected by a mode change for asset 3002. Asset 3002 has an application 3028 that runs on an execution platform 3030 associated with the asset. The execution platform 3030 may include one or more memory devices and one or more processors to receive and store data and to execute the applications and other functions described herein. For example, the execution platform 3030 may receive and store live data relating to spaces and places (e.g., space utilization data). The features and functions disclosed herein for the asset 3002 are thereby carried out.

Data Aggregation and Sensor Unification in the Unified Control Engine

Figure 27:
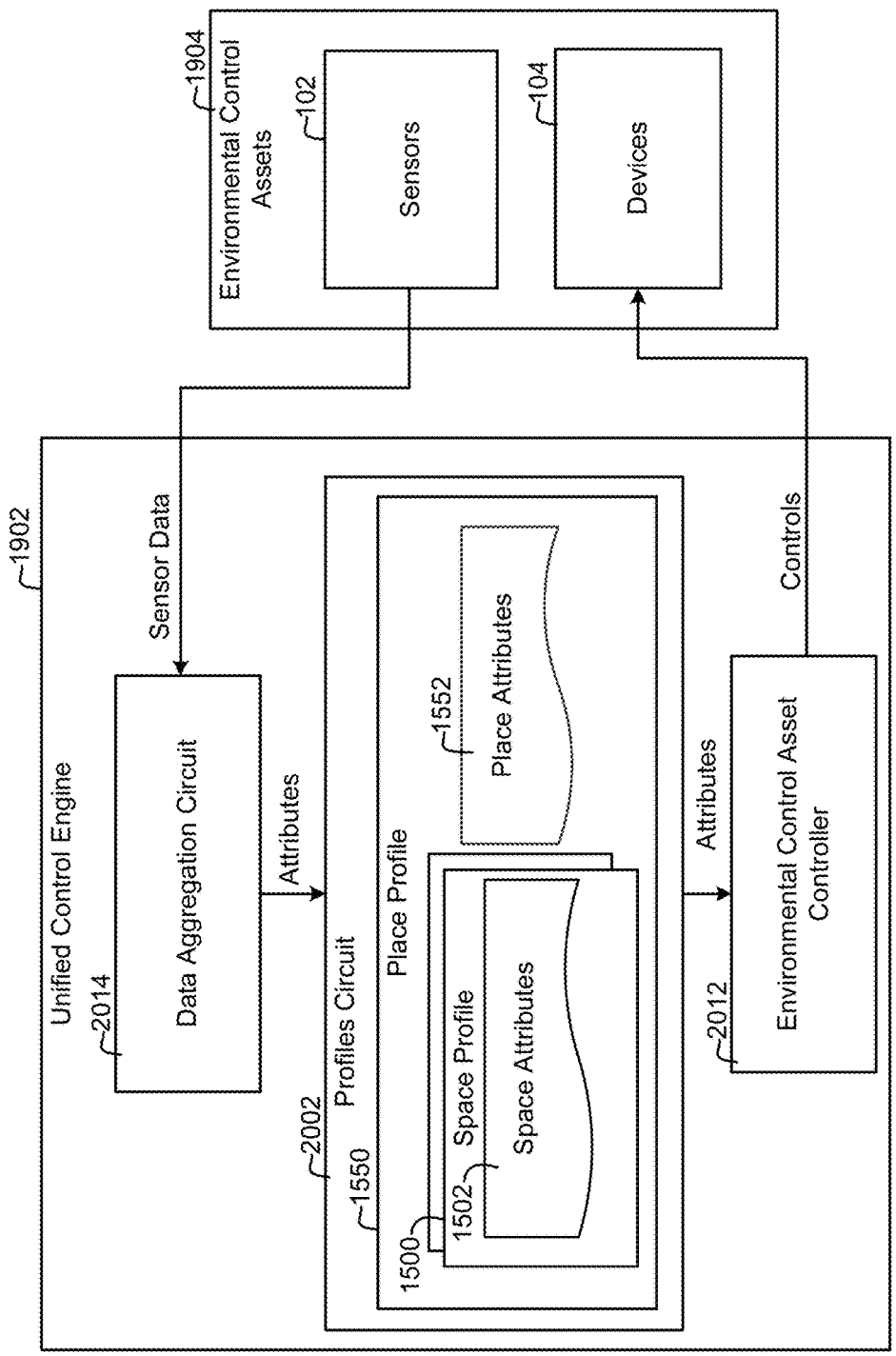
FIG. 27 is a detailed block diagram of the unified control architecture of FIG. 19 with a unified sensor network, according to an exemplary embodiment.

Referring now to FIG. 27, a block diagram of the unified control engine 1902 and the environmental control assets 1904 illustrating the use of a unified sensor network is shown, according to an exemplary embodiment. As shown in FIG. 27, the environmental control assets 1904 include devices 104 (i.e., controllable devices, equipment, etc. that can affect a variable state or condition of a space or place) and sensors 102. Sensors 102 are network-connected. Sensors 102 may include any variety of types of sensors that measure different physical phenomena, collect different types of data, connect to the unified control engine 1902 via various network protocols, and are positioned anywhere in or around a space or place. Some sensors 102 may be conventionally associated with a particular building domain. In general, in the systems and methods described herein, the sensors 102 are domain-agnostic (i.e., are not defined by an association with a particular building domain).

The sensors 102 collect various types of data and provide that data to the data aggregation circuit 2014 of the unified control engine 1902. The data aggregation circuit receives and processes the sensor data. More particularly, the data aggregation circuit sorts the data based on the spaces and/or places that each sensor 102 is located in and uses the data to generate attributes of the spaces and places. In some cases, an attribute may be sensed directly by one or more sensors 102 (e.g., air temperature in a space sensed by a temperature sensor). In other cases, the attribute may be derived from data provided by one or more sensors 102. For example, data from a first sensor may be used to make an initial estimate of an attribute, and a data from a second sensor may be used to verify or improve the accuracy of that estimate. As another example, data from more than one sensor may be necessary to capture an attribute relating to more than one space. Many such combinations of data from multiple sensors to generate an attribute are possible.

The data aggregation circuit 2014 then provides attributes to the profiles circuit 2002. The attributes are stored either with place attributes 1552 in a place profile 1550 or with space attributes 1502 in space profile 1500. The attributes are sensor-agnostic: that is, the each attribute describes a characteristic of the space or place (e.g., temperature, occupancy) independent of the type(s) of sensor(s) that provided the data used to generate the attribute.

The attributes are then provided to environmental control asset controller 2012 and/or other elements of the unified control engine (e.g., mode logic engine 2004) and used to control devices 104. Control of the devices 104 is thus based on the attributes generated from the sensor data provided by the sensors 102, as well as on the space profiles 1500, place profiles 1550, and other factors (e.g., modes, criticality, priority). Because the attributes are independent of the type(s) of sensor(s) used to generate the attributes, the controls based on the attributes are also independent of the type(s) of sensor(s) used to generate the controls. Thus, the unified control engine 1902 can seamlessly control a device conventionally associated with a first building domain based on data from sensors of one or more other building domains. The unified control engine 1902 can therefore also seamlessly control multiple devices conventionally associated with multiple building domains based on data from a sensor conventionally associated with one building domain. Further details, examples, and advantages of this unified approach are detailed below.

Figure 28:
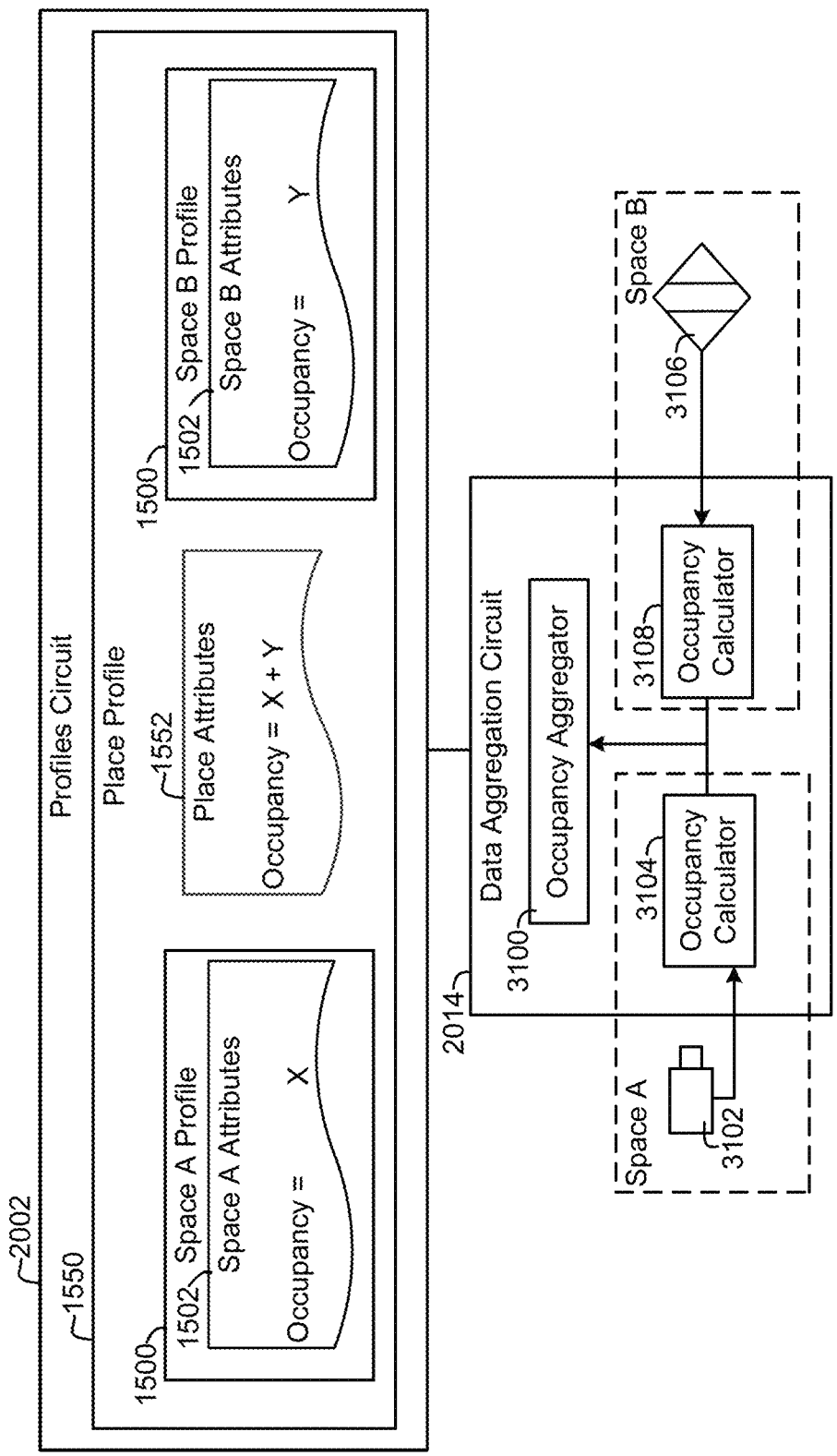
FIG. 28 is a block diagram of a data aggregation circuit in the unified control architecture of FIG. 7, according to an exemplary embodiment.

Referring now to FIG. 28, a detailed view of the data aggregation circuit 2014 of the unified control engine 1902 is shown for an occupancy aggregation use case, according to an exemplary embodiment. More particularly, an instance of the data aggregation circuit 2014 with an occupancy aggregator 3100 is shown. The occupancy aggregator 3100 is configured to aggregate occupancy data relating to a place from environmental control assets 1904 located in a variety of child spaces of the place. As used herein, occupancy is a count of the number of people in a space or place. In general, the data aggregation circuit 2014 receives data from the plurality of sensors, determines one or more attributes for one or more spaces or places based on the data, and stores the attributes in the appropriate space profiles 1500 or place profile 1550. In the example shown, the data aggregation circuit 2014 includes occupancy calculators 3104, 3108 and an occupancy aggregator 3100. It should be understood that the data aggregation circuit 2014 may include any suitable data processing components for receiving, analyzing, and sorting sensor data into attributes of spaces or places.

In the example of FIG. 28, a camera 3102 is located in space "Room A" and is configured to measure occupancy of space Room A (i.e., the number of people in Room A). For example, the camera 3102 may provide a raw video feed to an occupancy calculator 3104 that uses an image-recognition technique to count the number of occupants in the space. Meanwhile, a passive infrared sensor 3106 in space "Room B" is also configured to provide data to a second occupancy calculator 3108 to determine the occupancy of the space "Room B." The occupancy calculators 3104, 3108 provide an occupancy time series to the occupancy aggregator 3100. The occupancy calculators 3104, 3108 use a common data model to format and tag the occupancy time series, such that the occupancy data is normalized across types of sensors used to generate it. Sensor data may then be indistinguishable across sensor types. The occupancy of room A may then be stored with space A attributes 1502 while the occupancy of room B may be stored with space B attributes 1502 in space profiles 1500. The aggregate occupancy may be stored as a place attribute 1552.

In conventional systems, data generated by devices as in this example is only used to for local control of devices of specific domains. For example, in a conventional system, the data from the passive infrared sensor 3106 may be used to control the lights in Room B, but could not be used to control devices of other domains (e.g., HVAC, access, security) or for other spaces. However, as shown in FIG. 28, the occupancy aggregator 3100 aggregates occupancy data from multiple spaces to provide place-level occupancy features.

Additionally, the occupancy aggregator 3100 aggregates occupancy data without regard to the domain or type of sensor used to collect that data. As shown in FIG. 28, the occupancy aggregator 3100 aggregates occupancy data from a camera 3102 and a passive infrared sensor 3106 into a combined occupancy metric. The data aggregation circuit 2014 thereby provides for additional data analytics and controls features without the need for installing a uniform set of dedicated sensors across spaces. The attributes stored bye the space profiles 1500 and the place profile 1550 are agnostic of the type(s) of sensor(s) used to generate the data, the physical phenomena measured by the sensor(s), the type of network(s) used by the sensor(s), or the domain conventionally associated with a given sensor.

The network of sensors, the data aggregation circuit 2014, and the profile attributes provide several advantages outlined in the following examples:

First, a sensor primarily intended for a first purpose or typically associated with a first domain (e.g., a camera associated with building security) may be used to provide an attribute useful for control of a device conventionally associated with another building domain (e.g., HVAC). For example, the camera video feed from a building security camera may be used to provide an occupancy attribute, which is then used to generate a temperature setpoint for a HVAC device. In some cases, one sensor is used to generate multiple attribute, with each attribute useful in a different building domain.

Second, multiple different sensors and different types of sensors can be used together to provide more complete coverage of sensible areas/regions of space or place. For example a first sensor (e.g., a camera) may only view a portion of a space. A second sensor (e.g., a passive infrared sensor) may detect motion in another portion of a space. The data from both types of sensors are used by the data aggregation circuit 2014 to determine an attribute for the space that better reflects the whole space and thereby gives better data than just one sensor. A device from any domain can be controlled using the aggregated data.

Third, multiple different sensors and different types of sensors can be used together by comparing redundant or duplicative values/metrics/points measured in different ways to improve accuracy or reliability of an attribute. For example, a first sensor (e.g., a camera) may only view a space. A second sensor (e.g., a passive infrared sensor) may detect motion in a space. A third sensor may be carbon dioxide meter that measures changes in the carbon dioxide in the air. A fourth sensor stream may be based on the number of Wi-Fi enabled devices (e.g., smartphones) connected to a Wi-Fi network for a space. All four sensors give data relating to the number of occupants of the room. By comparing the data from all four sensors and combining them into a single occupancy count attribute, the error may be substantially improved beyond that possible using only one sensor. Attributes in the space profile may thereby be made more accurate through the use of multiple sensors, including across building domains.

Figure 29:
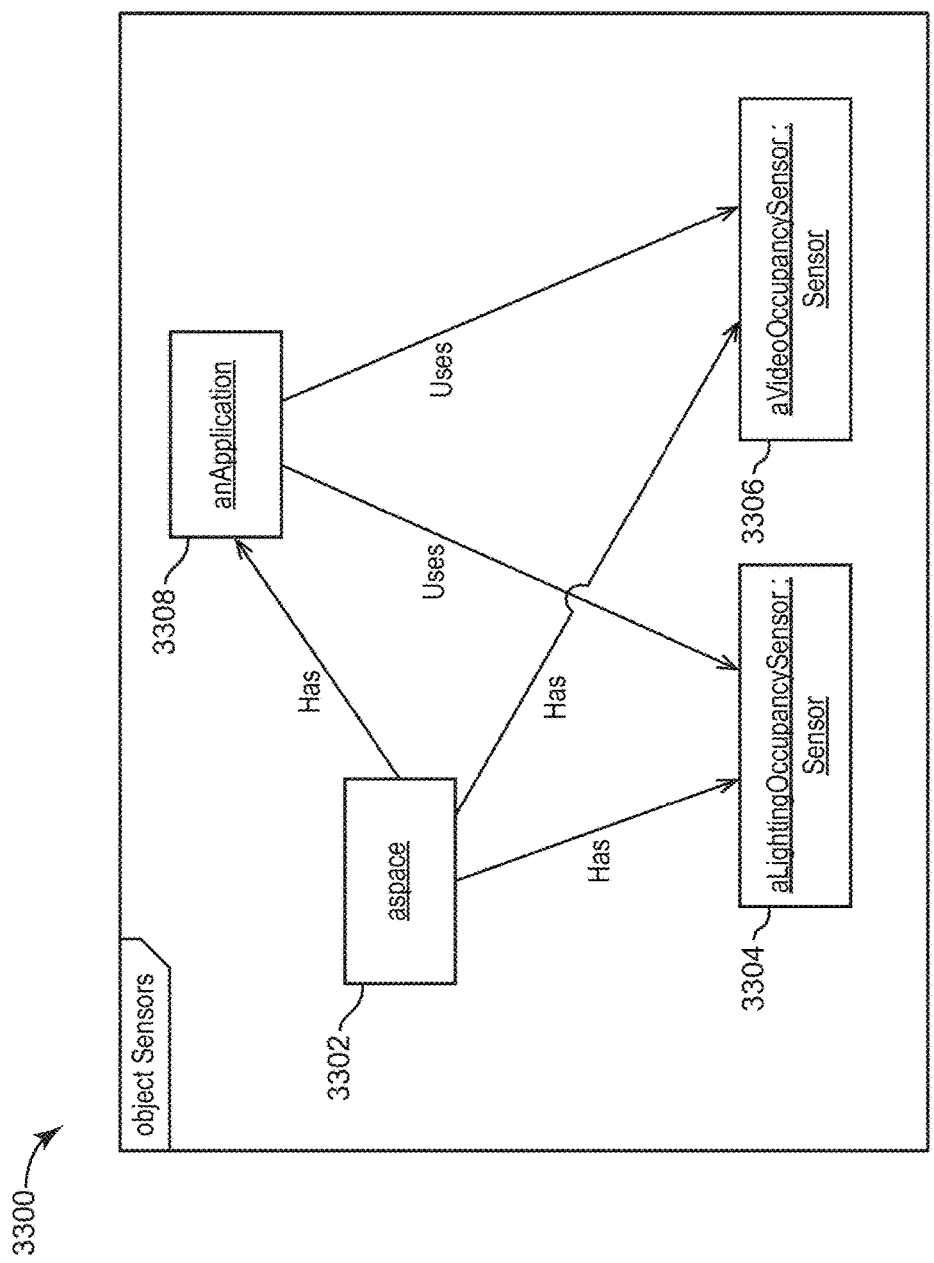
FIG. 29 is a block diagram of data objects for use with the unified sensor network in the example of FIG. 28, according to an exemplary embodiment.

Referring now to FIG. 29, a block diagram 3300 illustrating an example of a unified sensor network is shown, according to an exemplary embodiment. A space 3302 has a lighting occupancy sensor 3304 and a video occupancy detector 3306 (i.e., the example of FIG. 29 corresponds to the example of FIG. 28). The lighting occupancy sensor 3304 may be primarily/conventionally associated with the lighting domain (i.e., designed for use in detecting occupants for the sake of turning on and off lights), while the video occupancy detector may be primarily/conventionally associated with a security domain (i.e., used for surveillance). Despite any such differences, the association between the lighting occupancy sensor 3304 and the space 3302 and between the video occupancy detector 3306 and the space 3302 are indistinguishable. The space 3302 also has an application 3308 that uses data from the lighting occupancy sensor 3304 and the video occupancy detector 3306 for people counting, going beyond the primary/conventional applications associated with these sensors. The sensors 3304-3306 supply data in a normalized format, for example as specified by a common data model. The application 3308 may then treat occupancy data from the lighting occupancy sensor 3304 as indistinguishable from data collected from the video occupancy detector 3306. The design and development of application 3308 may therefore be simpler and more efficient since it is reusing data from sensors already in the space and not requiring additional sensors to be added.

Unified Sensor Network

Figure 30:
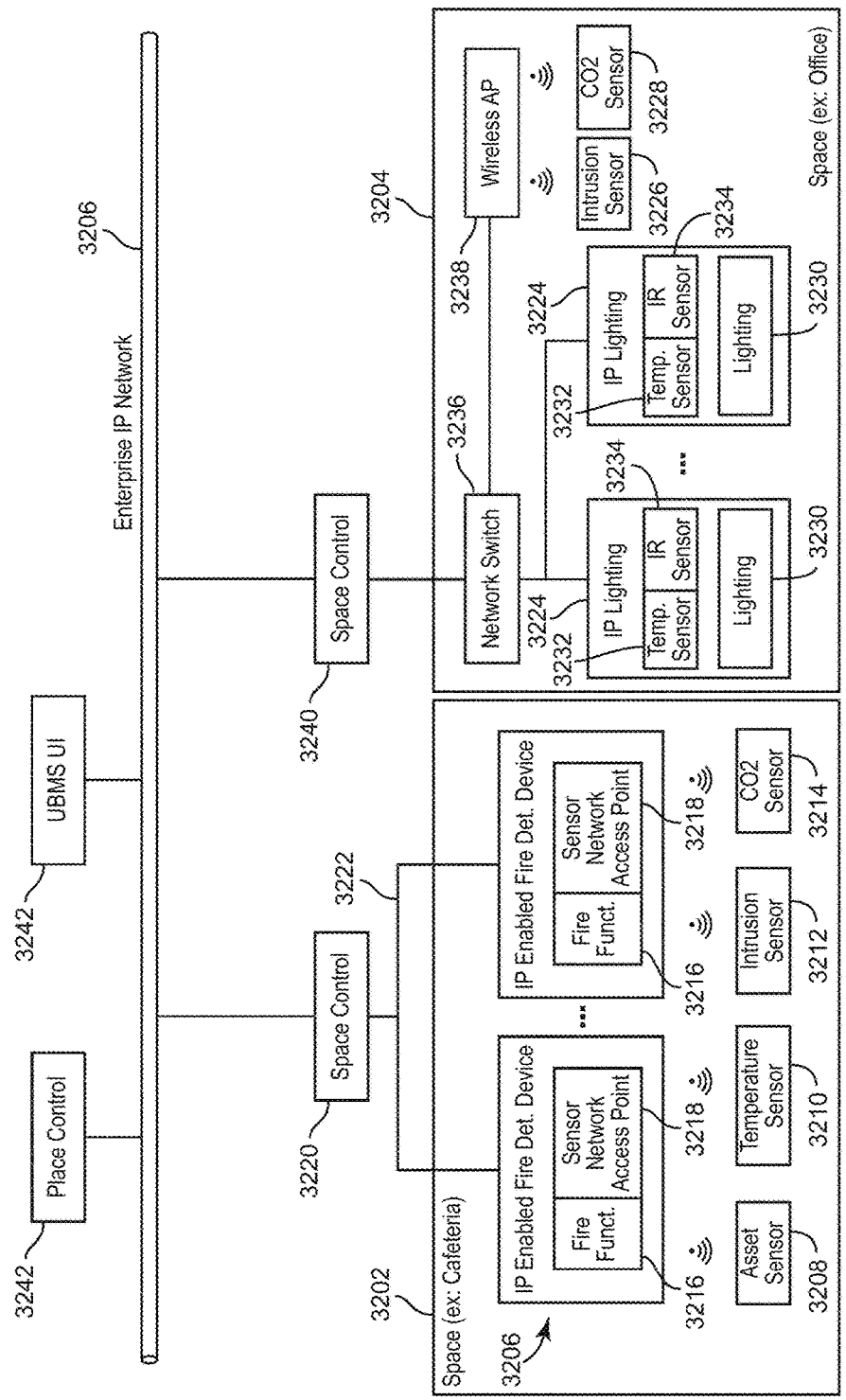
FIG. 30 is a block diagram of a unified sensor network, according to an exemplary embodiment.

Referring now to FIG. 30, a unified sensor network for use with unified control engine 1902 and/or UBMS 600 is shown, according to an exemplary embodiment. In the example of FIG. 30, a first space 3202 is served by a first set of sensors and a second space 3204 is served by a second set of sensors. More particularly, the first space 3202 is served by multiple fire detection devices 3206, and asset sensor 3208, a temperature sensor 3210, an intrusion sensor 3212, and a $CO_2$ sensor 3214. Each fire detection device 3202 includes a fire sensor 3216 and a sensor network access point 3218. Each fire sensor 3216 is structured to detect fire (e.g., to detect smoke, to detect heat). Each sensor network access point 3218 is structured to facilitate communication of the fire detection device 3206 with other fire detection devices 3206 and with a space controller 3220 over a sensor network 3222. The sensor network access points 3212 are also configured to support wireless communication with sensors 3208-3214. The asset sensor 3208, temperature sensor 3210, instruction sensor 3212, and $CO_2$ sensor 3214 connect wirelessly to the sensor network 3222 via the sensor network access points 3212.

The second space 3204 is served by multiple IP lighting devices 3224, an intrusion sensor 3226, and a $CO_2$ sensor 3228. Each IP lighting device 3224 includes lighting 3230 that provides light to the second space 3204, a temperature sensor 3230, and an infrared sensor 3232. The IP lighting devices 3224 are communicably coupled to a network switch 3236, for example via Ethernet. The network switch 3236 is also communicably coupled to a wireless access point 3240. The wireless access point 3238 provides a wireless network that provides for communication between the intrusion sensor 3226 and the $CO_2$ sensor 3228 and the network switch 3236. The network switch 3236 is also communicably coupled to a space controller 3240 for the second space 3204.

The space controllers 3220, 3240 are thereby communicable with a variety of sensors of various domains that use various types of networks, protocols, etc. to provide sensor data to the space controller s3220, 3240. More generally, then, FIG. 30 illustrates that sensors and controllers may interconnect regardless of technology available in a space (e.g., sensors 3208-3214 connected via fire devices 3206 or sensors 3232-3234 embedded in lights connected via Ethernet) and protocol (e.g., Wi-Fi mesh, Modbus, Ethernet, BACnet, KNX). A wide-variety of solutions suitable to particular spaces and places with particular missions and purposes are therefore available. Additionally, sensors can be added in a plug-and-play manner without needed to install additional infrastructure or resources. Because any type of sensor using any protocol can be added, easy expansion is facilitated and the labor cost of installation is dramatically lowered.

Still referring to FIG. 30, space controllers 3220 and 3240 are connected to a place controller 3242 and a user interface 3244 via an enterprise IP network 3246. The place controller 3242 is thereby communicably coupled to the various sensors that serve the first space 3202 and the second space 3204, and uses sensor-provided data from any space regardless of the type of network that links the controllers 3220, 3240-3242 to a particular sensor. The place controller 3242 is structured to provide place-based features, controls, functions, etc. that use one or more sensors from each of multiple spaces. Examples of such features are described in detail below.

User interface 3244 allows a user to view, via a single graphical user interface, data provided by a variety of different types of sensors for multiple spaces. User interface 3244 also allows a user to access place-based functionality relating to the sensors.

Figure 31:
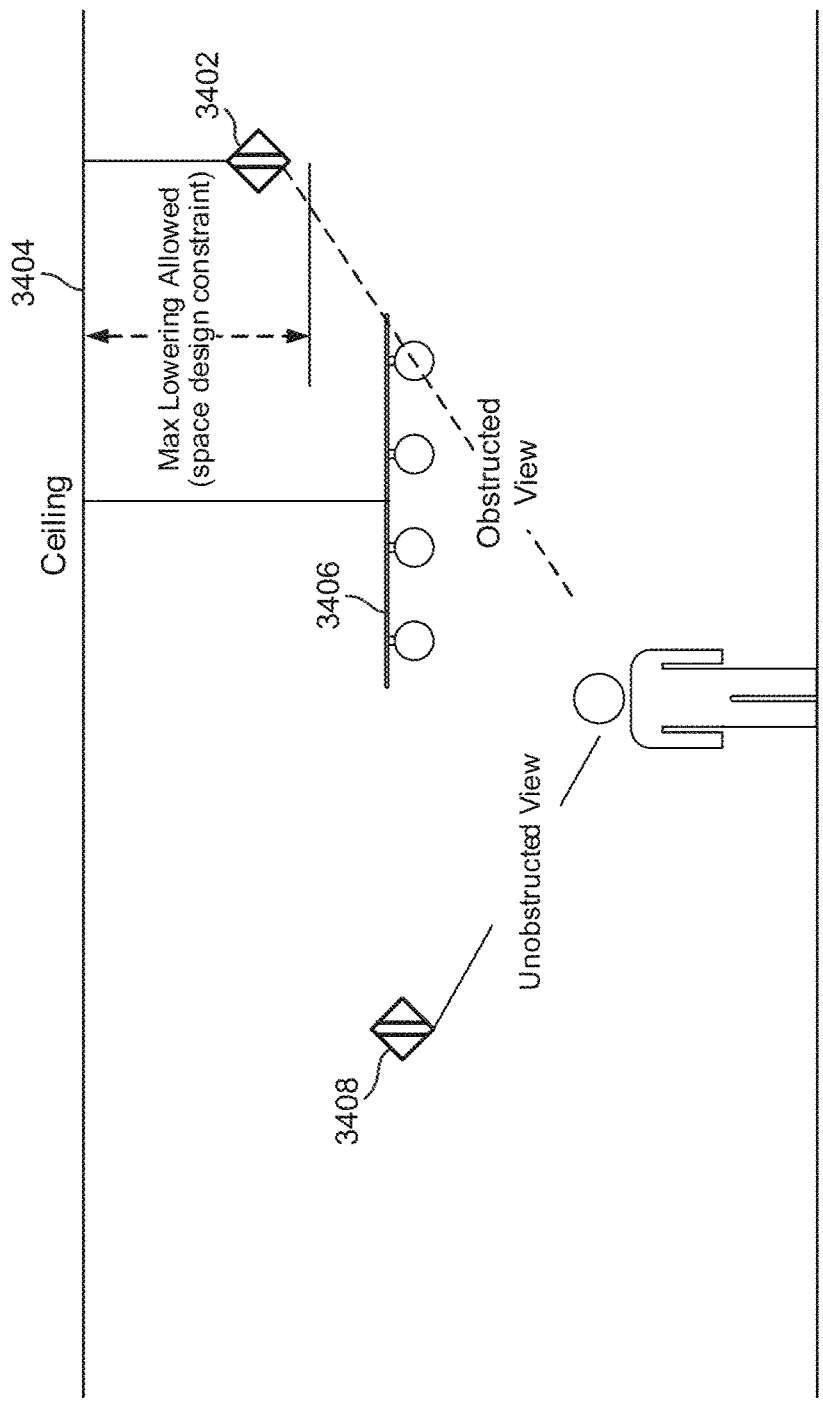
FIG. 31 is an illustration of an example sensor layout for a space made possible by the unified sensor network, according to an exemplary embodiment.

Referring now to FIG. 31, an example of an implementation of a cross-domain sensor network is shown, according to an exemplary embodiment. In the example of FIG. 31, the occupancy of a space is being detected by two sensors. A first sensor 3402 is suspended from the ceiling 3404 and may be primarily/conventionally associated with the lighting domain (e.g., manufactured by a lighting company). Lighting devices are pervasive in places and spaces, and are therefore a popular type of device to include additional sensors in. However, space design and other constraints may limit the ability of the lighting domain to provide all the sensors needed to capture reliable data for entire spaces and places. FIG. 31 illustrates how a unified sensor network can help eliminate the effects of those constraints.

As shown in FIG. 31, the first sensor 3402 is a passive infrared sensor structured to measure occupancy in the space, for example a cafeteria. However, a light fixture 3406 is also suspended from the ceiling 3404 and is positioned between the first sensor 3402 and an obstructed portion of the space. That is, the view of the first sensor is partially obstructed by the light fixture 3406, such that the first sensor 3402 cannot measure occupancy of the obstructed portion of the space. This obstruction problem may be particular to the space shown (e.g., a cafeteria) because of the type of light fixture suitable for that space which creates the obstruction.

In the example shown, the space is therefore designed so that a second sensor 3408 is used to measure occupancy of the obstructed portion of the space. In other cases, the first sensor 3406 is not used, and the second sensor 3408 is chosen instead to measure occupancy of the space. The second sensor 3408 is embedded in a fire device (e.g., a fire alarm strobe that is required by regulations to have a clear line of sight to all space occupants), and may therefore be primarily/conventionally associated with the fire domain. The second sensor 3408 thus also provides occupancy data for the space. A different space, on the other hand, may not have obstructions that limit the effectiveness of lighting-based sensors. In such a space (e.g., an office), the space may be designed to use lighting-based sensors. Thus, sensors may be chosen for a space that are suitable for that particular type of space and without the confines of traditional or conventional boundaries between building domains or sensor types.

As discussed above, the first sensor 3402 and the second sensor 3408 both provide occupancy data to a controller (e.g., unified control engine 1902) that can use the data to determine the total occupancy of the space. In some cases, the data from each sensor is indistinguishable, such that total occupancy is the sum of the occupancy measured by each sensor 3402-3408. In other embodiments, the data from the first sensor 3402 and the second sensor 3408 is compared to determine any overlap between the occupancy data to generate a more accurate/reliable occupancy measurement (e.g., to avoid counting one occupant twice).

Figure 32:
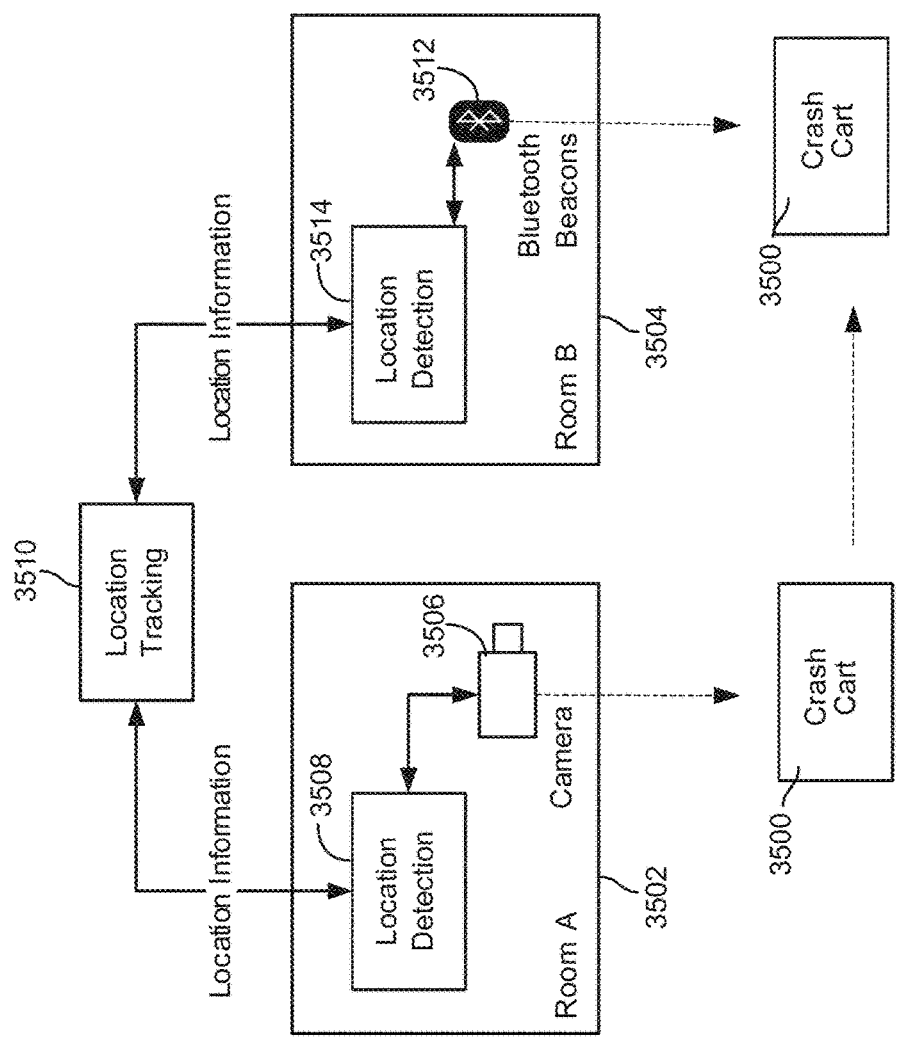
FIG. 32 is an illustration of an example feature for a place made possible by the unified sensor network, according to an exemplary embodiment.

Referring now to FIG. 32, an example of place-based functionality made possible by a unified sensor network is shown, according to an exemplary embodiment. In the place-based functionally shown, an asset can be tracked throughout a place using the various types of sensors available in various types of spaces. More particularly, a crash cart 3500 is tracked through rooms in a hospital (e.g., building 500), shown in FIG. 32 as room A 3502 and room B 3504. The location detection circuits 3508, 3518 and the location tracking circuit 3510 may be elements of data aggregation circuit 2014.

A camera 3506 is positioned in Room A 3502. Room A 3502 is a type of space that is suited to having a camera for security or other purposes (e.g., an equipment storage area). The camera 3506 provides a video feed to a location detection circuit 3508. The location detection circuit 3508 processes the video feed and determines whether the crash cart 3500 is visible in the video feed (i.e., is in room A 3502). If the location detection circuit 3508 determines that the crash cart 3500 has entered room A 3502, the location detection circuit 3508 generates and transmits a normalized indication of the location of the crash cart 3500 to a location tracking circuit 3510 (e.g., "Crash Cart ID AA0001 entered Room A at 7:34"). The location detection circuit 3508 continues to monitor the video feed from the camera 3506, and determines when the crash cart 3500 leaves Room A 3502. The location detection circuit 3508 then generates and transmits another normalized indication of the location of the crash cart 3500 (e.g., "Crash Cart ID AA0001 left Room A at 10:21").

The crash cart 3500 may then travel through a hallway (where it is also tracked) to Room B 3504. Room B 3504 includes Bluetooth beacons 3512 that can detect the presence of the crash cart 3500 (e.g., the crash cart 3500 includes a Bluetooth transmitter). Room B 3504 may be a patient room. The Bluetooth beacons 3512 provide raw data relating to the detection of the crash cart 3500 to location detection circuit 3514. The location detection circuit 3514 then generates and transmits a normalized indication of the location of the crash cart 3500 to the location tracking circuit 3510 (e.g., Crash Cart ID AA0001 entered Room B at 10:22).

The location tracking circuit 3510 is thereby made aware of the location of the crash cart 3500 without needing to deal with specific sensor interfaces and protocols. The unified network and the common data model make it possible to convert different technologies to a uniform time series of location indications that the location tracking circuit 3510 uses to produce a history of the asset (i.e., crash cart 3500) location. The location tracking circuit 3510 can then answer the inquiries about the location of the crash cart 3500 by simply looking at the location history (e.g., "Where is Crash Cart ID AA0001 Now"). The location tracking circuit 3510 may generate an attribute to store in place profile 1550 that indicates the location of the crash cart 3500. Applications, mode logic, or other control functions that use the location of the crash cart 3500 as in input can then look up the crash cart location attribute in the place profile 1550 and use the attribute as needed, independent of the sensors or data processing steps used to create the attribute.

Plug-and-Play Sensor Installation in the Unified Sensor Network

Figure 33:
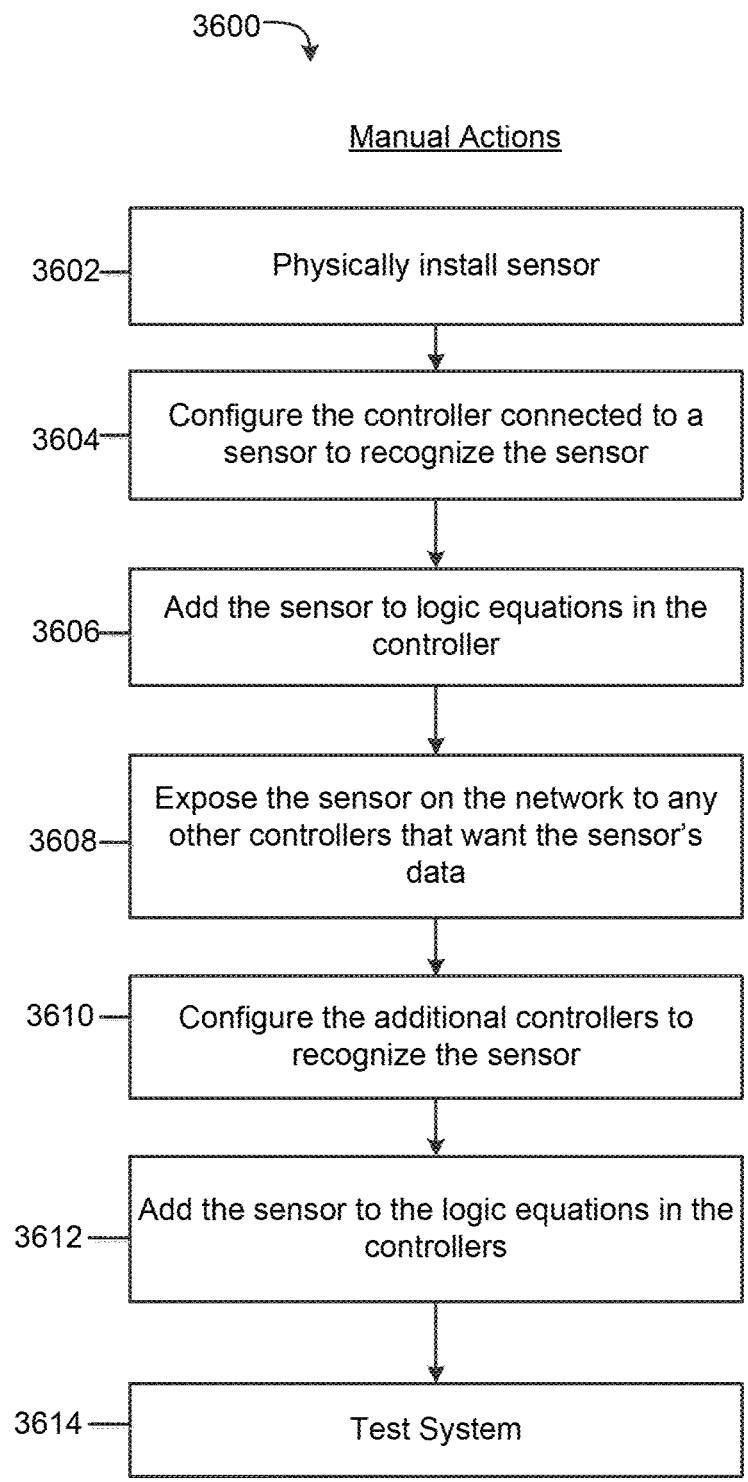
FIG. 33 is a flowchart of a conventional process of sensor installation and configuration.
Figure 34:
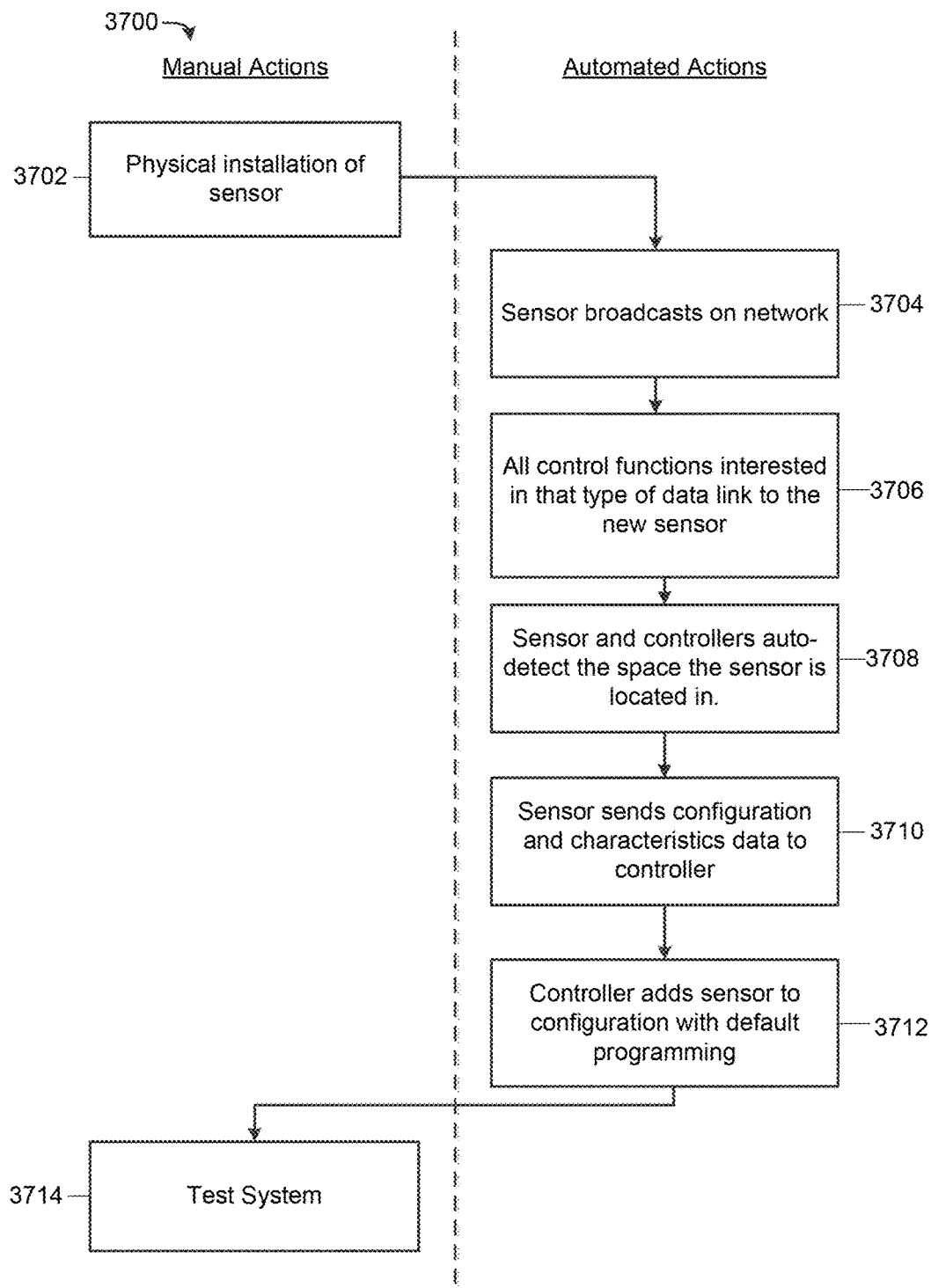
FIG. 34 is a flowchart of a process for automated, plug-and-play sensor installation in the unified sensor network.

Referring generally to FIGS. 33-34, methods for sensor installation are shown. More particularly, FIG. 33 shows a conventional process for installation of a sensor in a building domain system. FIG. 34 shows an expedited, plug-and-play installation process for sensors in the unified sensor network and unified building management system described herein, according to an exemplary embodiment.

Referring now to FIG. 33, a flowchart of a process 3600 for sensor installation is shown. More particularly, process 3600 is a traditional sensor installation workflow showing the manual actions conventionally required to install a sensor in a building domain system. At step 3602, the sensor is physically installed in a space. The sensor is physically positioned in the space and connected (wired, plugged in, etc.) to a controller or building network. At step 3604, a user configures the controller connected to the sensor to recognize the sensor. At step 3606, the user adds the sensor to logic equations in the controller. That is, the user must manually 'teach' the controller what to do with data provided by the sensor. At step 3608, the user exposes the sensor on the network (via the controller) to any other controllers on the network that the user wants to use the sensor's data. At step 3610, the user configures the additional controllers to recognize the sensor (i.e., to receive data from the sensor, to know the location of the sensor, etc.). At step 3612, the user manually adds the sensor to logic equations in the controllers. The user must therefore determine what each controller should do with the sensor data and code that into the additional controllers. At step 3614, the system is tested to verify that sensor data is being received and used as intended.

Referring now to FIG. 34, an improved, plug-and-play installation process 3700 is shown, according to an exemplary embodiment. At step 3702, the sensor is physically installed in a space by a technician (i.e., positioned in space, coupled to the network, etc.). Once the technician physically installs the sensor, automated actions occur as indicated in FIG. 34 and described below.

At step 3704, the sensor broadcasts its presence on the network. For example, the sensor may transmit its identity and other attributes (e.g., space or place, data type(s) provided, etc.) to controllers/control functions on the network. At step 3806, all control functions interested in that type of data link to the new sensor. Control functions here refer to controllers, applications, etc., including discrete computing devices and software programs running on controllers, servers, etc. Each control function may include a library of sensor types that the control function is interested in (i.e., that the control function can use to generate controls or metrics, would be improved by using, etc.), and may compare that library to the sensor's broadcast to determine whether to link to the sensor.

At step 3708, the sensor and the controllers auto-detect the space the sensor is located in, for example based on a common data model. At step 3710, the sensor sends configuration and characteristics data to the linked controllers/control functions. That is, the sensor tells the linked control functions information about the controller, such as what data it provides, characteristics about that data, timing of that data, and other relevant information.

At step 3712, the controller adds the sensor to the controller configuration based on the space the sensor was added to and default operations programming (e.g., applications, modes) that define how the controller will utilize the sensor based on the purpose of the space. The controller may store rules and automation for how to integrate a newly-connected sensor into the operation of space- and place-based control. A space- or place-profile for the space or place associated with the controller may facilitate this automated incorporation. For example, a space- or place-profile may store a list of the types of sensors or the types of data that are useful to that space or place, as well as logic for how that data is useful (e.g., what attributes the sensor enables and how to use those attributes). Because the sensor is integrated into space- and place-based control, the data provided by the sensor may be incorporated and used seamlessly across domains. For example, a new temperature sensor may be used to monitor room temperature for HVAC purposes, to detect fire for fire detection and safety purposes, and by a water system to trigger freeze alarms. The sensor and the controllers/control functions that use it are thereby automatically configured.

At step 3714, the technician can test the system. The manual steps of process 3700 only include physical installation of the sensor (step 3702) and testing of the system. In some embodiments, the sensor and control sequences associated with the sensor are also automatically tested.

Figure 35:
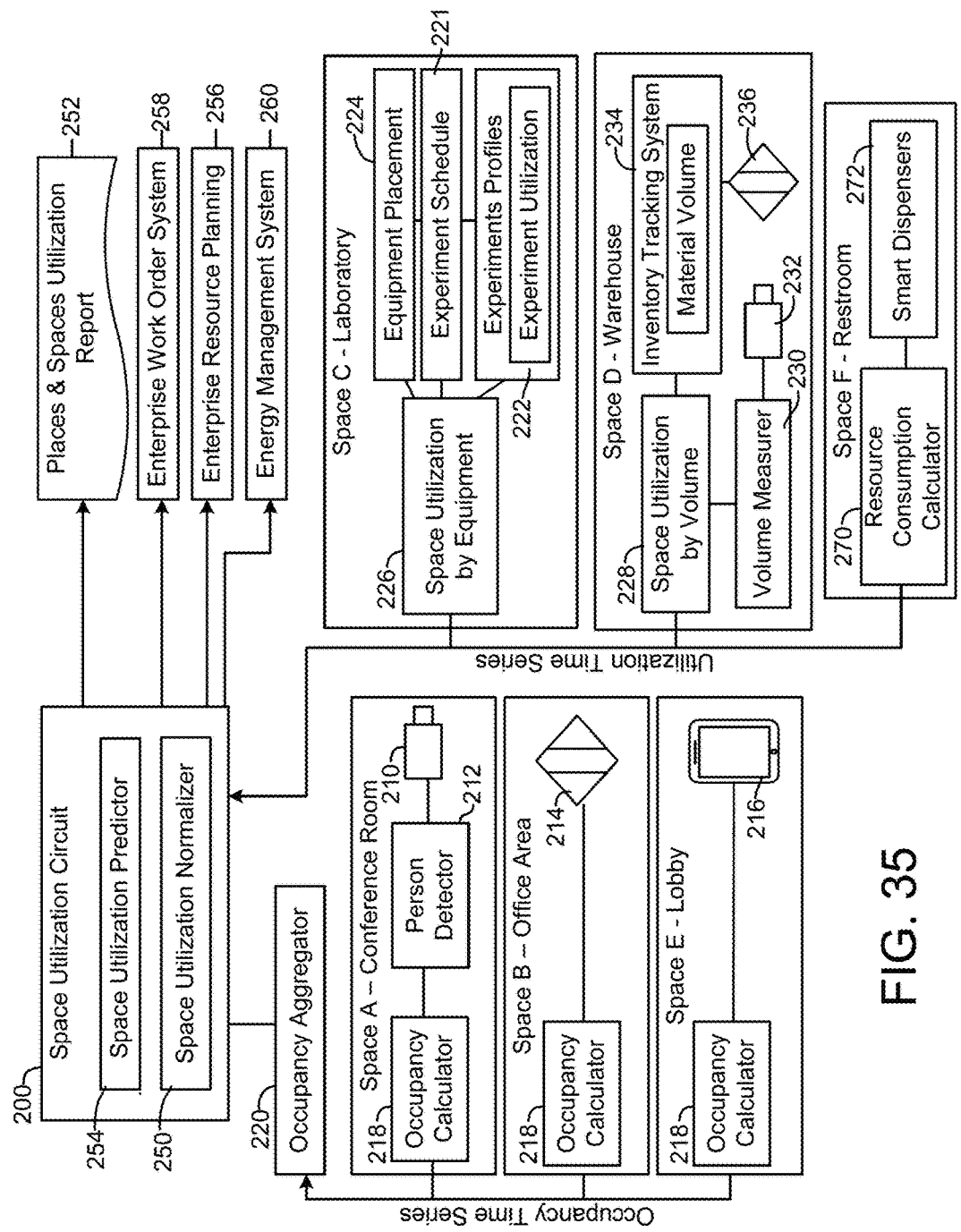
FIG. 35 is a block diagram of a space utilization circuit in use in a unified building management system, according to an exemplary embodiment.

Space Utilization Calculations with the Unified Control Engine and Unified Sensor Network Referring now to FIG. 35, a block diagram of an example of a space utilization circuit with examples of various utilization data sources is shown, according to an exemplary embodiment. In general, the space utilization circuit 200 is structured to provide utilization metrics for spaces and places that captures the important way(s) each space or place is actually used across various types of spaces and places. That is, the space utilization circuit 200 captures utilization metrics based on the way people behave in spaces or places, the way things are used or are present in spaces or places, and the way things are consumed in spaces or places, depending on which types of data are most relevant to understanding the utilization of a particular type of space as defined in a space profile.

As shown in FIG. 35, a space utilization circuit 200 for a place is communicably coupled to the profiles circuit 2002. In some embodiments, space utilization circuit 200 is included in unified control engine 1902. As shown in FIG. 35, the space utilization circuit 200 includes a space utilization normalizer 250 and a space utilization predictor 254. In some embodiments, although shown as separate components in FIG. 35, the space utilization circuit 200 also includes an occupancy aggregator 220, a space utilization by equipment circuit 226, and a space utilization by volume circuit 228, and a resource consumption calculator 270 described in detail below. In some embodiments, the space utilization circuit 200 is an application 3028 that runs on execution platform 3030 of FIG. 26, and runtime/live/historical utilization data may be stored on and used by the execution platform 3030.

In general, the space utilization circuit 200 and the systems and methods described herein solve several deficiencies of conventional building utilization technologies. More particularly, conventional methods rely on a single type of data, a single method of data collection (i.e., a single type of sensor), a single or limited number of types of spaces, and/or make broad assumptions about human activity in estimating utilization. In contrast, as described in detail below, the space utilization circuit 200 facilitates the determination of space and place utilization metrics using multiple types of data sourced from multiple types of data sources based on how spaces are actually designed and used. The space utilization circuit 200 facilitates the calculation of utilization metrics for each space individually, as well as aggregated place utilization metrics or utilization metrics for any combination of spaces.

In the example of FIG. 35, the space utilization circuit 200 serves a place that includes five spaces (i.e., Space A, Space B, Space C, Space D, and Space E). Each of the five spaces is a different type of space and has a different space profile stored in the profiles circuit 2002. The space profiles indicate which type of data and which type of data sources are most relevant for calculating a utilization metric for a given space.

As indicated by the corresponding space profiles, Space A is a conference room, Space B is an office area, and Space E is a lobby. Because human occupancy is typically the most important type of utilization for these types of spaces, the space profiles for Spaces A, B, and E indicate that occupancy should be used for utilization calculation. Furthermore, the space profiles indicate which sensors should be used to determine occupancy, for example based on the sensors that are already available in the spaces. As shown in FIG. 35, occupancy in space A is determined using camera 210 that creates a video feed processed by person detection circuit 212 to count people. Occupancy in space B is counted by a passive infrared sensor 214, and occupancy in space E is determined based on the number of user Wi-Fi-enabled devices 216 connected to a wireless network for space E.

Notably, occupancy in space A and B is measured by directly sensing the presence of humans in the spaces, while occupancy in space B is measured indirectly by counting the presence of electronic devices in space B. These diverse ways of measuring occupancy for various spaces are determined by the space utilization circuit 200 based on the space profiles in the profiles circuit 2002, which specify the sensors available in the spaces and/or the expected behavior of people in the spaces. For example, an office area may use sensors that identify the presence of ID badges in the space as employees are likely to carry the badges, while a public area such as a lobby may use a camera or Wi-Fi usage count because the public would not carry the company's ID badge.

The data from the person detection circuit 212, the passive infrared sensor 214, and the devices 216 is processed by occupancy calculators 218 to determine occupancy for each space, which is then aggregated in occupancy aggregator 220. The occupancy aggregator 220 then transmits the occupancy data for spaces A, B, and E to the space utilization circuit 200. Occupancy is thus used to determine an utilization attribute for spaces A, B, and E.

The space profile for space C indicates that space C is a laboratory and that the utilization attribute for space C can be calculated based on the schedule of experiments in the space and the equipment involved in each experiment. Thus, the space utilization circuit 200 is communicable with an experiments schedule system 221 that provides data relating to what experiments are being run and when those experiments are run, and experiments profiles database 222 that indicates what equipment is involved in the different experiments and the extent to which that equipment is used during each experiment, and an equipment placement database 224 that indicates what equipment is included in Space C. The data from the experiments schedule system 221, the experiments profiles database 222, and the equipment placement database 224 is aggregated in a space utilization by equipment circuit 226. The space utilization by equipment circuit 226 use the data to calculate a space utilization attribute for Space C. The space utilization attribute for space C reflects the use of equipment in space C.

The space profile for space D indicates that space D is a warehouse and, accordingly, that the most relevant utilization metric is the volume of materials stored in space D. To determine the volume of materials stored in space D, a space utilization by volume circuit 228 uses data from a volume measurer 230 that processes images from a camera 232 to estimate the volume of material in space D. The space utilization by volume circuit 228 also receives data from an inventory tracking system 234 that tracks materials that enter and exit space D. The inventory tracking system 234 may include an asset tracking sensor 236 (e.g., a RFID transceiver, a barcode reader). The space utilization by volume circuit 228 unifies these two types of data and calculates a single utilization attribute for space D. Thus, the utilization attribute for space D reflects the actual usage of available storage volume in the warehouse.

The space profile for Space F indicates that Space F is a bathroom, and that the most relevant data for calculating an utilization attribute is the consumption of resources (e.g., soap, paper towels, toilet paper, water) in the space. Utilization for Space F is thereby based on what is being consumed in the space. Accordingly, Space F includes smart dispensers 272 connected to a resource consumption calculator 270. The smart dispensers 272 include soap dispensers, towel dispensers, toilet paper dispensers, sinks, toilets, etc. that provide data relating to their rate of use (e.g., a count of number of uses, data tracking amount of a soap/towels/water/etc. used, a remaining level of a resource). This data is used by the resource consumption calculator 270 to generate a space utilization attribute for Space F based on how resources are consumed in the space. The consumption-based utilization attribute may be more useful in planning cleaning, restocking, maintenance etc. than people counting in Space F.

Thus, in general, the space utilization circuit 200 (including the occupancy aggregator 220, the space utilization by equipment circuit 226, and the space utilization by volume circuit 228) uses space profiles for the various spaces to determine a type of data that best defines the utilization of each space. The space utilization circuit 200 then identifies the preferred sensors and/or other data sources available in each space that provide data of that type and receives data from those sensors and data sources. The space utilization circuit 200 then determines algorithms for generating space utilization attributes and calculates the space utilization attributes. The space utilization circuit 200 tracks space utilization at an instant in time (e.g., the current time) as well as store historical data to provide a history of space utilization over time.

Further, the space utilization attributes are received by the space utilization normalizer 250. The space utilization normalizer 250 normalizes the various utilization attributes to provide a unified utilization metric. That is, the space utilization normalizer 250 receives utilization attributes with various units and parameters (e.g., number of people, hours of equipment usage, volume of stored material) and calculates a normalized utilization metric for each space that indicates the utilization of that space in units that can be compared, summed, etc. across spaces regardless of the underlying data or data source used to generate the normalized utilization metric. The space utilization normalizer 250 thereby facilitates comparison of utilization across diverse types of spaces (e.g., conference rooms and warehouses), as well as aggregation of utilization metrics of diverse spaces in a place into a single place utilization metric.

In some embodiments, the space utilization normalizer 250 normalizes each utilization attributed by comparing the value of the attribute to a target value of that attributed stored in the space profile for the space. The space utilization normalizer 250 accesses the space profile for the space (or the place profile for the place) in the profiles circuit 2002 to retrieve a utilization target value for the space. The target value may correspond to a maximum utilization (e.g., a max capacity of a room) and ideal utilization (e.g., a preferred level of use of a space) or some other value. The space utilization normalizer 250 then compares the target value to the measured/determined utilization attribute, for example by dividing the utilization attribute value by the target value. The utilization attributes are thereby normalized to generate unified utilization metrics that reflect actual utilization of spaces relative to target utilization of spaces.

The space utilization normalizer 250 also generates a report 252 of space and/or place utilization. The report may show a percent of built space usage in time, or may be grouped by space and business use, or some other organization. The report may be presented to a user for use in planning or other purposes, as described in detail below. A user may select specific spaces, groups of spaces (e.g., all restrooms), specific places, or other combination to include in the report 252 of space and/or place utilization or in the data provided to other applications. Thus, the user can chose to see utilization information for the spaces that the user is interested in, regardless of the underlying data sources used to collect that utilization information, the physical location of the spaces, or any other characteristics of the spaces. The user is then provided with normalized utilization metrics that provide the user with the information the user desires.

In some cases, the report and/or other utilization data are provided to the space utilization predictor 254. The space utilization predictor 254 predicts future space utilization based on the past utilization data. Predictions from the space utilization predictor 254 and/or the report 252 may be provided to an enterprise resource planning system 256, an enterprise work order system 258, and/or an energy management system 260. The enterprise resource planning system 256 may use the utilization report and/or the predicted utilizations to plan space additions or reconfigurations. The enterprise work order system 258 may use the utilization report and/or the predicted utilizations to determine a schedule for maintenance, restocking, cleaning, etc. For example, a low predicted utilization may indicate a good time for maintenance. As another example, a high actual usage may indicate the need for immediate restocking and/or cleaning.

The energy management system 260 may use the utilization report and/or the predicted utilizations for planning energy consumption and developing an energy management strategy. For example, the energy management system 260 may use the utilization report and/or the predicted utilizations to reduce energy consumption of devices during low-utilization periods, and allow increase energy consumption during high-utilization periods. One example of an energy management system 260 is Metasys Energy Management by Johnson Controls, for example as described in U.S. patent application Ser. No. 15/821,472, filed Nov. 22, 2017, incorporated by reference herein in its entirety.

The space utilization circuit 200 thereby facilitates the creation of normalized utilization data that can be used for a variety of purposes. For example, a facility manager of a corporate office with two locations may want to understand if it is necessary to have two locations or if one location could hold the capacity of both locations. The space utilization circuit 200 provides space utilization metrics for all office spaces at each location over time and facilitates the comparison of capacity needs.

As another example, a facility manager for a university may want to understand which laboratories are not being utilized as often as originally intended to free up underutilized spaces for other research activities. The space utilization circuit 200 provides individual space utilization metrics for all laboratories (spaces) categorized by places (i.e., building, area of campus where the laboratory is located) to facilitate identification of underutilized spaces. The utilization metrics can be based both on expected people count over time for the space along with experiment scheduling from a research calendar.

As another example, an energy manager who is refining a building's energy strategy may want to tune optimal start ramp-up/ramp-down strategies based on the actual pattern of building use over the course of time for a place, rather than based on set times of day. The space utilization circuit 200 provides a utilization metrics for many time steps over the course time for the entire place to help identify how energy usage and energy strategy can be better tuned to actual utilization of the place. The energy manager may be assisted by visualizations and advanced metrics generated by the energy management system 260.

Figure 36:
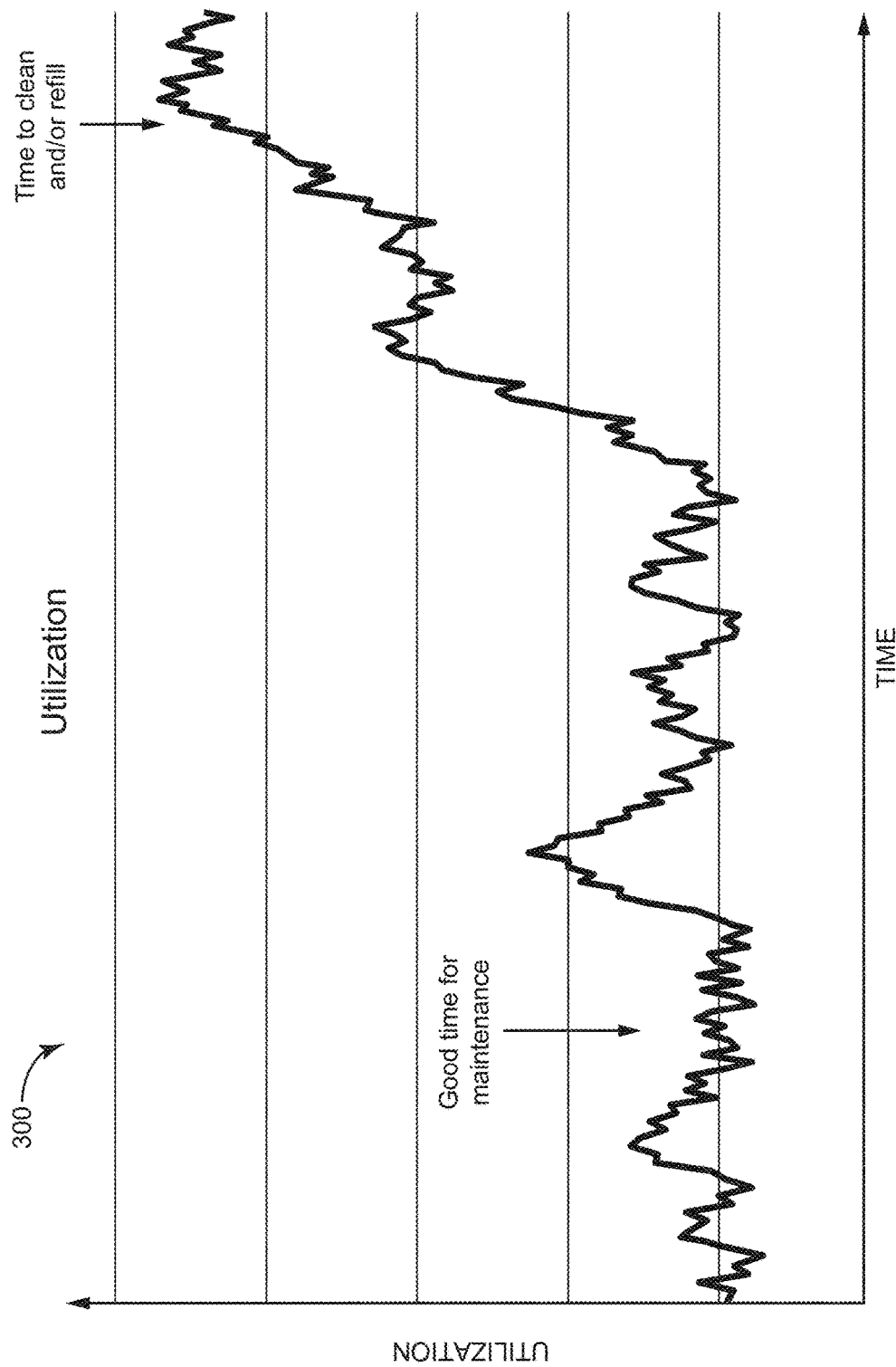
FIG. 36 is a graph of space utilization generated by the space utilization circuit of FIG. 35, according to an exemplary embodiment.

As another example, a facility manager may want to only send cleaning staff to restrooms that have been more heavily used (e.g., based on a number of flushes, hand-washes, soap-distributions, etc.) instead of sending cleaning staff to restroom on a fixed schedule. The space utilization circuit 200, using information stored in a space profile for the restroom, determines that a number of flushes or hand-washes drawn from sensors in toilets, soap-dispensers, etc. provides a better indication of bathroom utilization than a mere count of the number of people that go in and out of the bathroom. The space utilization circuit 200 and the space profile thereby facilitate understanding of utilization based on the most relevant data for the particular space. The space utilization circuit 200 may provide a graphical representation of utilization to a user (e.g., via a user personal computing device). For example, FIG. 36 shows a graph 300 of utilization over time that may be helpful in scheduling maintenance, cleaning, or other tasks.

As another example, a data center manager who is looking for available space in a server room may be more interested in current server capacity and server rack availability as an indication of utilization of the server room rather than the conventional use of occupancy to determine utilization. Accordingly, based on information in the space profile for the server room, the space utilization circuit 200 determines that the current server capacity and server rack availability are the important data points to use for generating a space utilization metric for the server room. The space utilization circuit 200 can then collect the relevant data and provide the data center manager with utilization metric that reflects the type of utilization that the data center manager wants to know about.

As another example, a warehouse owner wants to understand space utilization based on what and how much is being stored in the warehouse. The space utilization circuit 200 thereby facilitates the generation of a utilization metric that reflects the volume of materials stored in the warehouse and/or the amounts going in and out, rather than an occupancy or other proxy for utilization of the warehouse.

The space utilization circuit 200, in communication with the profiles circuit 2002, thereby captures the type of utilization most relevant to a person's actual understanding of utilization for that space or place.

User Interface for Use with the Unified Control Engine

Referring now to FIG. 37, an interface 400 for a building management system is shown, according to an exemplary embodiment. Interface 400 may be generated by graphical user interface generator 2016 of the unified control engine 1902. Interface 400 may be any interface that can be run on a laptop computer, a desktop computer, a smartphone, place controllers, a server, etc. Interface 400 may be displayed via a touch screen, a computer monitor, display, and/or any other device that displays images. Interface 400 can incorporate multiple domains into a single interface. For example, information and options relating to HVAC devices, security devices, lighting devices, and/or fire devices are all included in interface 400.

Interface 400 is shown to include place/space selection 402. Place/space selection 402 may allow a user to select a particular place (e.g., a specific buildings, areas within buildings, etc.) and a space (e.g., an area) within the place. Place/space selection 402 is shown to include a place, JCI Medical center, Main Hospital, and Floor 1, according to some embodiments. In some embodiments, JCI Medical Center may be a campus of hospital buildings. Main hospital may be one building in the JCI Medical Center campus. Floor 1 may be a particular floor in the Main Hospital building. Floor 1 is shown to include various spaces. The spaces include a Conference Room, a Front Lobby, an Admin Area A, an Admin Area B, a Cafeteria A, a Cafeteria B, a Suite A, a Suite B, and a Room 01.

In interface 400, Front Lobby of spaces or places 402 is shown to be selected and thus, equipment serving space interface 404, space activity interface 406, video interface 408, and potential problem area interface 410 may all be related to the Front Lobby space. Equipment serving space interface 404 may allow a user to view equipment of various systems associated with the Front Lobby space and make operating changes to the equipment. For example, in FIG. 37, the HVAC icon of equipment serving space interface 404 is selected (i.e., an HVAC filter has been selected so that HVAC devices serving that space are shown). For this reason, the HVAC equipment relationships (AHU 2003 serves VAV 3155) are displayed in equipment serving space interface 404. A user may interact with either piece of equipment to cause equipment serving space interface 404 to display more information and/or open a control interface for either device. The devices included on the interface 400 may include fire devices, lighting devices, access devices, HVAC devices, security devices, and any other type of device relating to the space or place. A user may make operating changes to these devices. For example, in equipment serving space interface 404, a user may adjust a VAV, an AHU, a chiller system, and/or a boiler of an HVAC system associated with the Front Lobby space.

Space activity interface 406 includes time series activity information associated with the Front Lobby space (i.e., a history of activity). Space activity interface 406 may be based on data received from fire systems, lighting systems, access systems, HVAC systems and/or security systems associated with the Front Lobby space. Space activity interface 406 displays information pertaining to all systems (e.g., HVAC, security, fire, etc.) associated with the Front Lobby space. In this example, there is a low temperature warning, a particular door has been forced open, a camera is offline, and a particular user has commanded a particular door to be unlocked. Because all of these events are displayed together in a time ordered sequence, the space activity interface 406 facilitates an inference by the user that the HVAC alarm may be caused by the door being propped open. Such an inference would be much harder to determine for a user if the user needed to use multiple interfaces to view the same data.

Video interface 408 is shown to display a live video feed of a security camera associated with the Front Lobby space and further includes a selection of video feeds. The Front Lobby space may include a plurality of video cameras. Each of these cameras may provide a live video feed to video interface 408. A user, such as a security person, may switch between the various video feeds of video interface 408. In some embodiments, video interface 408 detects movement in one or more of the video feeds and displays the most relevant video feed. In some embodiments, a particular video feed displays a particular door and/or egress or ingress point of the Front Lobby space. In the event that a security system detects that a particular door or window has been broken and/or has been forced open, video interface 408 may display the video feed that displays the particular door and/or window that has been forced open. In this regard, interface 400 may store information pertaining to what each video feed displays. For example, camera 1 may point at a particular door 1 that security system has a security system 1 for. In this regard, camera 1 may be associated with security system 1 so that interface 400 can display video feed from camera 1 in response to determining that security system 1 has detected an intrusion (e.g., door forced open, window broken, etc.). Further, when an alarm is tripped as detected by the security system, some and/or all of the video feeds of the cameras of the Front Lobby space can be recorded by video interface 408 and saved to a location that a user can review the recorded video feeds. In one example, a particular door and/or window is forced open, and is detected by the security system of the Front Lobby space. The particular door is associated with a particular camera of the Front Lobby space, for example, the particular camera points at the particular door and captures a video feed of the particular door. Video interface 408 records and saves the video feed of the particular camera of the Front Lobby space so that a user can review the video feed.

Potential problem area interface 410 may display information pertaining to a potential problem for the Front Lobby space (i.e., current potential problems). For example, potential problem area interface 410 displays zone information, door information, and camera information. The potential problems include that one zone temperature is low, another zone temperature is high, the backdoor has been forced open, and/or a particular camera is offline. For example, a facility operator who is responsible for the device infrastructure including HVAC devices and security devices (but not for monitoring actual security of a building) can see that a camera is offline without having to use multiple user interfaces.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As used herein, the terms "circuit", "control engine," "controller," and "generator" used herein may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" "control engine," "controller," or "generator" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A building management system for managing one or more places that include one or more spaces, comprising:
   a plurality of devices of building equipment that operate across multiple building equipment domains, each of the plurality of devices serving one or more of the spaces;
   a control engine configured to, for each space:
      associate the space with a first group of the plurality of devices of building equipment, the first group comprising multiple devices that serve the space and that operate across the multiple building equipment domains;
      select a space profile from a plurality of space profiles, at least two of the space profiles associated with a different type of space serving a different function, and at least two of the space profiles comprising settings for the multiple devices of the first group; and
      in response to selecting the space profile, distribute the settings defined by the selected space profile to the multiple devices of the first group, wherein distributing the settings causes the multiple devices of the first group to operate in accordance with the settings defined by the selected space profile.

2. The building management system of claim 1, wherein the control engine is configured to:
   receive an indication that two or more of the spaces have been combined to form a place that contains the two or more spaces;
   associate the place with the first group or a second group of the plurality of devices of building equipment, the second group comprising multiple devices that serve the place;
   select a place profile comprising settings for the multiple devices that serve the place, the place profile selected from among a plurality of place profiles each associated with a different type of place serving a different function;
   automatically switch from using space profiles for each of the two or more spaces to using the place profile for the place that contains the two or more spaces; and
   in response to switching to the place profile, distribute the settings defined by the place profile to the multiple devices that serve the place.

3. The building management system of claim 2, wherein the control engine is configured to generate the place profile by combining two or more groups of settings defined by the space profiles for each of the two or more spaces that have been combined to form the place.

4. The building management system of claim 1, wherein the control engine is configured to select the space profile by:
   identifying a type of place within which the space is contained;
   identifying a purpose or use of the space; and
   selecting the space profile based on both the type of place within which the space is contained and the purpose or use of the space.

5. The building management system of claim 1, wherein the control engine is configured to:
   receive an identifier for each of one or more people present in the space;
   identify preferred settings associated with each identifier; and
   adjust the settings defined by the space profile for the multiple devices that serve the space based on the preferred settings.

6. The building management system of claim 5, wherein the control engine is configured to:
   identify a relative importance and identifier-specific settings associated with each identifier; and
   generate the preferred settings by calculating a weighted average of the identifier-specific settings associated with each identifier in which each of the identifier-specific settings is weighted by the relative importance of the associated identifier.

7. The building management system of claim 1, wherein each space profile comprises an effective criticality attribute and criteria for altering the effective criticality attribute; and the control engine is configured to, for each space:
  receive data relating to the space from one or more data sources;
  determine, based on the data relating to the space, that one or more of the criteria are satisfied; and
  in response to a determination that one or more of the criteria are satisfied, alter the effective criticality attribute of the space by increasing or decreasing the effective criticality attribute for the space.

8. A method for managing one or more places that include one or more spaces, the method comprising:
  operating a plurality of devices of building equipment across multiple building equipment domains, each of the plurality of devices serving one or more of the spaces;
  for each space of the one or more spaces:
    associating the space with a first group of the plurality of devices of building equipment, the first group comprising multiple devices that serve the space and that operate across the multiple building equipment domains;
    selecting a space profile from a plurality of space profiles, at least two of the space profiles associated with a different type of space serving a different function, and at least two of the space profiles comprising settings for the multiple devices of the first group; and
    in response to selecting the space profile, distributing the settings defined by the selected space profile to the multiple devices of the first group, wherein distributing the settings causes the multiple devices of the first group to operate in accordance with the settings defined by the selected space profile.

9. The method of claim 8, further comprising:
  receiving an indication that two or more of the spaces have been combined to form a place that contains the two or more spaces;
  associating the place with the first group or a second group of the plurality of devices of building equipment, the second group comprising multiple devices that serve the place;
  selecting a place profile comprising settings for the multiple devices that serve the place;
  automatically switching from using space profiles for each of the two or more spaces to using the place profile for the place that contains the two or more spaces; and
  in response to switching to the place profile, distributing the settings defined by the place profile to the multiple devices that serve the place.

10. The method of claim 9, further comprising generating the place profile by combining two or more groups of settings defined by the space profiles for each of the two or more spaces that have been combined to form the place.

11. The method of claim 8, wherein selecting the space profile comprises:
  identifying a type of place within which the space is contained;
  identifying a purpose or use of the space; and
  selecting the space profile based on both the type of place within which the space is contained and the purpose or use of the space.

12. The method of claim 8, further comprising:
  receiving an identifier for each of one or more people present in the space;
  identifying preferred settings associated with each identifier; and
  adjusting the settings defined by the space profile for the multiple devices that serve the space based on the preferred settings.

13. The method of claim 12, further comprising:
  identifying a relative importance and identifier-specific settings associated with each identifier; and
  generating the preferred settings by calculating a weighted average of the identifier-specific settings associated with each identifier in which each of the identifier-specific settings is weighted by the relative importance of the associated identifier.

14. The method of claim 8, wherein each space profile comprises an effective criticality attribute and criteria for altering the effective criticality attribute;
  the method further comprising:
    receiving, for each space, data relating to the space from one or more data sources;
    determining, for each space and based on the data relating to the space, that one or more of the criteria are satisfied; and
    in response to a determination that one or more of the criteria are satisfied for a space, altering the effective criticality attribute of the space by increasing or decreasing the effective criticality attribute for the space.

15. One or more non-transitory computer readable media containing program instructions that, when executed by one or more processors, cause the one or more processors to perform operations comprising:
  operating a plurality of devices of building equipment across multiple building equipment domains, each of the plurality of devices serving one or more of the spaces;
  for each space of the one or more spaces:
    associating the space with a first group of the plurality of devices of building equipment, the first group comprising multiple devices that serve the space and that operate across the multiple building equipment domains;
    selecting a space profile from a plurality of space profiles, at least two of the space profiles associated with a different type of space serving a different function, and at least two of the space profiles comprising settings for the multiple devices of the first group; and
    in response to selecting the space profile, distributing the settings defined by the selected space profile to the multiple devices of the first group, wherein distributing the settings causes the multiple devices of the first group to operate in accordance with the settings defined by the selected space profile.

16. The non-transitory computer-readable media of claim 15, the operations further comprising:
  receiving an indication that two or more of the spaces have been combined to form a place that contains the two or more spaces;
  associating the place with the first group or a second group of the plurality of devices of building equipment, the second group comprising multiple devices that serve the place;
  selecting a place profile comprising settings for the multiple devices that serve the place;
  automatically switching from using space profiles for each of the two or more spaces to using the place profile for the place that contains the two or more spaces; and in response to switching to the place profile, distributing the settings defined by the place profile to the multiple devices that serve the place.

17. The non-transitory computer-readable media of claim 16, the operations further comprising generating the place profile by combining two or more groups of settings defined by the space profiles for each of the two or more spaces that have been combined to form the place.

18. The non-transitory computer-readable media of claim 15, the operations further comprising:
  receiving an identifier for each of one or more people present in the space;
  identifying preferred settings associated with each identifier; and
  adjusting the settings defined by the space profile for the multiple devices that serve the space based on the preferred settings.

19. The non-transitory computer-readable media of claim 18, the operations further comprising:
  identifying a relative importance and identifier-specific settings associated with each identifier; and
  generating the preferred settings by calculating a weighted average of the identifier-specific settings associated with each identifier in which each of the identifier-specific settings is weighted by the relative importance of the associated identifier.

20. The non-transitory computer-readable media of claim 15, wherein each space profile comprises an effective criticality attribute and criteria for altering the effective criticality attribute;
  the operations further comprising:
    receiving, for each space, data relating to the space from one or more data sources;
    determining, for each space and based on the data relating to the space, that one or more of the criteria are satisfied; and
    in response to a determination that one or more of the criteria are satisfied for a space, altering the effective criticality attribute of the space by increasing or decreasing the effective criticality attribute for the space.

* * * * *